US008042140B2

(12) United States Patent
Thomas et al.

(10) Patent No.: US 8,042,140 B2
(45) Date of Patent: Oct. 18, 2011

(54) BUFFERING CONTENT ON A HANDHELD ELECTRONIC DEVICE

(75) Inventors: Genevieve Thomas, Mirabel (CA); Felix Lambert, Terrebonne (CA); Stephane Fortier, Mirabel (CA); Guillaume Lazure, Montreal (CA); Robert Tardif, Blainville (CA); Jean Arseneau, Blainville (CA); Alain Charette, St-Jerome (CA); Gerald Lemire, St-Eustache (CA)

(73) Assignee: Kangaroo Media, Inc., Mirabel, Quebec (CA)

( * ) Notice: Subject to any disclaimer, the term of this patent is extended or adjusted under 35 U.S.C. 154(b) by 0 days.

(21) Appl. No.: 12/572,690

(22) Filed: Oct. 2, 2009

(65) Prior Publication Data

US 2010/0077441 A1  Mar. 25, 2010

Related U.S. Application Data

(63) Continuation-in-part of application No. 11/459,285, filed on Jul. 21, 2006.

(60) Provisional application No. 61/244,074, filed on Sep. 20, 2009, provisional application No. 60/701,473, filed on Jul. 22, 2005, provisional application No. 60/778,363, filed on Mar. 3, 2006, provisional application No. 60/789,911, filed on Apr. 7, 2006.

(51) Int. Cl.
*H04N 7/173* (2011.01)

(52) U.S. Cl. ........................................................ 725/94

(58) Field of Classification Search ..................... None
See application file for complete search history.

(56) References Cited

U.S. PATENT DOCUMENTS

| 4,139,860 A | 2/1979 | Micic |
| 4,259,690 A | 3/1981 | Nakanishi |
| 4,853,764 A | 8/1989 | Sutter |
| 4,866,515 A | 9/1989 | Tagawa |
| 4,887,152 A | 12/1989 | Matsuzaki |
| 5,003,300 A | 3/1991 | Wells |

(Continued)

FOREIGN PATENT DOCUMENTS

AU         779175        9/2000

(Continued)

OTHER PUBLICATIONS

Office Action dated Sep. 4, 2008, U.S. Appl. No. 11/459,285, filed Jul. 21, 2006.

(Continued)

*Primary Examiner* — Brian Pendleton
*Assistant Examiner* — Cai Chen
(74) *Attorney, Agent, or Firm* — Vierra Magen Marcus & DeNiro LLP

(57) ABSTRACT

A handheld device receives a wireless RF transmission that includes multiple video streams and buffers all video streams or selected video streams based on an identification of video streams to buffer. The device might also buffer all or selected audio streams or other real-time data content that is received in the wireless RF transmission. The wireless RF transmission may include a set of video streams (and/or audio streams, and/or other real-timed data) for the handheld device to buffer. A head end that sends the RF transmission may determine which streams to buffer based on operator input, user preferences, and other factors. Alternatively, the handheld device may automatically determine which streams to buffer based on information such as user preferences and information in the RF transmission. Alternatively, a user may select which streams to buffer.

34 Claims, 28 Drawing Sheets

U.S. PATENT DOCUMENTS

| | | |
|---|---|---|
| 5,012,350 A | 4/1991 | Streck |
| 5,023,706 A | 6/1991 | Sandberg |
| 5,045,948 A | 9/1991 | Streck |
| 5,047,860 A | 9/1991 | Rogalski |
| 5,068,733 A | 11/1991 | Bennett |
| 5,138,722 A | 8/1992 | Urella |
| 5,161,250 A | 11/1992 | Ianna |
| 5,189,562 A | 2/1993 | Greene |
| 5,223,987 A | 6/1993 | Muller |
| 5,263,156 A | 11/1993 | Bowen |
| 5,289,272 A | 2/1994 | Rabowsky |
| 5,392,158 A | 2/1995 | Tosaki |
| 5,434,590 A | 7/1995 | Dinwiddie |
| 5,485,504 A | 1/1996 | Ohnsorge |
| 5,504,535 A | 4/1996 | Abe |
| 5,508,707 A | 4/1996 | LeBlanc |
| 5,510,828 A | 4/1996 | Lutterbach |
| 5,513,384 A | 4/1996 | Brennan |
| 5,534,912 A | 7/1996 | Kostreski |
| 5,539,465 A | 7/1996 | Xu |
| 5,546,099 A | 8/1996 | Quint |
| 5,563,931 A | 10/1996 | Bishop |
| 5,570,412 A | 10/1996 | LeBlanc |
| 5,574,964 A | 11/1996 | Hamlin |
| 5,594,319 A | 1/1997 | Thandiew |
| 5,596,625 A | 1/1997 | LeBlanc |
| 5,598,208 A | 1/1997 | McClintock |
| 5,600,365 A | 2/1997 | Kondo |
| 5,600,368 A | 2/1997 | Matthews |
| 5,602,903 A | 2/1997 | LeBlanc |
| 5,617,331 A | 4/1997 | Wakai |
| 5,621,456 A | 4/1997 | Florin |
| 5,664,880 A | 9/1997 | Johnson |
| 5,666,151 A | 9/1997 | Kondo |
| 5,696,521 A | 12/1997 | Robinson |
| 5,708,961 A | 1/1998 | Hylton |
| 5,720,037 A | 2/1998 | Biliris |
| 5,729,471 A | 3/1998 | Jain |
| 5,742,263 A | 4/1998 | Wang |
| 5,768,686 A | 6/1998 | LeBlanc |
| 5,779,566 A | 7/1998 | Wilens |
| 5,790,121 A | 8/1998 | Sklar |
| 5,793,413 A | 8/1998 | Hylton |
| 5,797,809 A | 8/1998 | Hyuga |
| 5,806,005 A | 9/1998 | Hull |
| 5,812,937 A | 9/1998 | Takahisa |
| 5,815,216 A | 9/1998 | Suh |
| 5,822,527 A | 10/1998 | Post |
| 5,847,771 A | 12/1998 | Cloutier |
| 5,894,320 A | 4/1999 | Vancelette |
| 5,903,395 A | 5/1999 | Rallison |
| 5,907,322 A | 5/1999 | Kelly |
| 5,912,644 A | 6/1999 | Wang |
| 5,915,020 A | 6/1999 | Tilford |
| 5,921,780 A | 7/1999 | Myers |
| 5,945,972 A | 8/1999 | Okumura |
| 5,960,341 A | 9/1999 | LeBlanc |
| 5,987,380 A | 11/1999 | Backman |
| 5,999,808 A | 12/1999 | LaDue |
| 6,009,336 A | 12/1999 | Harris |
| 6,020,851 A | 2/2000 | Busack |
| 6,029,195 A | 2/2000 | Herz |
| 6,043,777 A | 3/2000 | Bergman |
| 6,075,527 A | 6/2000 | Ichihashi |
| 6,078,594 A | 6/2000 | Anderson |
| 6,078,874 A | 6/2000 | Piety |
| 6,078,954 A | 6/2000 | Lakey |
| 6,080,063 A | 6/2000 | Khosla |
| 6,097,441 A | 8/2000 | Allport |
| 6,100,925 A | 8/2000 | Rosser |
| 6,124,862 A | 9/2000 | Boyken |
| 6,125,259 A | 9/2000 | Perlman |
| 6,133,946 A | 10/2000 | Cavallaro |
| 6,137,525 A | 10/2000 | Lee |
| 6,144,375 A | 11/2000 | Jain |
| 6,163,338 A * | 12/2000 | Johnson et al. ............... 348/148 |
| 6,182,084 B1 | 1/2001 | Cockrell |
| 6,192,257 B1 | 2/2001 | Ray |
| 6,195,090 B1 | 2/2001 | Riggins |
| 6,236,365 B1 | 5/2001 | LeBlanc |
| 6,271,752 B1 | 8/2001 | Vaios |
| 6,292,828 B1 | 9/2001 | Williams |
| 6,301,514 B1 | 10/2001 | Canada |
| 6,332,024 B1 | 12/2001 | Inoue |
| 6,351,252 B1 | 2/2002 | Atsumi |
| 6,397,147 B1 | 5/2002 | Whitehead |
| 6,400,264 B1 | 6/2002 | Hsieh |
| 6,415,289 B1 | 7/2002 | Williams |
| 6,424,369 B1 | 7/2002 | Adair |
| 6,434,403 B1 | 8/2002 | Ausems |
| 6,434,530 B1 | 8/2002 | Sloane |
| 6,466,202 B1 | 10/2002 | Suso |
| 6,469,663 B1 | 10/2002 | Whitehead |
| 6,509,908 B1 | 1/2003 | Croy |
| 6,516,466 B1 | 2/2003 | Jackson |
| 6,522,352 B1 | 2/2003 | Strandwitz |
| 6,525,762 B1 | 2/2003 | Mileski |
| 6,526,335 B1 | 2/2003 | Treyz |
| 6,526,575 B1 | 2/2003 | McCoy |
| 6,535,493 B1 | 3/2003 | Lee |
| 6,544,121 B2 | 4/2003 | DeWeese |
| 6,564,070 B1 | 5/2003 | Nagamine |
| 6,570,889 B1 | 5/2003 | Stirling-Gallacher |
| 6,571,279 B1 | 5/2003 | Herz |
| 6,578,203 B1 | 6/2003 | Anderson, Jr. |
| 6,624,846 B1 | 9/2003 | Lassiter |
| 6,628,971 B1 | 9/2003 | Yoon |
| 6,633,232 B2 | 10/2003 | Trajkovic |
| 6,651,253 B2 | 11/2003 | Dudkiewicz |
| 6,657,654 B2 | 12/2003 | Narayanaswami |
| 6,669,346 B2 | 12/2003 | Metcalf |
| 6,675,386 B1 | 1/2004 | Hendricks |
| 6,681,398 B1 | 1/2004 | Verna |
| 6,688,973 B2 | 2/2004 | Satloff |
| 6,697,103 B1 | 2/2004 | Fernandez |
| 6,725,303 B1 | 4/2004 | Hoguta |
| 6,741,856 B2 | 5/2004 | McKenna |
| 6,760,595 B2 | 7/2004 | Inselberg |
| 6,782,102 B2 | 8/2004 | Blanchard |
| 6,807,367 B1 | 10/2004 | Durlach |
| 6,813,608 B1 | 11/2004 | Baranowski |
| 6,825,875 B1 | 11/2004 | Strub |
| 6,831,907 B2 | 12/2004 | Dolman |
| 6,907,023 B2 | 6/2005 | McKenna |
| 6,952,181 B2 | 10/2005 | Karr |
| 6,952,558 B2 | 10/2005 | Hardacker |
| 6,961,586 B2 | 11/2005 | Barbosa |
| 6,965,937 B2 | 11/2005 | Gladdis |
| 6,973,665 B2 | 12/2005 | Dudkiewicz |
| 6,990,681 B2 | 1/2006 | Wang |
| 6,996,413 B2 | 2/2006 | Inselberg |
| 7,003,792 B1 | 2/2006 | Yuen |
| 7,013,110 B1 | 3/2006 | Carpenter |
| 7,035,804 B2 | 4/2006 | Saindon |
| 7,062,795 B2 | 6/2006 | Skiba |
| 7,069,573 B1 | 6/2006 | Brooks |
| 7,079,176 B1 | 7/2006 | Freeman |
| 7,124,425 B1 | 10/2006 | Anderson |
| 7,132,932 B2 | 11/2006 | Namm |
| 7,133,837 B1 | 11/2006 | Barnes |
| 7,139,586 B2 | 11/2006 | Kreitzer |
| 7,149,549 B1 | 12/2006 | Ortiz |
| 7,155,199 B2 | 12/2006 | Zalewski |
| 7,158,079 B2 | 1/2007 | Motoyama |
| 7,162,532 B2 | 1/2007 | Koehler |
| 7,164,930 B2 | 1/2007 | Korneluk |
| 7,194,395 B2 | 3/2007 | Genovese |
| 7,194,687 B2 | 3/2007 | Sezan |
| 7,209,733 B2 | 4/2007 | Ortiz |
| 7,210,160 B2 | 4/2007 | Anderson |
| 7,248,888 B2 | 7/2007 | Inselberg |
| 7,263,378 B2 | 8/2007 | Inselberg |
| 7,289,793 B2 | 10/2007 | Norwood |
| 7,292,723 B2 | 11/2007 | Tedesco |
| 7,305,691 B2 | 12/2007 | Cristofalo |
| 7,321,655 B2 | 1/2008 | Skakkebaek |
| 7,337,462 B2 | 2/2008 | Dudkiewicz |

| | | |
|---|---|---|
| 7,343,157 B1 | 3/2008 | Mitchell |
| 7,346,150 B2 | 3/2008 | Frifeldt |
| 7,367,043 B2 | 4/2008 | Dudkiewicz |
| 7,376,388 B2 | 5/2008 | Ortiz |
| 7,386,870 B2 | 6/2008 | Lu |
| 7,421,477 B2 | 9/2008 | Pettinato |
| 7,434,247 B2 | 10/2008 | Dudkiewicz |
| 7,444,660 B2 | 10/2008 | Dudkiewicz |
| 7,451,401 B2 | 11/2008 | Tanskanen |
| 7,458,093 B2 | 11/2008 | Dukes |
| 7,483,049 B2 | 1/2009 | Aman |
| 7,487,112 B2 | 2/2009 | Barnes, Jr. |
| 7,493,368 B2 | 2/2009 | Raverdy |
| 7,496,344 B2 | 2/2009 | Stadelmann |
| 7,564,954 B2 | 7/2009 | Frifeldt |
| 7,565,153 B2 | 7/2009 | Alcock |
| 7,603,321 B2 | 10/2009 | Gurvey |
| 7,610,062 B2 | 10/2009 | Beeman |
| 7,611,409 B2 | 11/2009 | Muir |
| 7,617,272 B2 | 11/2009 | Bulson |
| 7,640,303 B2 | 12/2009 | Blumofe |
| 7,647,614 B2 | 1/2010 | Krikorian |
| 7,657,920 B2 | 2/2010 | Arseneau |
| 7,683,937 B1 | 3/2010 | Blumenfeld |
| 7,707,614 B2 | 4/2010 | Krikorian |
| 7,761,048 B2 | 7/2010 | Bichot |
| 7,792,539 B2 | 9/2010 | Inselberg |
| 7,802,724 B1 | 9/2010 | Nohr |
| 2001/0010541 A1 | 8/2001 | Fernandez |
| 2001/0022615 A1 | 9/2001 | Fernandez |
| 2001/0029613 A1 | 10/2001 | Fernandez |
| 2002/0028690 A1 | 3/2002 | McKenna |
| 2002/0040475 A1 | 4/2002 | Yap |
| 2002/0042743 A1 | 4/2002 | Ortiz |
| 2002/0042918 A1 | 4/2002 | Townsend |
| 2002/0057340 A1 | 5/2002 | Fernandez |
| 2002/0057364 A1 | 5/2002 | Anderson, Jr. |
| 2002/0058499 A1 | 5/2002 | Ortiz |
| 2002/0063697 A1 | 5/2002 | Amano |
| 2002/0063799 A1 | 5/2002 | Ortiz |
| 2002/0065074 A1 | 5/2002 | Cohn |
| 2002/0069243 A1 | 6/2002 | Raverdy |
| 2002/0069419 A1 | 6/2002 | Raverdy |
| 2002/0073421 A1 | 6/2002 | Levitan |
| 2002/0077974 A1 | 6/2002 | Ortiz |
| 2002/0083468 A1 | 6/2002 | Dudkiewicz |
| 2002/0087979 A1 | 7/2002 | Dudkiewicz |
| 2002/0087987 A1 | 7/2002 | Dudkiewicz |
| 2002/0092019 A1 | 7/2002 | Marcus |
| 2002/0095357 A1 | 7/2002 | Hunter |
| 2002/0108125 A1 | 8/2002 | Joao |
| 2002/0124249 A1 | 9/2002 | Shintani |
| 2002/0133247 A1 | 9/2002 | Smith |
| 2002/0136528 A1* | 9/2002 | Dagtas ............. 386/46 |
| 2002/0138587 A1 | 9/2002 | Koehler |
| 2002/0152462 A1 | 10/2002 | Hoch |
| 2002/0152476 A1 | 10/2002 | Anderson |
| 2002/0161579 A1 | 10/2002 | Saindon |
| 2002/0166119 A1 | 11/2002 | Cristofalo |
| 2002/0167442 A1 | 11/2002 | Taylor |
| 2002/0174430 A1 | 11/2002 | Ellis |
| 2002/0184641 A1 | 12/2002 | Johnson |
| 2002/0188943 A1* | 12/2002 | Freeman et al. ............. 725/38 |
| 2002/0194589 A1 | 12/2002 | Cristofalo |
| 2002/0194601 A1 | 12/2002 | Perkes |
| 2002/0199198 A1 | 12/2002 | Stonedahl |
| 2003/0005455 A1 | 1/2003 | Bowers |
| 2003/0007464 A1 | 1/2003 | Balani |
| 2003/0014412 A1 | 1/2003 | Collart |
| 2003/0017826 A1 | 1/2003 | Fishman |
| 2003/0043769 A1 | 3/2003 | Dolman |
| 2003/0051253 A1 | 3/2003 | Barone |
| 2003/0065805 A1 | 4/2003 | Barnes, Jr. |
| 2003/0069762 A1 | 4/2003 | Gathman |
| 2003/0069829 A1 | 4/2003 | Gathman |
| 2003/0070182 A1 | 4/2003 | Pierre |
| 2003/0088873 A1 | 5/2003 | McCoy |
| 2003/0093790 A1 | 5/2003 | Logan |
| 2003/0093794 A1 | 5/2003 | Thomas |
| 2003/0100326 A1 | 5/2003 | Grube |
| 2003/0105558 A1 | 6/2003 | Steele |
| 2003/0110503 A1 | 6/2003 | Perkes |
| 2003/0112354 A1* | 6/2003 | Ortiz et al. ............. 348/333.01 |
| 2003/0149988 A1* | 8/2003 | Ellis et al. ............. 725/87 |
| 2003/0189589 A1 | 10/2003 | LeBlanc |
| 2003/0189668 A1 | 10/2003 | Newnam |
| 2003/0220091 A1 | 11/2003 | Farrand |
| 2003/0220835 A1 | 11/2003 | Barnes |
| 2003/0222819 A1 | 12/2003 | Karr |
| 2004/0003398 A1 | 1/2004 | Donian |
| 2004/0006774 A1 | 1/2004 | Anderson |
| 2004/0024812 A1 | 2/2004 | Park |
| 2004/0032495 A1 | 2/2004 | Ortiz |
| 2004/0042103 A1 | 3/2004 | Mayer |
| 2004/0073927 A1 | 4/2004 | Knudson |
| 2004/0093265 A1 | 5/2004 | Ramchandani |
| 2004/0117829 A1 | 6/2004 | Karaoguz |
| 2004/0133467 A1 | 7/2004 | Siler |
| 2004/0136547 A1 | 7/2004 | Anderson |
| 2004/0137891 A1 | 7/2004 | Clark |
| 2004/0145459 A1 | 7/2004 | Himmelstein |
| 2004/0158638 A1 | 8/2004 | Peters |
| 2004/0171381 A1 | 9/2004 | Inselberg |
| 2004/0185856 A1 | 9/2004 | McKenna |
| 2004/0186813 A1 | 9/2004 | Tedesco |
| 2004/0192329 A1 | 9/2004 | Barbosa |
| 2004/0193371 A1 | 9/2004 | Koshiji |
| 2004/0193499 A1 | 9/2004 | Ortiz |
| 2004/0194134 A1* | 9/2004 | Gunatilake et al. ............. 725/38 |
| 2004/0196181 A1 | 10/2004 | Huston |
| 2004/0203338 A1 | 10/2004 | Zilliacus |
| 2004/0203663 A1 | 10/2004 | Bowman |
| 2004/0210923 A1 | 10/2004 | Hudgeons |
| 2004/0212731 A1 | 10/2004 | Sie |
| 2004/0220753 A1 | 11/2004 | Tabe |
| 2004/0229568 A1 | 11/2004 | Lowe |
| 2004/0229671 A1 | 11/2004 | Stronach |
| 2004/0235542 A1 | 11/2004 | Stronach |
| 2004/0261127 A1 | 12/2004 | Freeman |
| 2005/0021364 A1 | 1/2005 | Nakfoor |
| 2005/0021365 A1 | 1/2005 | Nakfoor |
| 2005/0021467 A1 | 1/2005 | Franzdonk |
| 2005/0028190 A1 | 2/2005 | Rodriguez |
| 2005/0033506 A1 | 2/2005 | Peterson |
| 2005/0042591 A1 | 2/2005 | Bloom |
| 2005/0050151 A1 | 3/2005 | Mitchell |
| 2005/0050575 A1 | 3/2005 | Arseneau |
| 2005/0086079 A1 | 4/2005 | Graves |
| 2005/0097595 A1 | 5/2005 | Lipsanen |
| 2005/0104958 A1 | 5/2005 | Egnal |
| 2005/0114324 A1 | 5/2005 | Mayer |
| 2005/0120369 A1 | 6/2005 | Matz |
| 2005/0136949 A1 | 6/2005 | Barnes, Jr. |
| 2005/0160465 A1 | 7/2005 | Walker |
| 2005/0169253 A1 | 8/2005 | Hu |
| 2005/0172706 A1 | 8/2005 | Paulsen |
| 2005/0188010 A1 | 8/2005 | Valk |
| 2005/0201302 A1 | 9/2005 | Gaddis |
| 2005/0203927 A1 | 9/2005 | Sull |
| 2005/0210512 A1 | 9/2005 | Anderson |
| 2005/0216299 A1 | 9/2005 | Anderson |
| 2005/0243755 A1 | 11/2005 | Stephens |
| 2005/0251827 A1 | 11/2005 | Ellis |
| 2005/0251835 A1 | 11/2005 | Scott |
| 2005/0273830 A1 | 12/2005 | Silver |
| 2005/0273911 A1 | 12/2005 | Skiba |
| 2005/0275626 A1 | 12/2005 | Mueller |
| 2005/0280705 A1 | 12/2005 | Anderson |
| 2005/0289597 A1 | 12/2005 | Kawahara |
| 2006/0004643 A1 | 1/2006 | Stadelmann |
| 2006/0015904 A1 | 1/2006 | Marcus |
| 2006/0025158 A1 | 2/2006 | LeBlanc |
| 2006/0038818 A1 | 2/2006 | Steele |
| 2006/0064716 A1 | 3/2006 | Sull |
| 2006/0069749 A1 | 3/2006 | Herz |
| 2006/0094409 A1 | 5/2006 | Inselberg |
| 2006/0095471 A1 | 5/2006 | Krikorian |
| 2006/0095472 A1 | 5/2006 | Krikorian |

| | | |
|---|---|---|
| 2006/0104600 A1 | 5/2006 | Abrams |
| 2006/0107295 A1 | 5/2006 | Margis |
| 2006/0117365 A1 | 6/2006 | Ueda |
| 2006/0117371 A1 | 6/2006 | Margulis |
| 2006/0123053 A1 | 6/2006 | Scannell |
| 2006/0126544 A1 | 6/2006 | Markel |
| 2006/0126556 A1 | 6/2006 | Jiang |
| 2006/0149633 A1 | 7/2006 | Voisin |
| 2006/0154657 A1 | 7/2006 | Inselberg |
| 2006/0156219 A1 | 7/2006 | Haot |
| 2006/0173701 A1 | 8/2006 | Gurvey |
| 2006/0174288 A1 | 8/2006 | Bichot |
| 2006/0174297 A1 | 8/2006 | Anderson, Jr. |
| 2006/0179462 A1 | 8/2006 | Willame |
| 2006/0184431 A1 | 8/2006 | Rosenberg |
| 2006/0184538 A1 | 8/2006 | Randall |
| 2006/0190250 A1 | 8/2006 | Saindon |
| 2006/0200842 A1 | 9/2006 | Chapman |
| 2006/0212585 A1 | 9/2006 | Eaton |
| 2006/0223528 A1 | 10/2006 | Smith |
| 2006/0242680 A1 | 10/2006 | Johnson |
| 2006/0244839 A1 | 11/2006 | Glatron |
| 2006/0252526 A1 | 11/2006 | Walker |
| 2006/0253330 A1 | 11/2006 | Maggio |
| 2006/0253542 A1 | 11/2006 | McCausland |
| 2006/0259924 A1 | 11/2006 | Boortz |
| 2006/0268363 A1 | 11/2006 | Meinders |
| 2006/0268828 A1 | 11/2006 | Yarlagadda |
| 2006/0276174 A1 | 12/2006 | Katz |
| 2006/0277308 A1 | 12/2006 | Morse |
| 2006/0282319 A1 | 12/2006 | Maggio |
| 2006/0288375 A1 | 12/2006 | Ortiz |
| 2007/0014536 A1 | 1/2007 | Hellman |
| 2007/0015586 A1 | 1/2007 | Huston |
| 2007/0018880 A1 | 1/2007 | Huston |
| 2007/0018952 A1 | 1/2007 | Arseneau |
| 2007/0019068 A1 | 1/2007 | Arseneau |
| 2007/0019069 A1 | 1/2007 | Arseneau |
| 2007/0021055 A1 | 1/2007 | Arseneau |
| 2007/0021056 A1 | 1/2007 | Arseneau |
| 2007/0021057 A1 | 1/2007 | Arseneau |
| 2007/0021058 A1 | 1/2007 | Arseneau |
| 2007/0022289 A1 | 1/2007 | Alt |
| 2007/0022438 A1 | 1/2007 | Arseneau |
| 2007/0022445 A1 | 1/2007 | Arseneau |
| 2007/0022446 A1 | 1/2007 | Arseneau |
| 2007/0022447 A1 | 1/2007 | Arseneau |
| 2007/0050191 A1 | 3/2007 | Weider |
| 2007/0058041 A1 | 3/2007 | Arseneau |
| 2007/0061266 A1 | 3/2007 | Moore |
| 2007/0061487 A1 | 3/2007 | Moore |
| 2007/0061845 A1 | 3/2007 | Barnes |
| 2007/0094698 A1 | 4/2007 | Bountour |
| 2007/0095887 A1 | 5/2007 | Barbosa |
| 2007/0117576 A1 | 5/2007 | Huston |
| 2007/0118426 A1 | 5/2007 | Barnes, Jr. |
| 2007/0121534 A1 | 5/2007 | James |
| 2007/0156443 A1 | 7/2007 | Gurvey |
| 2007/0173266 A1 | 7/2007 | Barnes, Jr. |
| 2007/0180062 A1 | 8/2007 | Southerland |
| 2007/0197247 A1 | 8/2007 | Inselberg |
| 2007/0202900 A1 | 8/2007 | Inselberg |
| 2007/0233585 A1 | 10/2007 | Ben Simon |
| 2007/0279494 A1 | 12/2007 | Aman |
| 2007/0286596 A1 | 12/2007 | Lonn |
| 2008/0016534 A1 | 1/2008 | Ortiz |
| 2008/0036653 A1 | 2/2008 | Huston |
| 2008/0065735 A1 | 3/2008 | Szeto |
| 2008/0065768 A1 | 3/2008 | Ortiz |
| 2008/0065997 A1 | 3/2008 | Szeto |
| 2008/0133421 A1 | 6/2008 | Myers |
| 2008/0191009 A1 | 8/2008 | Gressel |
| 2008/0192116 A1 | 8/2008 | Tamir |
| 2008/0198230 A1 | 8/2008 | Huston |
| 2008/0200161 A1 | 8/2008 | Morse |
| 2008/0259096 A1 | 10/2008 | Huston |
| 2008/0270579 A1 | 10/2008 | Herz |
| 2008/0281903 A1 | 11/2008 | Kwiatkowski |
| 2008/0288355 A1 | 11/2008 | Rosen |
| 2008/0294434 A1 | 11/2008 | Pettinato |
| 2009/0009605 A1 | 1/2009 | Ortiz |
| 2009/0018903 A1 | 1/2009 | Lyer |
| 2009/0029780 A1 | 1/2009 | Amaitis |
| 2009/0046152 A1 | 2/2009 | Aman |
| 2009/0069040 A1 | 3/2009 | Wiesmuller |
| 2009/0083448 A1 | 3/2009 | Craine |
| 2009/0144624 A1 | 6/2009 | Barnes, Jr. |
| 2009/0191962 A1 | 7/2009 | Hardy |
| 2009/0256817 A1 | 10/2009 | Perlin |
| 2009/0281392 A1 | 11/2009 | Brown |
| 2010/0023865 A1 | 1/2010 | Fulker |
| 2010/0077441 A1 | 3/2010 | Thomas |
| 2010/0100915 A1 | 4/2010 | Krikorian |
| 2010/0150525 A1 | 6/2010 | Walker |
| 2010/0274614 A1 | 10/2010 | Fraley |

FOREIGN PATENT DOCUMENTS

| | | |
|---|---|---|
| CA | 2237939 | 8/1998 |
| CA | 2369832 | 9/2000 |
| CA | 2361659 | 5/2003 |
| EP | 0578201 | 1/1994 |
| EP | 1166596 | 1/2002 |
| GB | 2355135 | 4/2001 |
| WO | WO 9303571 | 2/1993 |
| WO | WO 9411855 | 5/1994 |
| WO | WO 9708896 | 3/1997 |
| WO | WO 9831148 | 7/1998 |
| WO | WO 9841020 | 9/1998 |
| WO | WO 9939299 | 8/1999 |
| WO | WO 0054554 | 9/2000 |
| WO | WO 0108417 | 2/2001 |
| WO | WO 0120572 | 3/2001 |
| WO | WO 02096097 | 11/2002 |
| WO | WO 02096104 | 11/2002 |
| WO | WO 03042939 | 5/2003 |
| WO | WO 2004034617 | 4/2004 |
| WO | WO 2004/040886 | 5/2004 |
| WO | WO 2005011254 | 2/2005 |
| WO | WO 2005076625 | 8/2005 |
| WO | WO 2006067545 | 6/2006 |
| WO | WO 2006085844 | 8/2006 |
| WO | WO 2007009225 | 1/2007 |
| WO | WO 2007115392 | 10/2007 |

OTHER PUBLICATIONS

Response to Office Action dated Dec. 4, 2008, U.S. Appl. No. 11/459,285, filed Jul. 21, 2006.

Office Action dated Feb. 13, 2009, U.S. Appl. No. 11/459,285, filed Jul. 21, 2006.

Response to Office Action dated Aug. 13, 2009, U.S. Appl. No. 11/459,285, filed Jul. 21, 2006.

Office Action dated Sep. 16, 2009, U.S. Appl. No. 11/459,285, filed Jul. 21, 2006.

Response to Office Action dated Dec. 5, 2009, U.S. Appl. No. 11/459,285, filed Jul. 21, 2006.

Office Action dated Mar. 2, 2010, U.S. Appl. No. 11/459,285, filed Jul. 21, 2006.

Response to Office Action dated Jul. 29, 2010, U.S. Appl. No. 11/459,285, filed Jul. 21, 2006.

Office Action dated Oct. 5, 2010, U.S. Appl. No. 11/459,285, filed Jul. 21, 2006.

Macko, Steve, "Security at the Summery Olympic Games is Ready", Emergencynet News Service, 1996, Tuesday, Jul. 9, 1996, vol. 2-191.

Node, world leader in Location Based Media, nodeexplorer, http://www.nodeexplore.com/, Copyright Node 2005.

Pocket Video Scanner 2.4 GHZ Band, http://www.tetrascanner.com/pocket-video-scanner-details.html, Jul. 26, 2005, 1 page.

ICOM IC-R3 Receiver, http://javiation.co.uk/ic-r3.html, Copyright © Javiation 2000-2004, Jul. 26, 2005, 2 pages.

Video Signal Scanner: Wireless video scanner, Copyright 2003, http://www.spyequipmentguide.com/video-signal-scanner.html, Jul. 26, 2005, 1 page.

ICOM IC-R3—Meets MIL STD810, Communicaitons Receiver, Copyright 2000 Icom Inc., 4 pages.

Federal Communications Commissio, FCC OET Search Form, FCC ID= AF JIC-R3, https://gullfoss2.fcc.gov/cgi-bin/ws.exe/prod/oet/forms/reports/Search_Form.hts?mode=ED . . . , 1 page.
Koyama, Takayoshi et al., ACM Press, International Conference on Computer Graphics and Interactive Techniques, Live 3D Video in Soccer Stadium, 2003, 2 pages.
Yan, Xin et al., ACM Press, International Multimedia Conference, 3D Reconstruction and Enrichment System for Broadcase Soccer Video, 2004, 3 pages.
Front Row Technolodies, My Front Row™ , Put the "Front Row" in the palm of your hand, http://www.myfrontrow.com/pages/439116/, Copyright 2001 by Mesa Digital LLC, 10 pages.
Slettenhaar, Henk et al., Silicon Valley Tour, Fall 2000, From Hollywood to Woodside, http://siliconvalley.ch, 38 pages.
Cadence Embedded Systems Design Services Brings the Scanz Sccannor to Market, http://www.edacafe.com/ technical/papers/Cadence/vol4No4/scanz.php, 1999 Cadence Design Systems Inc.
Carroll, Fans take to ChoiceSeats: Interactive technology, e-commerce expand to sporting events, Telephonyonline, Jan. 10, 2000.
Vela Research LP to Supply Encoding for ChoiceSeat at SuperBowl XXXII, St. Petersburg, FL , Jan. 13, 1998.
Stadium fans touch the future-Internet Explorer and touch screens add interactivity to Super Bowl XXXII, 1998.
San Diego Metropolitan Magazine, Jan. 29, 1998.
Grover, Armchair Baseball from the Web—or Your Stadium Seat, Business Week, Oct. 22, 1998.
Reality Check Studios Goes Broadband with Production for Choiceseat at Madison Square Garden, Hollywood, Calif., Dec. 1, 1999.
ChoiceSeat—Event Operations Manual for Madison Square Garden, 1999 Intel Corporation, Dec. 15, 1999.
ChoiceSeat screens, Jan. 1999.
ChoiceSeat—System Administrator's Binder for Madison Square Garden, Dec. 17, 1999.
ChoiceSeat™ Fact Sheet, Jun. 13, 2007.
ChoiceSeat Operations Manual: v.1.1, 1999.
ChoiceSeat Specification, Version 2.2, Williams Communications Group, Oct. 10, 1997.
Qualcomm Stadium, Choiceseat Network Diagram, May 11, 1998.
Proposed ChoiceSeat Client Specification Summary, Initial Draft Mar. 29, 1997, Updated Sep. 30, 1997.
Schedule of Personal Property, Patents, Software and Trademarks etc. Draft, CSI Incorporated, Aug. 28, 2001.
CSI Incorporated Draft—Schedule A-IP Intellectual Property, Aug. 28, 2001.
ChoiceSeat-The Premiere Provider of Interactive Event Entertainment, PowerPoint presentation, Jan. 2000.
ChoiceSeat Intellectual Property List, Aug. 28, 2001.
Proposed ChoiceSeat Network Specification Summary, Initial Draft, Aug. 25, 1997.
Proposed ChoiceSeat Network Specification Summary, Initial Draft Aug. 25, 1997 Updated Draft Aug. 28, 1997 Updated Draft Sep. 30, 1997.
Super Bowl XXXII Game Recap, www.nfl.com/superbowl/history/recap/sbxxxii, Jan. 26, 1998.
Super Bowl XXXII, Wikipedia, http://en.wikipedia.org/wiki/Super_Bowl_XXXIII, 1999.
Breier, Computer age comes to ballpark, North County Times, San Diego, Aug. 19, 1997.
Carter, Web Technology: It's in THE Game, www.microsoft.com/sitebuilder/features/superbowl.asp, Dec. 15, 1997.
ChoiceSeat™ Fact Sheet, Project: Super Bowl XXXII, Jan. 25, 1998.
ChoiceSeat™ Screen Shot, Superbowl XXXII, Jan. 25, 1998.
ChoiceSeat™ Advertisement, Pre-Super Bowl XXXII, Jan. 1998.
Fikes, For lucky 600 fans, there'll be TV sets at the seats, Super Bowl XXXII—It's just business, North County Times, San Diego, Jan. 14, 1998.
Stewart, Williams Interactive Video Gives Football Fans Choice, Tulsa World, Jan. 1998.
ChoiceSeat™ Hand Out at Super Bowl XXXIII, Jan. 25, 1998.
Just Call It Wired Bowl, Newsweek, Cyberscope, Jan. 28, 1998.
VYVX, Doctor Design, and Erbes Dev. Group Go to the Ball Game: Watch PC-TV, Internet TV at the Stadium, http://ruel.net/top/box.article.05.htm, Sep. 1, 1997.
Williams ChoiceSeat interactive network launches inaugural season with Tampa Bay Devil Rays expands features for second season with San Diego Padres, www.williams.com/newsroom/news_releases/1998/rel175.htm, St. Petersburg and San Diego, Mar. 30, 1998.
ChoiceSeat Draft Requirements, Dec. 1998.
Super Bowl Turns Techno Bowl, The Herald, Jan. 24, 1999.
Williams Communications' ChoiceSeat™ demonstrates the interactive evolution of sports at Super BowI™ XXXIII, www.williams.com/newsroom/news_releases/1999/rel287.htm, Tulsa, Jan. 20, 1999.
ChoiceSeat™ Advertisement, Pre-Super Bowl XXXIII, Jan. 1999.
International Search Report dated Jan. 20, 2011, PCT Application No. PCT/CA2010/001441.
Written Opinion of the International Searching Authority dated Jan. 20, 2011, PCT Application No. PCT/CA2010/001441.
Office Action dated Apr. 12, 2011, U.S. Appl. No. 11/459,285.
Response to Office Action dated Feb. 7, 2011, U.S. Appl. No. 11/459,285.
Response to Office Action dated Apr. 27, 2011, U.S. Appl. No. 11/459,285.
ChoiceSeat™ Fact Sheet, Super Bowl XXXIII™, Pro Player Stadium, Miami, Florida, Jan. 31, 1999.
Super Bowl XXXIII Game Recap, www.nfl.com/superbowl/history/recap/sbxxxiii, Feb. 1, 1999.
CSI, Inc. (ChoiceSeat™) Business Plan, Aug. 1999.
ChoiceSeat™ User Guide, New York Knicks, Madison Square Garden, Aug. 1999.
ChoiceSeat™ User Guide, New York Rangers, Madison Square Garden, Aug. 1999.
ChoiceSeat™ Flowchart, New York Rangers, Madison Square Garden, Rev. 3.2, Nov. 16, 1999.
In-Seat Interactive Advertising Device Debuts, www.williams.com/newsroom/news_releases/1999/rel426.htm, New York, Nov. 19, 1999.
Intel and ChoiceSeat™ collaborate to advance interactive sports technology, www.williams.com/newsroom/news_releases/1999/rel429.htm, Santa Clara, Calif. and New York, Nov. 29, 1999.
Gordon, Interactive Broadband Video at the Garden, Digital Video Magazine, Apr. 2000.
Sweet, With Wired Seats, Fans Get Replays, Rules, Snacks, Wall Street Journal, May 21, 2000.
CSI Incorporated ("ChoiceSeat")—Executive Summary-Short Term Tactical Plan, May 2001.
Memorandum re Obviousness to Michele Connor and Craig Tyler, from Jean Theberge and Alain Charette, Nov. 2, 2007.
History of Wireless, Johns Hopkins School of Public Health, http://www.jhsph.edu/wireless/story.html, Nov. 12, 2007.
Wireless LAN, Wikipedia, Nov. 2007.
McGraw et al., "Security Enhancements in JDK 1.1", Securing Java, Beyond the Sandbox: Signed Code and Java 2, Section 2, Jan. 1999, John Wiley & Sons, Inc.
Notice of Allowance dated Jun. 10, 2011, U.S. Appl. No. 11/459,285.

* cited by examiner

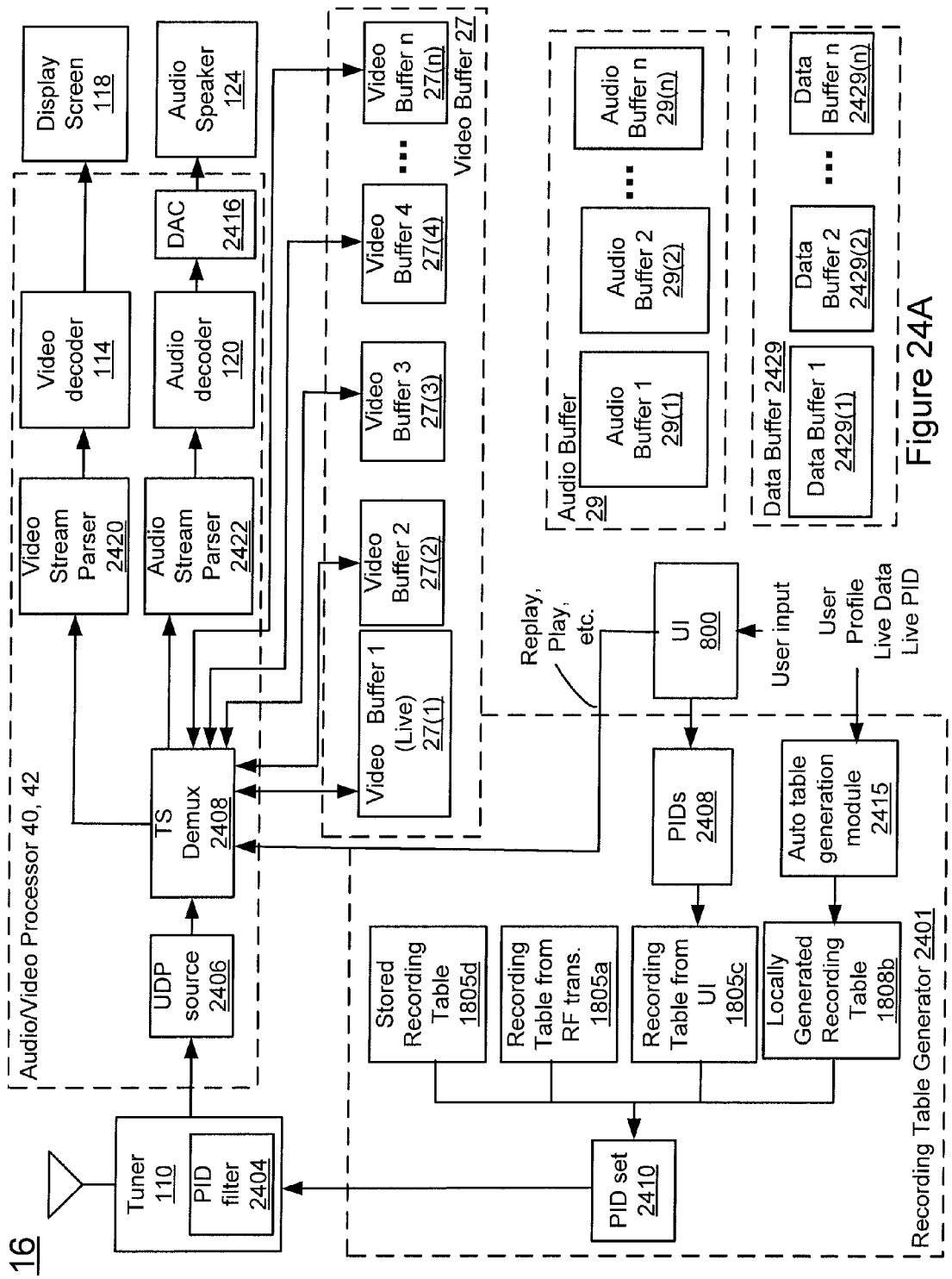

US 8,042,140 B2

BUFFERING CONTENT ON A HANDHELD ELECTRONIC DEVICE

This application claims the benefit of U.S. Provisional Application 61/244,074, filed on Sep. 20, 2009. This application is a continuation-in-part of U.S. patent application Ser. No. 11/459,285, filed on Jul. 21, 2006, published as U.S. Patent Application Publication US 2007/0018952. U.S. patent application Ser. No. 11/459,285 claims priority to provisional applications 60/701,473; 60/778,363; and 60/789,911. This application incorporates herein by reference U.S. Patent Application Publication US 2007/0018952 in its entirety.

BACKGROUND

1. Field of the Invention

The present invention relates to buffering data on a handheld electronic device.

2. Description of the Related Art

The concept of delivering video and/or audio content to spectators attending a live sporting event is known. One conventional approach uses a local transmission station that will deliver video and/or audio content over the air to handheld electronic devices operated by individual spectators. A spectator can select the particular video/audio channel of interest on the handheld electronic device. One drawback of some previously proposed systems is that if the user was not tuned to a particular channel showing an event of interest when the event of interest occurred, the user may not be able to view that event.

Some set top boxes used to access cable or satellite television may be able to buffer the last several minutes of television that the user watches without the user scheduling a program to be recorded. Buffering a live television signal allows the user some interesting viewing options such as "pausing" live television and "rewinding" to watch an interesting scene another time. However, some conventional systems have numerous limitations. For example, in some systems, the content of the buffer is lost if the user changes television channels. Therefore, if the user returns back to the original channel the user is not able to rewind to replay any action they might have missed when the user was watching the other channel.

BRIEF DESCRIPTION OF THE DRAWINGS

FIG. 24A is a block diagram of one embodiment of a handheld device showing an overview of buffering content from an RF transmission.

DETAILED DESCRIPTION

Figure 1:
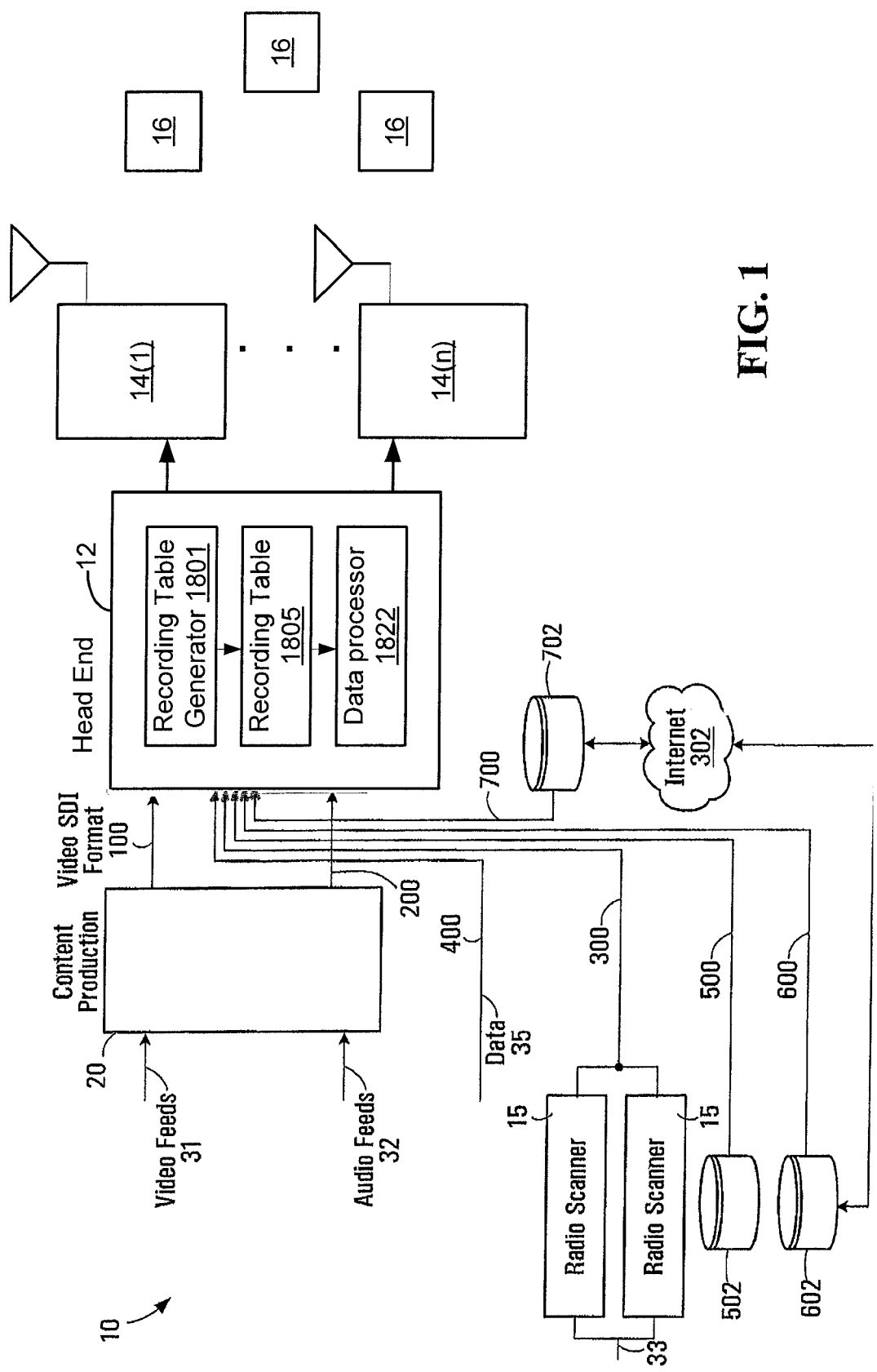
FIG. 1 is a block diagram of one embodiment of an overall system architecture.

Techniques are disclosed herein for buffering video, audio, and other content at handheld electronic devices. In one embodiment, a handheld electronic device receives a wireless RF transmission that includes multiple video channels and buffers all or a subset of the video channels without the user requesting that a particular program be recorded. The video channels are buffered for a finite period of time and the user is provided the opportunity to replay any of the buffered content. For example, while watching live video, a user may request access to the buffered video by requesting to see a replay on a specific channel or requesting to see the reply on multiple channels.

An example implementation includes sending an RF transmission to multiple handheld devices that includes different video channels corresponding to different cameras recording different perspectives of a live event. The RF transmission may include information which directly or indirectly indicates a subset of the video channels to be buffered at the handheld devices for replay mode playback. Alternatively, the decision of which subset of channels to buffer may be made at the handheld devices. A video channel may include a video stream and an audio stream to be presented in synchronization with the video stream. In one embodiment, the video channel may include a video stream without an audio stream. The handheld devices might also buffer selected independent audio streams or other real-time (or non-real-time) content (including data about the event) that is received in a wireless RF transmission. Although numerous examples will be provided of buffering video channels, it will be understood that audio streams or other content may be buffered even if not specifically mentioned.

In one embodiment, a wireless RF transmission to the handheld devices includes video channels and one or more recording tables. The recoding tables provide an identification of video channels (or video streams, audio streams, or other real-timed data) for the handheld device to buffer. The recording table can be in any suitable format that identifies (directly or indirectly) which subset of video, audio and/or other content to buffer. Although referred to as a table, the recording table need not be in a table format. In one embodiment, the recording table and video channels are transmitted to the handheld device in a single wireless RF signal that is received by a single tuner on the handheld. The various video channels to be buffered are transmitted from the single tuner (directly or indirectly) to the buffer, without the need for additional tuners in the handheld. The recording table does not have to be transmitted in the same RF transmission as the content that is to be buffered. In one embodiment, the recording table and video channels are transmitted to the handheld device in separate RF signals/transmissions. In other embodiments, the recording table is generated at the handheld. For example, a user of the handheld can manually provide the data that the handheld uses to create and store a recording table. Alternatively, the handheld device can automatically generate the recording table based on information such as user preferences, information in the RF transmission, audio content recognized in the video channels, video content recognized in the video channels, event data received, or a combination thereof. In one embodiment, a user selects which video channels to buffer by, for example, selecting from a set of video channels received in the RF transmission. In another embodiment, the handheld device stores a recording table that may have been provided when the user registered to receive the RF transmission.

In some embodiments, the recording table is generated at a head end that also transmits the video channels to the handhelds via the wireless RF transmission. The head end typically includes hardware (e.g., one or more processor in one or more computers in communication with data storage and a wireless transmitter) and software for receiving event data, multiple audio streams and multiple video streams. The event data, audio streams and video streams are combined to a single RF signal and transmitted to the various handhelds at or near the event. The head end can generate the recording table for inclusion in the RF transmission in a number of ways. For example, the head end may provide a graphical user interface (GUI) that allows an operator at a sporting event (or other type of event) to select which video channels are to be buffered at the handheld devices. As an example, the operator might select which camera angles should be buffered. In some embodiments, the head end automatically generates the recording table. For example, a operator of the head end may request that video channels that correspond to a particular participant in the event (e.g., a race car driver or football player) are to be buffered. The head end then automatically determines which video channels should be buffered to satisfy the operator's request. For example, pattern recognition or other image analysis can be used to automatically recognize an image of the participant (e.g., race care, player, etc,). Similarly, sound recognition software can be used to recognize certain sounds such as the sound of a buzzer, the crowd cheering, a car accident, etc. In some embodiments, the recording tables are generated based on user profiles. For example, demographic information corresponding to handheld users may be used to determine which video channels should be buffered at the handheld devices. Note that it is not required that each handheld device buffer the same set of video channels. Information can be included in the same wireless RF transmission that instructs different handheld devices to buffer different video channels. Thus, the same RF transmission might instruct the devices of fans of one team to buffer one set of video channels and the devices of fans of another team to buffer a different set of video channels.

In some embodiments, a handheld device has two sets of buffers. A first set of buffers always buffers a selected set of the latest video channels to arrive in the wireless RF transmission. A second set of buffers is used when the user enters a replay mode to replay the content of the buffers. The content of the first set of buffers is copied to the second set of buffers when the user requests replay mode. During replay mode, the content of the second buffers is frozen, but the content of the first buffers continues to receive new video.

In another set of embodiments that uses two sets of buffers in the handheld devices, a first set of buffers is used to buffer live video. When the user requests to view content in the first set of buffers, that first set of buffers is frozen so that no more live video is added and the newly received live video is then buffered in the second set of buffers. This allows the user to view the stored content without losing the ability to view the content received while reviewing the buffers. When the user later views the content in the second set of buffers, the second set of buffers become frozen and then the first set of buffers become unfrozen (i.e., released from being frozen) so that they can be used again used to store live content.

In one embodiment, a set of buffers in the handheld will have separate buffers for audio, video and data. For example, a system that buffers five video channels may have five audio buffers and five video buffers. The various buffers can be physically separate memory devices or partitions of the same physical device.

FIG. 1 illustrates an overall system architecture in accordance with a non-limiting example implementation. The system designated by the reference numeral 10 may be used at a live event such as a sporting event (or other type of event).

The system 10 delivers to spectators attending the live sporting event (or remote from the event) video, audio and data content. For clarity, embodiments can be used in connection with and/or during a wide variety of live sporting (or other types of) events. Accordingly, while the example implementations provided in this specification are made in connection with a car race or a football game, these examples should not be considered as a limiting feature.

As shown in FIG. 1, the system 10 includes a head end 12, a transmitter section 14(1)-14(n) and one or more handheld electronic devices 16. Each handheld device 16 may be used by a single spectator or multiple spectators. While a single handheld device 16 is shown, in most practical applications many (almost any number of) handheld electronic devices 16 can be accommodated. For instance, in a car race that may attract tens of thousands of attendees, the head end 12 and the transmitter 14 can support thousands of handheld electronic devices 16.

Transmitters 14(1)-14(n) section sends one or more wireless transmissions to the handheld devices 16. The transmitter section 14(1)-14(n) may include different transmitters that are capable of different types of wireless transmissions. For example, the transmission could be transmission on a "cellular" network. Some example cellular transmission types include, but are not limited to, Code Division Multiple Access (CDMA), Time Division Multiple Access (TDMA), and Groupe Station Mobile (GSM). The wireless transmission might also be Wireless Fidelity (WiFi) or Bluetooth signal. A transmitter 14 could also be UHF or any other wireless RF transmission. In one embodiment, the communication is a Radio Frequency (RF) communication. In one example, the RF transmission is unidirectional. In other words, the information flow is from the transmitter 14 to each handheld device 16. This is accomplished in the broadcast mode wherein each handheld device 16 receives the same information from the transmitter 14. In the unidirectional RF transmission, the handheld electronic devices 16 are unable to transmit information back to the transmitter 14 over the wireless RF communication link. In other examples, the wireless transmission between the head end and the handheld can be bi-directional so that the handheld can transmit information to the head end.

In one embodiment, the transmitters 14(i)-14(n) transmit the exact same signal. In other embodiments, the different transmitters 14(i)-14(n) transmit different signals. In one example, the different transmitters 14(i)-14(n) transmit the same payload (audio/video/data content), using different wireless transmission technologies. In another example, the different transmitters 14(i)-14(n) transmit different signals with different payloads to be received by different groups of handhelds.

In one non-limiting example of implementation, the wireless RF transmission is performed locally at the venue, meaning that the antenna(s) generating the wireless RF transmission originates either at the venue or outside the venue but generally close to the venue. The signal power level is also controlled such that the receivers on the handhelds 16 can adequately receive the wireless RF transmission at the venue, but at significant distances from the venue the signal weakens and may no longer permit a quality reception. By "significant" distance is meant a distance in terms of kilometer range.

In one embodiment, the head end can communicate with the handhelds using WiFi wireless networking technology. In other implementations, the handhelds will communicate with the head end using wired transmission for example, via the Internet, LAN, WAN or other communication means. In one example, the audio and video can be transmitted wireless, while t he recording table can be transmitted via the Internet when the handheld is physically connected to a LAN.

In another embodiment, the wireless transmission signal can be strong enough to be used by handheld devices far from the venue. For example, a strong RF signal can be used Alternatively, the output from the head end 12 can be transmitted to the handhelds using a cellular network so that many handhelds (e.g., cell phones) close and far away can participate.

In the case of bidirectional wireless communication, each handheld device 16 is able to receive information over a wireless communication link, and is also able to transmit information over a wireless communication link. In this case, the handheld device 16 is provided with an RF transceiver (FIG. 4, 99) that can handle the receive and transmit functions. The transmitted information may be sent to an entity of the system 10 (not shown), or to an entity that belongs to an external network. The handheld electronic devices 16 may be operable to transmit information over a wireless RF communication link, such as over a cellular link. In the case of a cellular link, the handheld electronic devices 16 would dial a phone number and then transmit information to the receiver/transceiver over the cellular link. Certain situations in which it may be preferable for the handheld electronic devices 16 to have bidirectional wireless communication capability will be described in more detail further on in the specification.

The bi-directional communication feature may be implemented to provide identical or similar bandwidths over the receive and transmit links. However, in most cases, this is not necessary since the amount of information that needs to be sent from the handheld device 16 is generally different from the amount of information that it needs to receive. Typically, the handheld device 16 needs to send far less information than that it receives. The implementation using the cellular network is an example that would provide a sufficient bandwidth over the transmit link. By "cellular" network it is meant a network that uses a series of cells having a limited geographical extent within which communication services are available. In one possible form of implementation, such cells can be arranged to provide a hand-off to moving handheld electronic devices 16, such that as a handheld device 16 moving outside a cell and entering a new cell, the communication services as seamlessly transferred from one cell infrastructure to another cell infrastructure. The "cellular" network terminology encompasses both communication infrastructures using licensed bandwidth, such as typical cellular telephones based on Code Division Multiple Access (CDMA), Time Division Multiple Access (TDMA), Groupe Station Mobile (GSM), or other technologies, and communication infrastructures using unlicensed bandwidth, such as Wireless Fidelity (WiFi) that is used commonly to provide wireless access to computer networks. Another possible example of a suitable technology is the so called "Bluetooth" protocol that provides very short range wireless communication capabilities.

The cellular link allows the handheld device 16 to transmit information over a relatively limited bandwidth; however, in most cases the amount of information that needs to be sent is low such that available bandwidth should suffice. On the other hand, the receive link has a higher bandwidth in order to accommodate the multiple video streams and the other data that is to be sent to the handheld device 16. Also the cellular link allows the handheld electronic devices 16 to transmit information independently from one another.

The head end 12 receives content that originates from various sources. The content can be formatted or edited before being input into the head end 12. In the example shown in FIG. 1, a number of content sources are shown, which for the purposes of illustration will be described in the context of a car race. There are multiple video feeds (or streams) 31 that originate from cameras along the racetrack or at locations adjacent to the racetrack such as the pits. The different cameras simultaneously capture different images (e.g., perspectives) of the same live sporting event and output the video information making up the respective video feeds 31. Multiple audio feeds (streams) 32 are also provided, where each audio feed 32 (or a subset of audio feeds) is associated with a video feed 31. An audio feed 32 conveys audio information such as the noise picked up by a microphone at a location at which the associated camera is placed, or an audio commentary. Such audio commentary can be the speech picked up by a microphone from a commentator or any individual that appears in one or more of the video feeds. Independent audio feeds 32 are also provided that convey independent audio content which is not associated with any particular video content. For instance those independent audio feeds 32 may be radio conversations between drivers and the pit crew. Such audio conversations are picked up by an array of radio scanners 15 each tuned to a particular frequency allocated to a given race team.

The audio and video data is typically supplied by the authority managing the live sporting event. For example, in the case of a car race, the video and audio data might by supplied by the National Association for Stock Car Racing (NASCAR). In a football game, the video and audio data might be supplied by the National Football League or a television station or Internet site that is covering the football game. In a further non-limiting example, the independent audio feeds that include audio commentary may be supplied by the commentator's affiliated television network.

The content sources also include real time data content 35. The real time data content 35 conveys information relating to the event. For example, the real time data content in the context of motor sports, such as a car race, can be time and ranking information, lap times, position of the various cars on the track, physiological information about a driver, among many others. The real time data content is typically also supplied by the authority managing the live sporting event. Example of real time data for a football game include time remaining score, box score information, players currently on the field, list of plays run by each team, etc. In some aspects, the real time data content 35 is used to determine which video channels to buffer in the handheld.

The video feeds 31 and the audio feeds 32 may be edited at a content production station 20. The content production station 20 provides a facility where an operator can format or edit the raw content to make it more suitable for presentation to the audience. The content production station 20 includes a console that allows the operator to conduct the necessary content editing operations. In the embodiment shown in FIG. 1, the head end 12 receives seven different inputs.

Examples of various inputs 100-700 will now be described. Note that the inputs 100-700 may some from a wide variety of sources. It is not required that the inputs 100-700 come from the same source. The first input, designated by reference numeral 100 includes the multiple edited or unedited video feeds that may be transmitted according to a Serial Digital Interface (SDI) format, or another format. Note that the video feeds might come from different sources. For example, some video feeds might come from a national television network that is covering a football game, others might come from a local television network covering the football game, and still others might come from a television network that is covering a different football game. The second input 200 includes the multiple edited or unedited audio feeds 32 that are associated with respective video feeds 31. The third input 300 includes the independent audio feeds 33. As indicated earlier, an independent audio feed 33 may convey voice conversations, audio commentaries, etc. . . . , picked up by a radio scanner 15 or other type of sensor.

The fourth input 400 includes the real time data content 35 that may be transmitted digitally to the head end 12. In one non-limiting example, the real-time data content includes information relating to the live sporting event, such as for example scoring and participant ranking information, among others. In the specific example of a car racing event, the real-time information can include: the current ranking (e.g., first place, second place, etc.), number of laps remaining, participants still in the race, participants no longer in the race, fastest lap of the current leader or of anyone of the participants, average speed of the current leader or of anyone of the participants, present speed of any one of the participants, Revolutions Per Minute (RPM) of the engine of anyone of the participants, or the engaged gear in the transmission of any one of the participants. In the context of a football game the real-time data may include, but is not limited to, the present score, the time remaining, penalties, number of time outs left, plays run, participants on the field, current down and distance to go for a first down.

The fifth input 500 includes authentication data received from an authentication database 502. The sixth input 600 includes ancillary content that is output from an ancillary information database 602. The ancillary content 600 can be in the form of video, audio or data, such as text for display to the spectator. Examples of ancillary content includes, advertisement content, venue or event related contextual content, news, weather, and shopping information.

The ancillary content 600 can be obtained from a wide variety of sources. The advertisement, shopping, venue or event related information can be recorded on any suitable medium and injected in the video/audio content at the head end 12. Specifically, the advertisement, shopping, venue or event related information could be digitally stored on a database 602. The output of the database 602 leads to the head end 12 such that the video/audio content in the database 602 can be injected in the video/audio content that is being broadcast to the handheld electronic devices 16. The Internet is another source of ancillary content. Specifically, the news service can be delivered from the internet and injected in the video/audio content that is being broadcast to the handheld electronic devices 16.

The seventh input 700 includes service data. The service data resides in a database 702. This database can also connect to the Internet to obtain updates or program releases that may not be available prior the beginning of the event being serviced by the system 10. An example of service data includes, but is not limited to, data for setting the software running each handheld device 16. For example, the service data may be used to upload an entirely new or portions of a Graphical User Interface (GUI) to the handheld electronic devices 16 in order to customize the handheld electronic devices 16 for the event.

Figure 2:
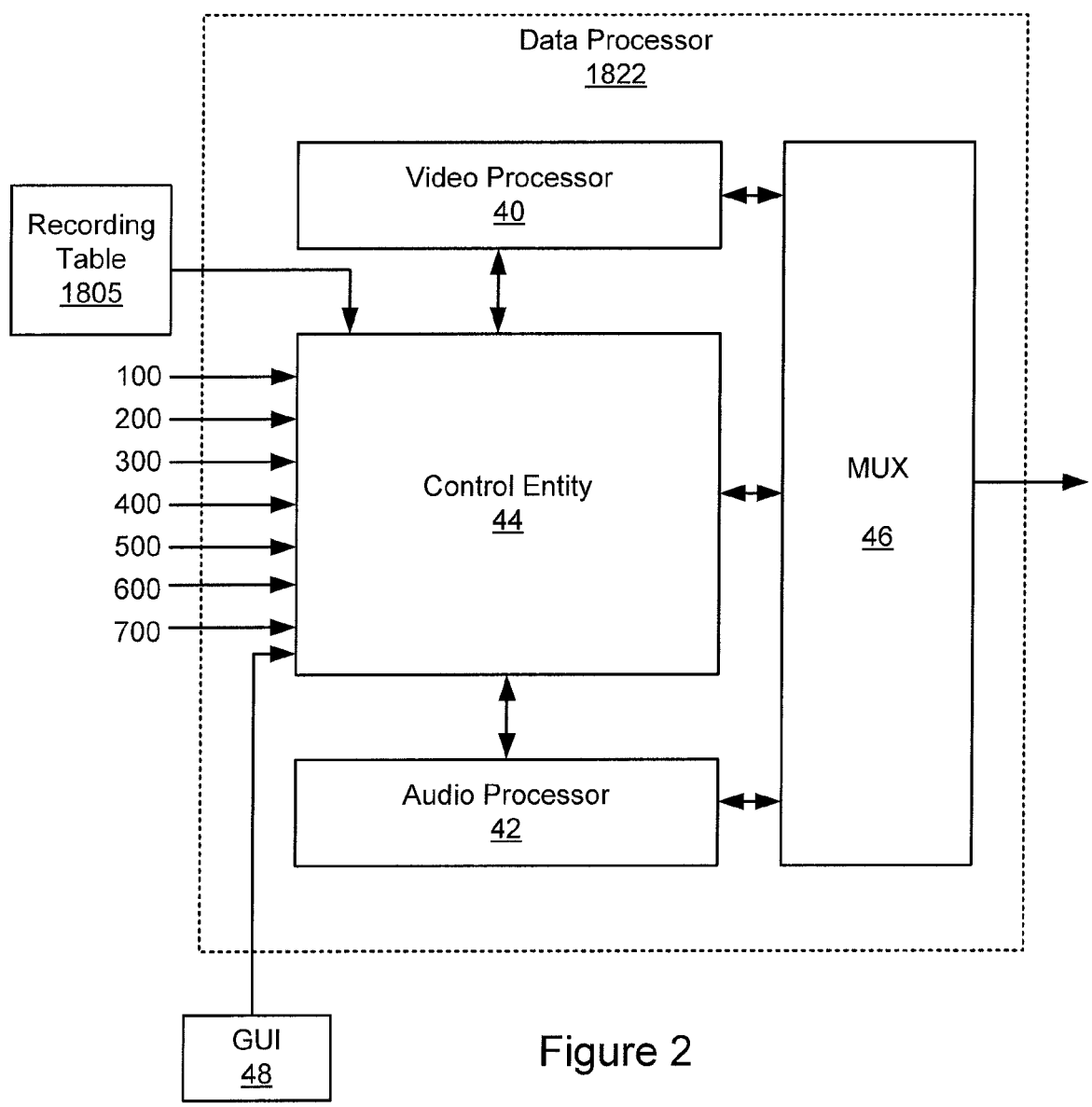
FIG. 2 is a detailed block diagram of one embodiment of a data processor.

The head end 12 includes a recording table generator 1801 that generates a recording table 1805. The recording table 1805 indicates which video streams, audio streams, or other data should be buffered at the handheld device 16. The recording table 1805 is input to the data processor 1822. FIG. 2 shows a more detailed block diagram of one embodiment of the data processor 1822 of the head end 12. The head end 12 organizes the data from the various inputs into a structured information stream for broadcasting to the individual handheld electronic devices 16. In one embodiment, all of the video, audio and data (including the recording table) are transmitted to the handhelds in a single RF transmission/signal. Note that it is not required that all of the data be transmitted in the same RF transmission. For example, the video, audio, and data can be sent in different wireless transmissions. For example, the video might be sent in one wireless transmission and the separate audio streams sent in a different wireless transmission. The head end 12 includes a video processor 40, an audio processor 42, a control entity 44 and a multiplexer 46. The control entity 44 may also be implemented using a computer running one or more software programs to carry out various tasks. While not shown in the drawings, the computer(s) include a processor, memory to hold the program code and data that is being processed by the processor. In addition, the computer(s) have a Graphical User Interface (GUI) 48 that provides an operator with the ability to send commands to the control entity 44 or to receive information therefrom. The GUI 48 can take various forms. For instance, the GUI 48 can include a display on which information is shown to the operator and a keyboard and mouse combination for data and commands entry. In one aspect, the GUI 48 is used by an operator to enter information that is used to determine (directly or indirectly) which video channels to buffer.

In some implementations, the video processor 40, audio processor 42 and/or MUX 46 are implemented by a software program or set of software programs that execute on one or more processors. In some implementations, the control entity 44 is implemented at least in part with hardware. For example, an application specific circuit (ASIC) may be used to implement the control entity 44. The video processor 40, audio processor 42, and MUX 46 may also be implemented with an ASIC, custom integrated circuit or other hardware. Video processor 40 and audio processor 42 can also be implemented using microprocessors known in the art. In some embodiments, video processor 40, audio processor 42, control entity 44 and mux 46 can be implemented as separate computers, each having their own microprocessor. In other embodiments, two or more of the components can be implemented on a common computer.

Control entity 44 receives the recording table 1805 such that it may pass it to the MUX to insert into the RF transmission with other information (100, 200, 300, 400, 500, 600, 700). Some of the information (e.g., video feeds 100, audio feeds 200) may be directed to the appropriate encoders for processing. For example, all the video feeds that are received at the first input of the control entity 44 are switched to a video processor 40 that will convert the SDI format (or other format) into Moving Picture Experts Group (MPEG)-4 format. Note that the video processor 40 could convert the input video into a format other than MPEG-4. Each video stream may be compressed to provide at the handheld electronic device a moving image at 30 Frames per second (fps), 16 bit colors at a 480×272 pixels resolution (or other resolution). In one example, the resulting bit rate may be 384 Kbits/sec. However, other frame rates, bit rates, and resolutions could be used. Since the video processor 40 may handle multiple video feeds simultaneously it may be designed in order to be able to process those feeds in parallel. One implementation uses a plurality of encoder stations, each being assigned a video feed 31. The encoder stations can be based on dedicated video processing chips or purely on software, or a combination of both. Alternatively, the video processor 40 can use a single processing module with buffering capabilities to sequentially handle blocks of data from different video feeds 31. With an adequate size buffer and a processing module that is fast enough, all the video feeds 31 can be encoded without causing loss of data.

In a non-limiting example of implementation, the encoder stations of the video processor 40 are operative to encode "bookmarks" data into the video feeds. The "bookmarks" data acts as pointers to specific portions of the video feed. Generally, these pointers are included to mark portions of the video feed that might be of interest to a spectator of the handheld device 16 to view or may be starting/stopping points for buffering.

For example, if the live sporting event is a car race, and one of the video feeds includes footage of a car crash, the encoder that is formatting that video feed 31 may include a "bookmark" data that points to the location in the video feed where the car crash commenced. As such, when the video feed is sent to the handheld device 16, the spectator is informed that there is a bookmark associated with the car crash, and by selecting the bookmark, the handheld device 16 presents the video feed starting at the portion pointed to by the "bookmark" data. As such, the handheld device 16 will display the specific portions of the video that relate to the car crash. This feature is particularly useful when the handheld device 16 has video playback capabilities, hence the spectator can play back the video content and use the bookmarks as reference to find events of interest. Other examples where a bookmark may be used include a football event. Bookmark data can be placed in the video feed when a touchdown occurs, such that the spectator can easily locate the salient parts of the game. The decision to place bookmark data in a video feed may be taken by the individual that manages the head end 12 or any other person that has content editing responsibilities. The bookmark data may be generated by the head end 12 in response to input from the operator on the user interface 48.

Note that since MPEG-4 encoding also handles audio, the audio feeds 32 that are associated with the respective video feeds 31 are also directed to the video processor 40. In one aspect, the output of the video processor 40 is thus MPEG-4 encoded video channels where each channel has a video stream portion and an audio stream portion.

The independent audio feeds 33 that are received at the third input 300 are directed to an audio processor 42 that may encode them into a Moving Pictures Experts Group Audio layer 3 (MP3) format, or another suitable format. Since the MP3 encoded video feed 31 convey voice information they can be compressed into an 8 Kbits/sec data rate while maintaining adequate quality. As in the case with the video processor 40, the audio processor 42 may use a series of audio encoding stations, each dedicated to a given audio feed (from the second input and the third input). Alternatively, the audio processor 42 can use a single sufficiently fast encoding module having buffering capabilities to sequentially handle data blocks from all the audio feeds 32.

The control entity 44 handles the processing of the fourth, fifth, sixth and seventh inputs, namely the real time data, the authentication data, the ancillary content and the service data. The purpose of the processing is to packetize the data such that it can be transmitted to the individual handheld electronic devices 16.

In one embodiment, the outputs of the control entity 44 and the video and the audio processors 40 and 42, are passed to a multiplexer 46 that combines the data into one common data stream. For example, time multiplexing can be used. The data stream is then directed to a transmitter 14 that produces a single wireless RF transmission broadcasting the information to the individual handheld devices 16. The transmitter 14 can be designed to use a single 6 MHz contiguous channel bandwidth to broadcast the entire payload to the handheld electronic devices 16. The bandwidth might also be 7 MHz, 8 MHz or another bandwidth. Note that it is not required that the data be sent in a contiguous channel bandwidth. For example, the video and audio may be sent in non-contiguous channels of the same type of RF transmission. However, note that it is not required that the video, audio, and data be sent in the same type of RF transmission. As an example, the video channels might be sent in 6 MHz channel (or some other bandwidth) with other data (e.g., separate audio channels, the recording table, or other data) being sent in a Wi-Fi transmission or cellular transmission. Note that video, audio, and other data may be sent in more than two different types of wireless transmissions.

As mentioned, the data stream may be compliant with the MPEG-4 protocol, but that is not required. In some aspects, the data stream has a digital container format that encapsulates packetized elementary streams and other data. In some aspects, a packet is the basic unit of data in the transport stream. As an example, a packet could be 188 bytes in length; however packets can include more or fewer bytes depending on the protocol in use. Each packet may include a Packet Identifier (PID), which in some implementations is a 13-bit value. In some aspects, each video stream is an elementary stream that is broken into a number of packets. Each of the packets in an elementary video stream may be given the same PID. Therefore, when the handheld device receives the RF transmission, the device may extract a certain video stream by looking for packets with a certain PID. An audio stream may also constitute an elementary stream in which all packets of a given audio stream are assigned the same PID. Packets associated with data other than video and audio may also have PIDs. For example, real-time data that describes a play-by-play in a football game can be packetized. The real-time data might have any number of formats, including but not limited to, HTML, XML, streamed data tables, and JavaScript code.

The transport stream may include one or more programs. As an example, a program could correspond to a video channel and might include a video stream, one or more audio streams, and possibly metadata. Note that there may be a different PID associated with the video stream, each audio stream, and the metadata. Therefore, there may be more than one PID associated with a given program. Alternatively, the same PID can be used with each component of the video channel or program. The transport stream may have a Program Association Table (PAT), which identifies all of the programs available in the transport stream. The transport stream may also have many Program Map Tables (PMT), each of which includes information about one of the programs in the transport stream.

The transport stream may include a Program Clock Reference (PCR), which allows the receivers to synchronize content from different packets. For example, the PCR can be used to synchronize elementary streams. Thus, the PCR can be used to synchronize the video and audio streams of the same video channel. Also note that when multiple camera angles of the same scene are transmitted, the PCR can be used to synchronize video streams from different cameras. The transport stream may also include null packets to ensure that the transport stream maintains a constant bit rate.

The table below provides an example of a payload showing different video feeds, audio feeds, and other data that may be sent. Note that the example payload represents the content of many different packets, each of which might include about 184 bytes of the payload.

| Description | Required unit bit rate | Number of feeds | Aggregated bit rate |
|---|---|---|---|
| Live video feeds, 480 × 272 pixels, 16 bit colors, 30 Fps (MPEG-4) | 384 Kbits/s each | 10 | 3.84 Mbits/s |
| Audio feeds (synchronized with video feeds-MP3) | 28.8 Kbits/s each | 10 | 288 Kbits/sec. |
| Independent voice grade compressed audio feeds (MP3) | 8 Kbits/s each | 48 | 384 Kbits/sec. |
| Real time data - 6,000 ASCII Characters (or equivalent data payload) of high priority refresh | 480 Kbits/s each | 1 | 480 Kbits/sec. |
| Ancillary content and service data, (several priority refresh levels) | 1 Mbits/s | 1 | 1 Mbits/sec. |
| Authentication data | 256 bits/30 sec. | 50,000 | 425 Kbits/sec. |
| Spare | | | ≈1 Mbits/sec. |
| Overall payload | | | 7.5 Mbits |

In one embodiment, the control entity 44 sends information to the handheld devices that identify which of the video channels should be buffered. In one embodiment, the control entity 44 sends commands to the handheld electronic devices that tell the handheld devices whether to buffer only the video stream or both the audio and the video stream of a video channel. These commands may be inserted into the wireless RF transmission. As an example, the commands can be included in the real time data or the ancillary content in the example payload. In some embodiments, the commands are implemented as a recording table described below.

Note that it is not required that commands from the head end cause each of the handheld devices to respond in the same manner. For example, one spectator at a football game might be very interested in the home team, whereas another spectator might be very interested in the visiting team. A command to buffer a given video channel might also indicate which team the channel is most closely associated with. For example, a touchdown pass for the home team may be of more interest to a fan of the home team than to a fan of the visiting team. The spectator's handheld device may have user profile information that explicitly or implicitly indicates that the spectator is more interested in the home team. For example, the user's address may indicate affiliation with the home team or the user may have filled out a questionnaire indicating interest in the home team. Thus, the handheld device can automatically select which video to buffer based on the commands and the user profile.

In one embodiment, an operator uses GUI 48 of the control entity to indicate which video channels should be buffered. Note that the subset of video channels that are to be buffered may change dynamically during the game in response to the operator changing GUI 48. For example, at the start of the game, the operator at the head end may choose for a first set of video channels (video with audio, or only video) to be buffered by the handhelds and later on during the game the operator may choose for a second set of video channels to be buffered by the handhelds, with the first set being different than the second set. The handhelds will buffer in response to the operator's selection in the GUI.

Figure 3A:
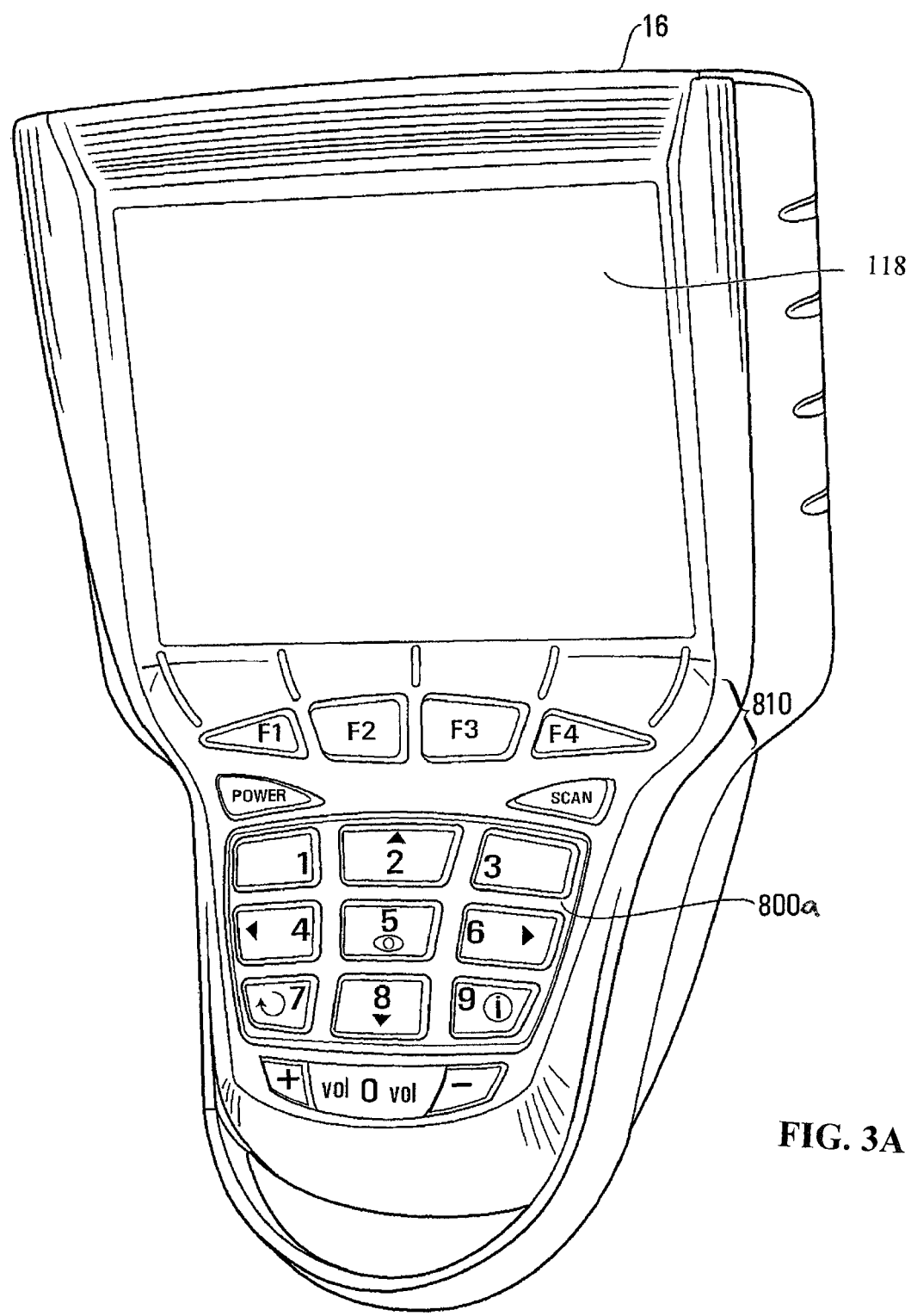
FIG. 3A is a perspective view of an example handheld electronic device.

FIG. 3A shows a perspective view of one embodiment of a handheld device 16. The handheld device 16 is an electronic computing device designed to fit comfortably in the spectator's hand. It includes a keyboard 800*a* with the necessary keys to control the operation of the handheld device 16, including controlling video playback and the ability to access buffered audio/video/data. Above the keyboard 800*a* is provided a display section in which is placed a display screen 118.

Figure 3B:
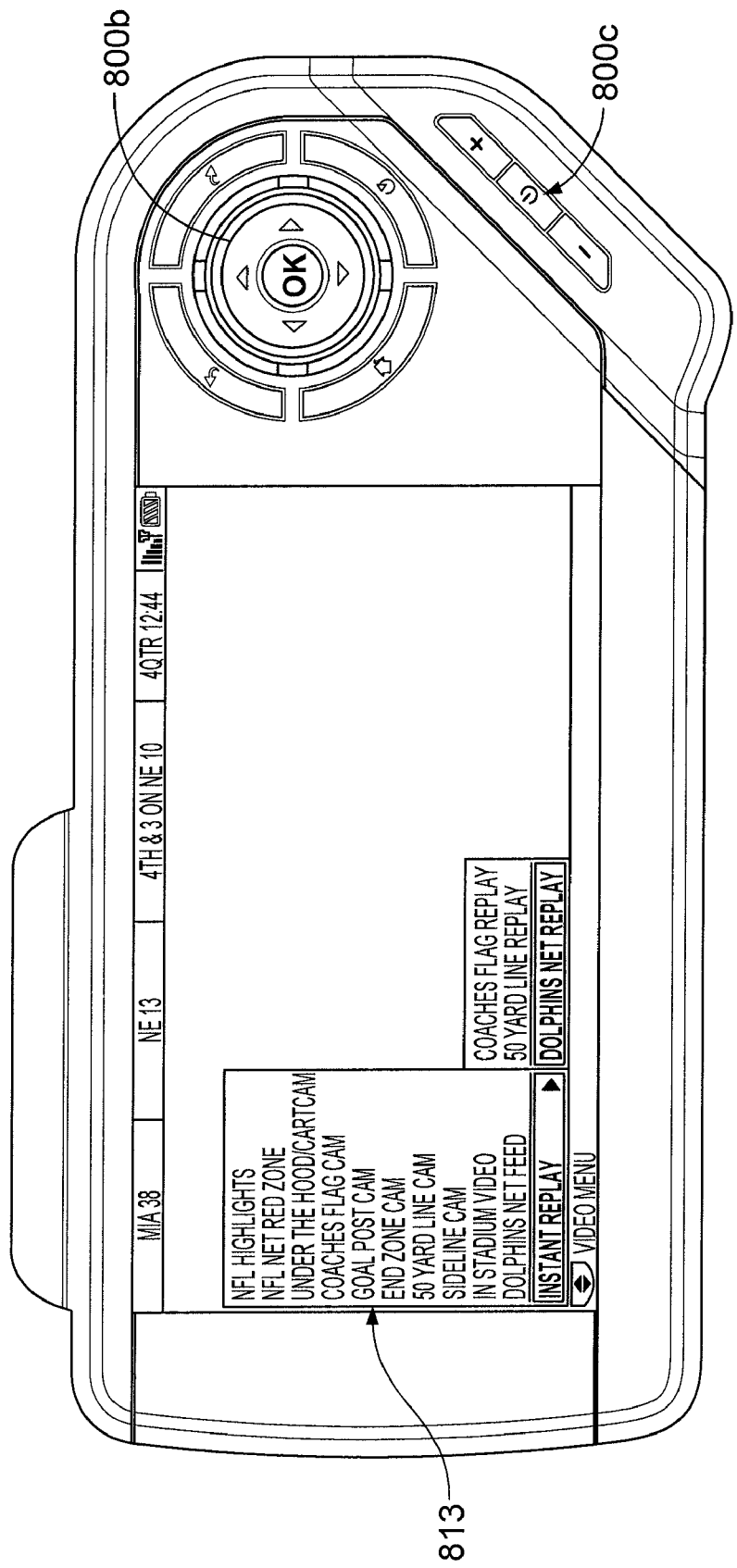
FIG. 3B is an illustration of an example handheld electronic device.

FIG. 3B is an illustration of another embodiment of a handheld device 16. The handheld device 16 of FIG. 3B includes a user input keys 800*b*, which allow the user to control the playback of video on the display screen 118, access buffered audio/video/data, and provide other user input. The display screen is currently showing a menu that allows the user to select different video steams for viewing. For example, a user at a football game could select to watch a video channel from an end-zone camera, a 50-yard line camera, a goal post camera, etc. User input keys 800*c* may be used to select which video channel from the menu to display, as well as other functions.

In some embodiments, the different video channels are buffered so that the user can replay the content of a video buffer. For example, the user input keys 800*b* may be used to rewind, fast forward, pause, play, slow step, etc. through the content of the video buffer. Note that in some embodiments, the video buffers store different camera angles of the same action. For example, at least some of the video buffers might include different camera angles associated with a replay challenge in a football game. Thus, the user can replay the different camera angles while the replay challenge is taking place to decide for themselves which team should win the challenge.

Figure 4:
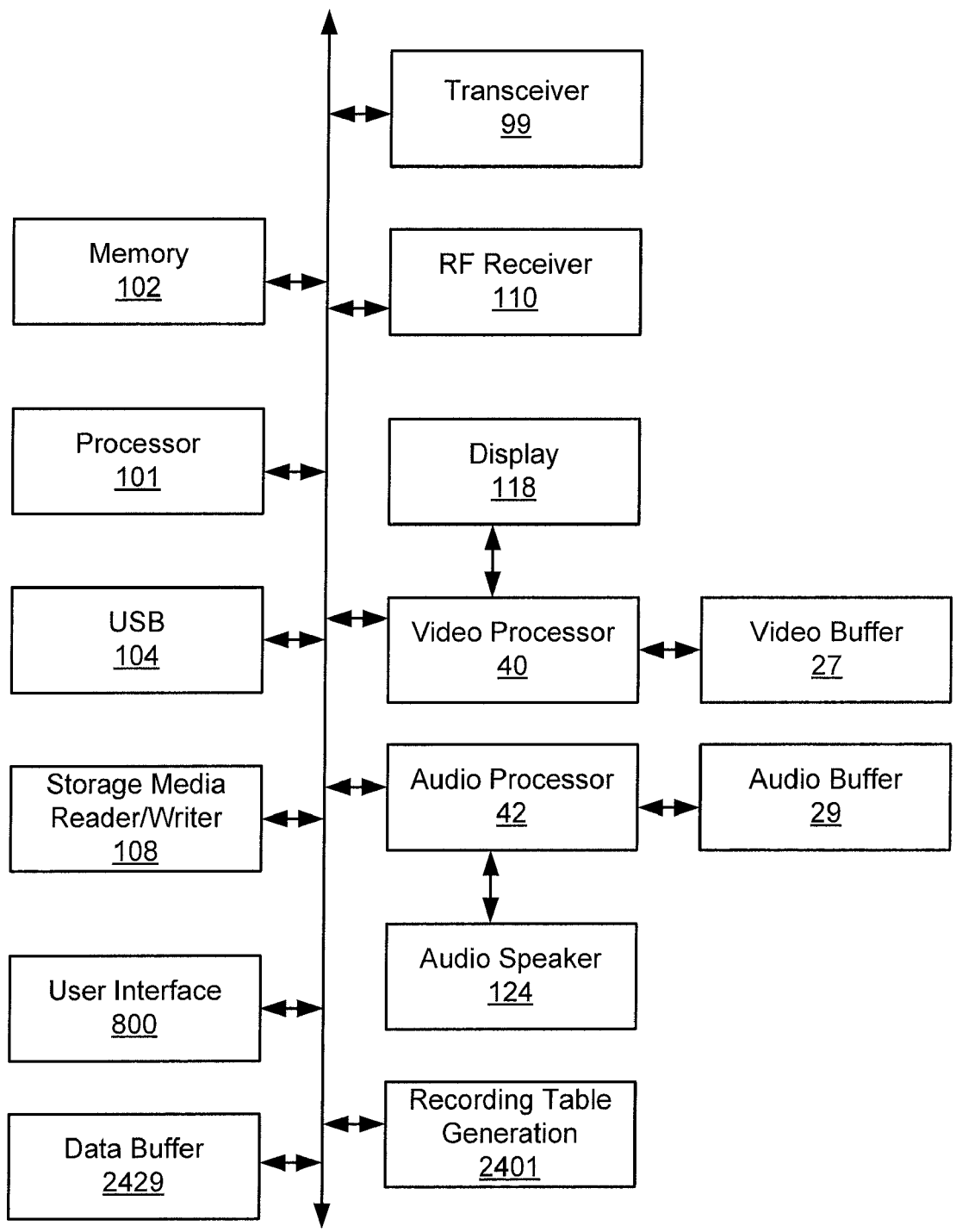
FIG. 4 is a block diagram of one embodiment of a handheld electronic device.

FIG. 4 is a block diagram of one embodiment of a platform that may be used to implement handheld device 16. The handheld device 16 may be a computer-based device that receives the information sent by the transmitter 14. The video information is displayed on the display screen 118 and the audio information is presented via suitable speaker/headphones 124. The spectator can control the selection of the video channels as well as to perform other operations. By video channel at the handheld device 16, it is meant a combination video stream and an associated audio stream, or just a video stream.

Handheld device 16 has a processor 101 that executes software for controlling the various functions of the handheld device 16. In a non-limiting example of implementation, the data for setting the GUI in the handheld device 16 is sent wirelessly from the transmitter 14 that is used to send the wireless RF transmission conveying the payload. In one possible example, the data for effecting the GUI setting is sent during a window of operation that precedes the beginning of the transmission of the video streams. For instance, in the context of motor sports, such as a car race, this can be done before the race event starts. In a second example, the data for setting the GUI is sent along the other payload. As far as the handheld device 16 is concerned, after the data for configuring the GUI is received it is loaded such that the spectator will be presented with the new GUI. When an authentication process is required to allow the handheld device 16 to access the video streams, as will be described later, the actual loading of the new GUI can be deferred until the authentication has been completed. In a specific and non-limiting example implementation, a LINUX kernel is used to provide common core services, such as memory management, task scheduling and user interfacing, among others. Another other operating system could be used. Software embedded into hardware to control the hardware. For instance, the algorithms to decode the video and audio information broadcasted by the transmitter can be implemented in hardware, software, and firmware.

The software is stored in a general-purpose memory 102, which may also be referred to as a computer readable storage device. The memory 102 may include a Read Only Memory (ROM) portion that includes data intended to be permanently retained such as the program code that the processor 101 executes. In addition, the memory 102 may also includes a Random Access Memory (RAM) portion that temporarily holds data to be processed. The memory 102 can be implemented as a single unit, for instance as a semiconductor-based module or may include a combination of a semiconductor-based module and a mass-storage device, such as a hard-drive. A computer readable storage device can be any available storage device that can be accessed by the electronic device. Computer readable storage device includes volatile and nonvolatile, removable and non-removable media implemented in any method or technology for storage of information such as computer readable instructions, data structures, program modules or other data. Computer readable storage devices include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other storage device which can be used to store the computer readable instructions and which can accessed by the electronic devices.

A Universal Serial Bus 104 (USB) port is provided to allow the handheld device 16 to connect to external devices. Specifically, the USB port 104 allows linking the handheld device 16 to a computer that can either download information from the handheld device 16 or upload data to it. For instance, the download process may be used when desired to transfer data stored in the memory 102 to the external computer. Similarly, the upload process is used to perform the reverse operation. This is useful when desired, for example, to change the program running the handheld device 16, by installing one or more updates. The USB port 104 requires a suitable driver that is loaded and executed by the processor 101 when the handheld device 16 is powered up. In another embodiment, the handheld device can include a network interface so that it may communicate on a LAN in order to access the Internet or other network.

A removable storage media reader/writer 106 is provided to allow the handheld device 16 to read data or write data on a removable storage media such as a memory card. This feature can be used to permanently record event-related content that is sent to the handheld device 16. Note that the device can also create recordings on computer readable media that is not necessarily removable. For example, at least a portion of the memory 102 could be internal flash memory, a storage drive, etc.

User interface 800 allows the spectator to control the operation of the handheld device 16. The user interface may be a keypad 800*a*, as depicted in the example of FIG. 3A. The number and type of keys forming the keypad 800*a* is a matter of choice depending upon the specific application. As a possible variant, a touch sensitive screen or a voice recognition capability can be used to replace the keypad 800*a* or in combination with the keypad 800*a* as a means for command and data entry by the spectator. Note that in the embodiment of FIG. 3B, rather than a keypad 800*a*, there are user input keys 800*b*, 800*c*.

The handheld device 16 has a wireless RF receiver and demodulator 110 that senses the wireless RF transmission, demodulates it and delivers it as properly organized and formatted data blocks to a data bus 112. The data thus sent over the data bus 112 is made available to the memory 102, the processor 100, the USB port 104 and the removable storage media reader/writer 106. In a specific example of implementation, the wireless RF receiver and demodulator 110 operates in the Ultra High Frequency (UHF) range, specifically in the sub range of 470 MHz to 806 MHz. A 6 MHz contiguous bandwidth (equivalent to one regular TV channel) is sufficient to transmit the exemplary payload indicated earlier. Alternatively, the transmission may also be made in the 2.5 GHz range or another range. Thus, the device 16 is not limited to any particular frequency range. As discussed, in one embodiment, the wireless RF receiver includes only one tuner mechanism that is permanently tuned to one frequency. The signal received at that frequency includes the various video channels, which are extracted and communicated to the memory 102, the processor 100, the USB port 104 and the removable storage media reader/writer 106 for processing as described herein. For purposes of this document, a tuner a component (e.g., electrical circuit) which passes one radio frequency, or band of frequencies, and excludes others. A tuner performs the process of selecting the desired signal. In some embodiments, a tuner is adjustable. In other embodiments, a tuner is not adjustable.

The handheld device 16 has a transceiver 99 that is capable of bi-directional communication. For example, the transceiver 99 may be able to communicate over a cellular telephone network so that handheld 16 receives the video channels and recording table over the cellular network. In some implementations of such an embodiment, transceiver 99 may include a single tuner that receives the appropriate single cellular signal. Handheld 16 can be, or include, a cellular telephone or other mobile computing device. In one embodiment, the transceiver 99 communicates over a WiFi network.

Video processor 40 may include a video decoder to perform the decoding of the video channels received from the wireless RF receiver and demodulator 110. For clarity it should be mentioned that while the specification refers to the decoder as "video" decoder it also performs audio decoding on the audio information associated with the video streams. The video processor 40 has a memory 27 in the form of a buffer that will hold undecoded video/audio information representing a certain duration of video channel presentation. For instance the size of the buffer may be selected such that it holds 5 minutes of video channel presentation, for each channel or a subset of channels (as per the recording table). In use, the video/audio information not yet decoded that is received from the wireless RF receiver and demodulator 110 is sent over the data bus 112 to the video processor 40. The video processor 40 decodes the video/audio information and then directs it to a display screen 118 to be viewed by the spectator. At the same time the undecoded video/audio information is directed to the memory buffer 27 that starts to fill. When the memory buffer 27 is completely filled, it starts overflowing such that only the last "n" minutes of the video channel are retained. The same operation may be performed on every video channel, with the exception that only the video channel the spectator wants to watch is being decoded and directed to the display screen 118. Accordingly, the memory buffer 27 is segmented in the functional sense into partitions, where each partition is associated with a different video channel. In other embodiments, video buffer 27 can include multiple memory chips, with each memory chip buffering a different video stream. Note that it is not required that every video channel be buffered at all times. In some implementations, the head end provides information (e.g., recording table, or other type of information) that informs the handheld device which video channels should be buffered. In some embodiments, the determination of which video channels to buffer is made at the handheld device 16.

The audio stream that is associated with the video channel being watched is decoded, converted into an analog format, amplified and directed to speaker/headphones 124 such that the spectator can watch the video stream on the display screen 118 and hear the audio simultaneously.

The ability to retain the last "n" minutes of video channel provides the spectator with interesting possibilities. For instance, the spectator can manipulate the data in the memory buffer 27 so as to "playback" a certain video channel content, create fast forward motion, "rewind" motion and record the video/audio information in the memory buffer 27, either in part or the entire content by copying it on a storage media in the removable storage media reader/writer 106. In this fashion, the video/audio information of interest to the spectator can be permanently retained. Moreover, the spectator can see any action that may have been missed by switching channels and then "rewinding" the content of the memory buffer 27 associated with the newly selected channel.

The recording table generation module 2401 in handheld 16 is capable of generating recording tables that define which video streams are to be buffered in the video buffer 27 and/or which audio streams are to be buffered in audio buffer 29. In one embodiment, audio buffer 29 is partitioned into multiple buffers for separately buffering different audio streams. There is also a data buffer 2429 for buffering data other than video and audio from the RF transmission.

In addition, the spectator can create "bookmarks" to identify a portion of a video feed that they may wish to revisit. A "bookmark" marks a location in the video stream. For instance a "bookmark" can be in the form of a pointer to a specific address of a video feed stored in either the buffer, or stored in the storage media reader/writer 106. When accessing a bookmark it thus suffices to present the video content starting from the address to which the bookmark points to.

Such "bookmarks" may be created by a spectator by selecting an option provided in one of the GUI menus of the user interface. The spectator navigates the menu by operating keys on the keyboard. Those keys may be arrow keys or any other suitable keys. When a selection has been made, the choice or option can be activated by pressing any suitable key such as an "enter" key.

The ability of the spectator to create bookmarks can be used in replacement or in conjunction of the bookmark generation done at the head end 12 and conveyed in the wireless RF transmission. Those bookmarks function in a similar fashion as the bookmarks created by the spectator. When data that represents a bookmark is observed in the information conveyed in the wireless RF transmission, a bookmark is created and stored with the remaining bookmarks.

In some embodiments, memory buffer 27 is in the form of a semiconductor based memory (e.g., RAM, flash memory, etc.). In applications where large memory capacity is required in order to store a large video content, a storage device such as a hard drive can be used. As mentioned, buffer can be one large memory chip, or multiple chips.

The display screen 118 can be of any suitable type. One possibility is to use a 4.2 in diagonal transreflective Thin Film Transistor (TFT) screen capable of rendering 480×272 pixel resolution images with 16 bit color depth. Other display types can be used. Optionally, the handheld device 16 can be provided with a lighting system (not shown in the drawings) using Light Emitting Diodes (LEDs) to facilitate viewing under low light level conditions. The display screen could also be a liquid crystal display (LCD). In some embodiments, the display screen 118 also serves as a user input. For example, the display screen 118 may be touch sensitive such that the user can select a menu item simply be touching with a finger or other object. In one embodiment, the user can slide a finger over the video to command handheld 16 to rewind or fast forward the video.

The audio processor 42 may have an audio decoder that functions in a somewhat similar manner to the video decoder. Specifically, the audio decoder is associated with an audio memory buffer 29 and it handles the audio streams conveying the audio information from the independent audio feeds 32 (independent audio streams). The independent audio streams may be stored in a compressed format in the audio memory buffer 29 so as to record a predetermined period of the audio content that is received.

By storing the audio content received by the handheld device 16 over a time period determined by the capacity of the audio memory buffer 29, the spectator is provided with the ability to "playback" the audio content, create "fast-forward", "rewind" and bookmarks. In addition, the audio information in the audio memory buffer 29 can be recorded either in part or in its entirety by copying the content on a storage media in the removable storage media reader/writer 106. Bookmarks, as described above, can also be created for audio information.

The functionality of the handheld device 16 will now be discussed in more detail.

Video Stream Reception and Related Functions

Assuming that the authentication process has been successfully passed, the graphical and navigational layer is loaded in handheld 16 and the user interface that allows the spectator to access the various functions is presented on the display screen 118. Typically, the user interface presents a menu that will show a set of choices. The spectator navigates the menu by operating keys on the keyboard. Those keys may be arrow keys, keys with symbols, keys with words printed thereon, keys associated with letters, or any other suitable keys. When a selection has been made the choice or option is activated by pressing any suitable key such as an "enter" key.

The spectator can watch a video channel by selecting an item in a menu. The menu hierarchy may be designed so as to display the set of the possible video channels that the spectator can watch onscreen. In one embodiment, the menu allows the user to access (e.g., replay) content that is stored in a memory buffer. The handheld electronic device software will instruct the video processor 40 to start decoding the appropriate channel. The decoded video information will be directed to the screen 118 and it will be displayed to the spectator. At the same time the audio output is presented by the speaker/headphones 124. At any time the spectator can invoke the graphical interface to either stop the video watching or switch to a different video channel. In one embodiment, one key on the handheld can be a replay hotkey, that when pressed causes the handheld to access content in one of the buffers or to show a menu for accessing content in the buffers.

The spectator can choose to see data content that is overlaid on the screen of the handheld device 16. In one non-limiting example, the real-time data content includes information relating to the live sporting event, such as for example scoring and participant ranking information, among others. In the specific example of a car racing event, the real-time information can include the current ranking, number of laps remaining, participants still in the race, participants no longer in the race, fastest lap of the current leader or of anyone of the participants, average speed of the current leader or of anyone of the participants, among others.

In one aspect, each video channel is provided with associated data content. A video channel specific data content may include the name and other identification information associated with the race team or car being watched, current standing, best lap time, among others. When the amount of information to be displayed is relatively small, it may appear as a static overlay in contrast to a "ticker" approach. The data in the static overlay is changed only when necessary to update it. When buffering a video channel with associated data content, the video content may be stored in a video buffer and the associated data content may be stored in a different buffer. However, information is stored to indicate the association, such that when the user replays the video content, the associated data may be overlaid onto the video.

With video channel specific data content, it is useful to structure the data content that is being broadcast in a way that creates a logical association with the respective video feed 31. For instance, the data that is carried into the data packets being broadcast can be grouped into blocks, each being associated with a given video channel. Additional blocks may be provided that correspond to the data that may be shared by all the video channels or a subset of the video channels. When such an association is created the video channel specific data content can automatically be shown in the overlay as soon as the video channel is selected for viewing.

Figure 6:
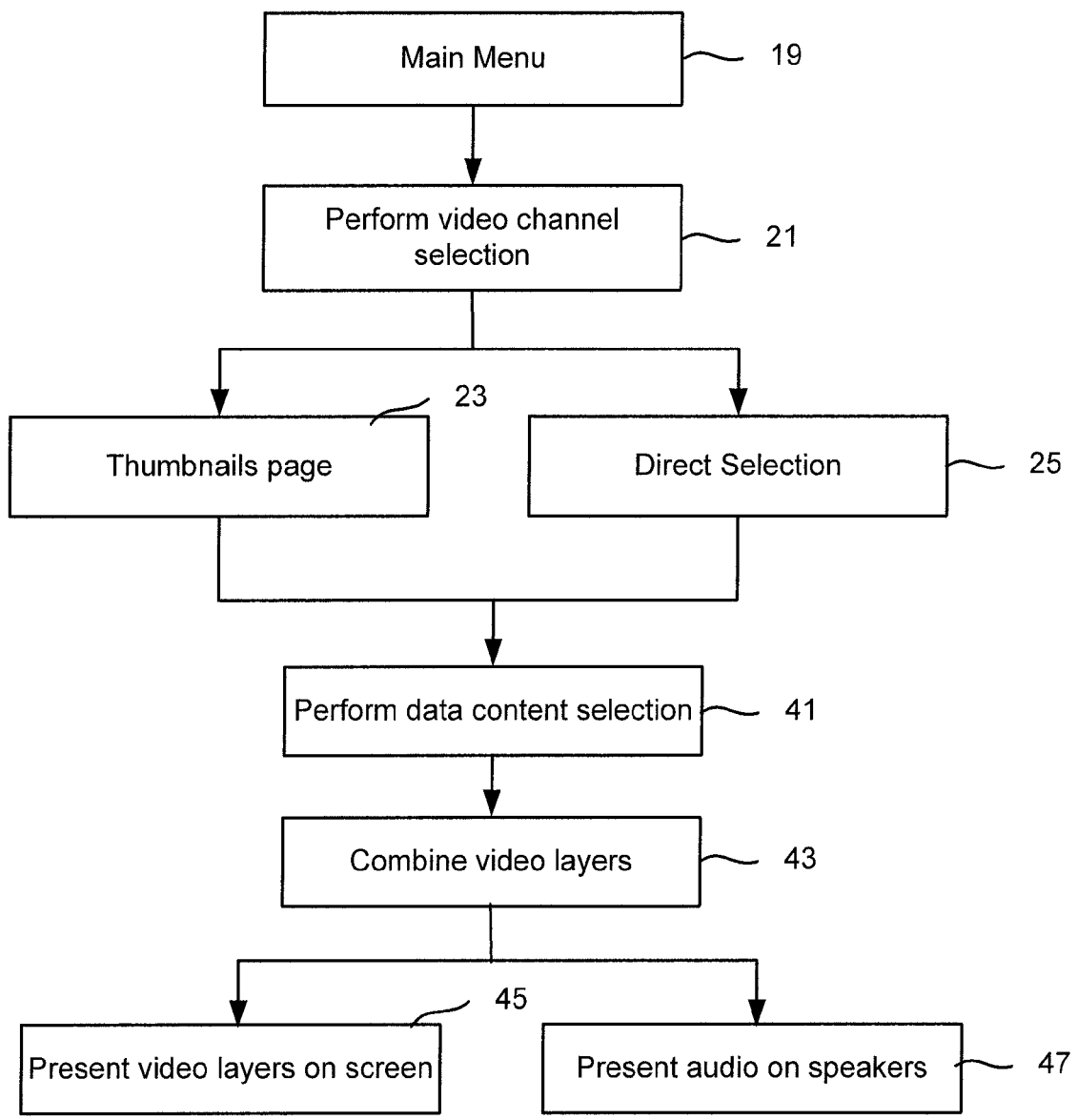
FIG. 6 is a flow chart illustrating one embodiment of a video viewing process.

The flowchart in FIG. 6 summarizes the video viewing process. The spectator accesses the main menu 19 from which he/she navigates to the video channel selection commands 21. Those commands can be grouped into thumbnail page commands 23, or direct selection commands 25. The thumbnail page commands allow the spectator to view real-time video channels in thumbnail size and to select one for full screen viewing. The direct selection command allows the spectator to directly specify the video channel for full screen viewing. As previously mentioned, a video channel may include a video stream, or a video stream and an audio stream. Thus, the spectator selection of a video channel is also a selection of audio for listening to on the speakers 124. At step 41, the data to be overlaid is selected. An example of the data to be overlaid is context information that describes the video channel. For example, the context information might indicate the lap of the race. The data and the video information are combined in step 43. In step 45, the video is presented on the screen 118 with the data overlaid on the video. In step 47, the audio stream of the selected video channel is presented on the speakers 124.

Since the video channel content may be being continuously buffered, the spectator has the ability to implement a video playback functionality by selecting which portion of the video content currently in the memory buffer 27 will be displayed on the screen. The degree of playback depth, in other words the extent to which the spectator can wind back the video content, depends on the memory buffer 27 size.

The spectator can invoke the playback feature on the user interface. For example, the spectator accesses a menu item 813 with the appropriate selection keys 800b and then confirms by pressing the "enter" key. Replay functions include, but are not limited to, rewind, fast forward, bookmark, still image, step frame-by-frame, zoom, and video record.

In one embodiment, the memory buffer has a pointer that indicates the location currently being presented on the display screen. If the content of the memory buffer is not being displayed the pointer indicate any location in the memory buffer. However, typically the pointer will point to the most recently added video if the content is not being presented. When the user selects functions (e.g., using the keyboard) such as rewind, the pointer is adjusted in response to the user request. For example, if the user rewinds then the pointer is moved to a location in the buffer with older video. The speed at which the spectator effects the rewind can be set or can be selectable. During the rewind, two options exist. One is to show a blank screen and resume video presentation when the rewind key has been released. The video presentation will start at the location to which the pointer in the memory buffer 27 has been pushed back. The other option is to see the video content presented in reverse while the "rewind" is active so as to allow the spectator to more easily find an image or section of the video content of interest. The speed at which the video content is presented back as the memory buffer 27 is being backed up, can be fixed or variable, under control of the spectator.

Fast forward may be opposite of the rewind function. Note that fast forward can be invoked only when the pointer in the memory buffer 27 has been backed up to some degree.

Bookmark allows the spectator can jump to a certain point in the video content by selecting a previously established "bookmark" from a menu option, as described earlier. Each "bookmark" points to a specific portion of the video feed in the memory buffer. As such, when the spectator selects a "bookmark", the video presentation will start at the location of the pointer associated with the bookmark. The "bookmark" function enables the spectator to quickly jump back and forth to interesting portions of video presentation. The bookmark feature also allows the spectator to jump quickly from one bookmark to another bookmark. In this fashion, the spectator can easily go from one salient event to another in the video content held in the video memory 27 without the necessity of fast forwarding or rewinding the video content.

One possible replay function is a still image function that allows the spectator to pause the image. The still image functions may be effected by maintaining the pointer in the memory buffer 27 at a fixed location. In this manner, the spectator sees the same image frame.

Stepping frame by frame allows the spectator to see the image moving (by "moving" is meant either a forward movement or a backward movement) slowly frame by frame at a pace slower than the normal frame rate. Pressing the appropriate key on the keyboard can allow the image to jump from one frame to the next. Alternatively, the image can be moved automatically frame by frame but at a slower than normal rate so as to allow the spectator to see each frame individually.

Zoom allows the spectator can zoom in or out on frames shown on the screen. Typically this function is enabled when the still image feature is active. The zooming in can be invoked by pressing one key on the user interface 800, while the reverse, zooming out function can be invoked by pressing a different key.

Video recording allows the spectator to transfer some or the entire video stream content in the memory buffer 27 to the removable storage media in the storage media reader/writer 106. Again, operating the appropriate keys on the user interface 800 enables this function. One option is to start recording the video content that is being presented in real time on the screen. This function is useful when the spectator sees footage that is of interest and that he/she would like to record. The video content that is directed to the video memory buffer 27 is also copied in a compressed form to the removable storage media 106. In this fashion, the video content can be presented back on the handheld device 16 or on any other suitable electronic device that can read the video information stored in the removable storage media 106. The amount of video information that can be recorded on the removable storage media 106 depends on the size of the storage media.

One recording option to is transfer the entire content of the memory buffer 27 to the removable storage media 106. This option is possible if the size of the removable storage media 106 can accommodate the information in the memory buffer 27.

Another recording option is to transfer only a selected portion of the memory buffer 27 to the removable storage medium 106. This function can be activated by first performing a "rewind", "fast forward" or a "frame by frame" movement until the desired location in the memory buffer 27 of interest has been reached, and then activating the "play" and "recording function" that will start transferring the compressed image stream to the removable storage medium. When the desired portion of the video content has been recorded on the removable storage medium 106 the spectator can stop the recording process.

In one aspect, any bookmarks entered by the spectator may also be transferred to the removable storage medium 106. This is effected by copying on the removable storage medium 106 the address of the video information to which the bookmark points to. In this fashion, the if the spectator has placed bookmarks during the watching of the live sporting event those are not lost when the video content is transferred to the removable storage medium 106.

In some aspects, buffering occurs without user intervention. For example, the device responds to commands in the wireless RF transmission to automatically buffer a set of the video channels. As another example, the device responds to commands in the wireless RF transmission that tell the device to either buffer both the video and audio component of a video channel or only the video component.

Audio Stream Reception and Related Functions.

The following examples focus on the delivery of the independent audio streams since the handling of the audio streams associated with the respective video streams was described in the earlier section.

As indicated earlier, the independent audio streams may convey radio conversations between members of a race team (typically an audio stream will be associated with each race team), audio commentaries about the race or advertisement information, among others. At the handheld device 16 the spectator can manually select any of the streams and direct them to the output 124 which drives a sound reproducing device such as a loudspeaker or headphones. Another possible refinement is to send in connection with any one of the audio streams a priority flag which denotes content of potentially high interest to the spectators, such as for example conversations between emergency crews in the case of an accident. If desired the user interface of the handheld device 16 can be designed to disable this function which forces the handheld device 16 to present the audio stream with the high interest flag.

In some aspects, the device buffers audio streams based on commands sent from the head end. For example, the head end might determine which audio streams have the highest priority and instruct the devices to buffer those streams. For instance, priority number 1 can be assigned to the race leader, without regard to the particular participant that occupies the position at the time being. Any car in the pit stop might be assigned a high priority.

The audio that is currently being buffered may be selected according to this priority scheme. To enable this functionality, the head end 12 may mark the individual audio streams with data which associates the audio streams with the ranking of the respective participants of teams. In this fashion the handheld device 16 can adequately recognize the various positions of the participants of teams. One example is to insert in a suitable field of the binary transport of the wireless RF transmission information allowing identifying the race positions. Also, additional descriptive data is provided to point to the audio streams associated with cars that are in the pits.

A possible variant is to use the real time data included in the wireless RF transmission to map the various teams with respective race positions. Assuming that the individual audio streams in the wireless RF transmission are provided with suitable team or participant identifiers, the real time data that communicates the positions of the teams or participants can be used to establish the correlation between audio streams and race positions.

While the audio management function described above is done in connection with the handheld device 16 that provides video reception capability, similar audio management functions can also be implemented in simple audio only electronic devices. In the infrastructure described earlier, which uses a head end 12 to build a signal structure conveying an audio/video/data payload, such electronic device can be designed to disregard any video information and process the audio and data information only. With infrastructures that do not use a head end 12, the electronic device can be designed to implement at least some of the functions described earlier while accessing directly the raw audio sources. In such case, the electronic device may include a series of tuners, each tuner being set (permanently or temporarily) at a frequency corresponding to a given audio source, for example the frequency used by a race team for communication. In such case, the wireless RF transmission that the electronic device acquires encompasses the group of frequencies to which the tuners are set. Those frequencies may need to be entered manually by the spectator using the electronic device, for example, before the racing event begins. At this point, the audio stream selector analyzes the outputs of the different tuners to determine if they are active or not and applies the priority policy defined by the priority profile in determining which audio stream should be presented.

Since the audio streams may be continuously buffered, the spectator has the ability to implement an audio playback functionality. The degree of playback depth, in other words the extent to which the spectator can wind back the audio content, depends on the memory buffer 29 size. This size may be selected to accommodate a 5 minute playback depth. Of course, this is one possible example that should not be construed in a limiting manner.

Figure 9:
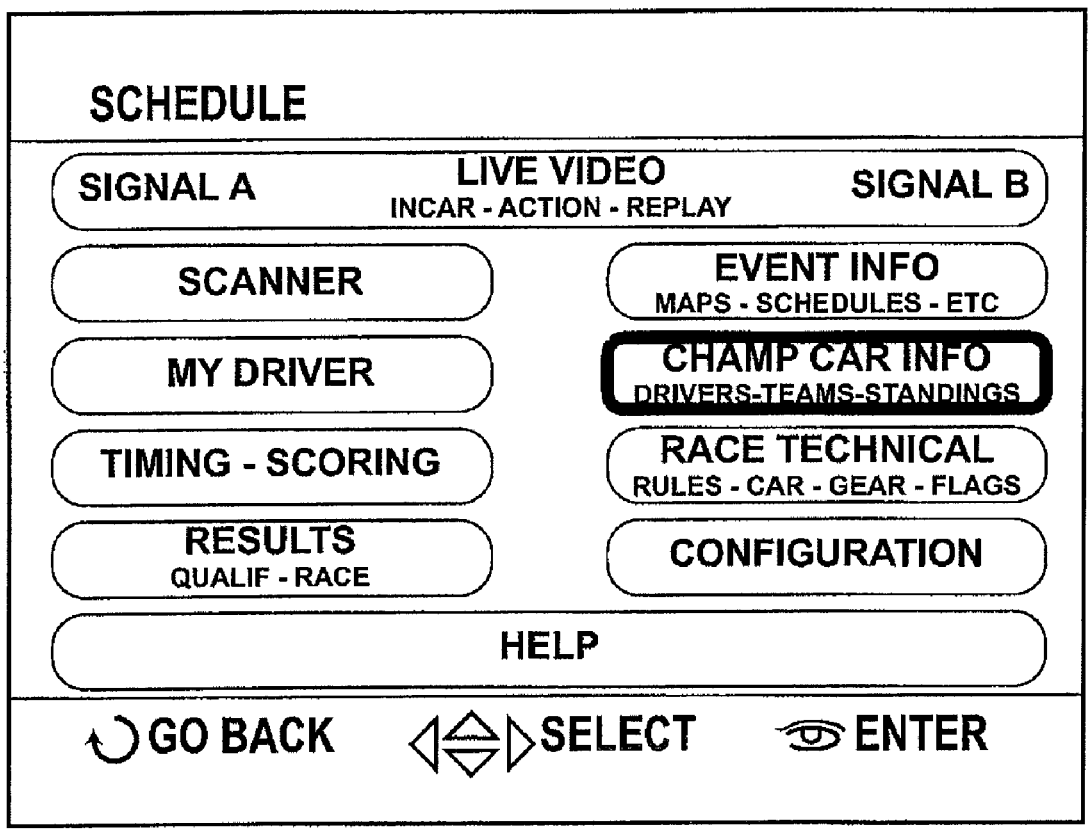
FIG. 9 is a diagram of a menu selection screen.

FIG. 9 is a root menu page allowing the spectator to access different types of functions and content of the handheld device 16. Specifically, the spectator can select at the top of the screen the "live video" option that leads to a set of live video channels. In one embodiment, selecting live video causes a menu of live video channels to be displayed. In another embodiment, choosing live video causes the last chosen channel or a default channel to be displayed and various buttons on the keyboard can be used to change channels. Below this option are other options, some of which will de detailed:

Scanner—allowing access to the independent audio feeds, such as radio traffic between drivers and teams, audio commentary, etc.

Figure 7:
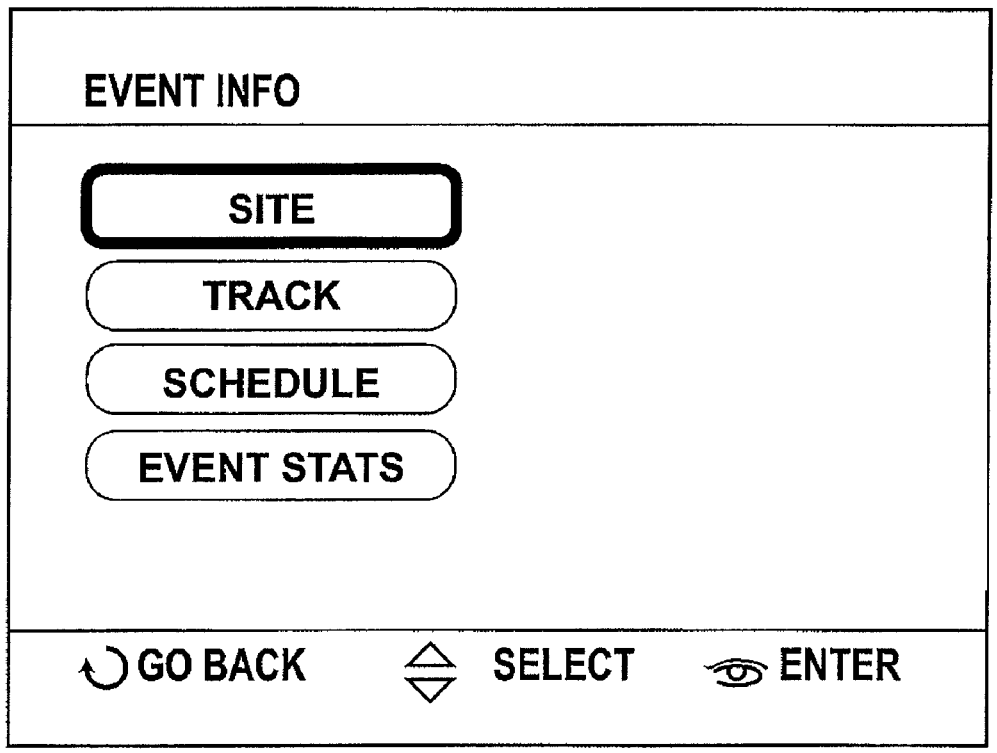
FIG. 7 is a diagram of a sub-menu selection screen.
Figure 8:
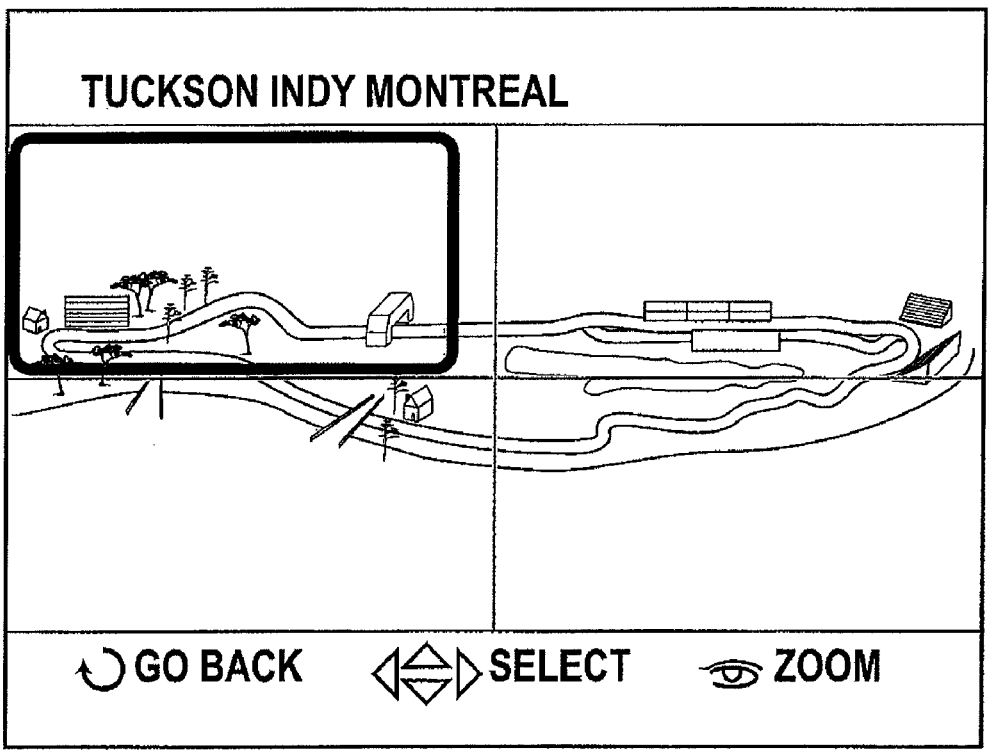
FIG. 8 is a diagram of a map of a venue.

Timing and scoring—this option page is selected from the page at FIG. 9. The timing and scoring page provides information of the type shown in the drawing such as best lap, lag, etc. Additional information may also include number of laps completed, number of laps to go, among others;

Results—allowing access to a results page;

Event info—by selecting this option the spectator accesses a sub-menu shown in FIG. 7. The sub-menu has a number of options, some of which will be described below:

Site—shows a map of the venue, as seen in FIG. 8. The spectator has the option to zoom on different sections of the map. The map is divided in quadrants and the each can be highlighted. Currently, the upper left quadrant is highlighted. By selecting the highlighted quadrant the zoom function is enabled for that quadrant.

Track—shows info regarding the track.

Schedule—shows schedule information.

Champ car info—referring back to FIG. 9, by selecting this option the spectator accesses a sub-menu. The sub-menu has a number of options, some of which will be described below:

Drivers—by selecting this option the spectator has access to a set of drivers. By highlighting and selecting a driver in the set the spectator can access a detailed page of that particular driver.

Standings—by selecting this option the spectator has access to a current standings set;

Teams—by selecting this option the spectator has access to a set of the teams participating at the event. The spectator has the option to highlight a particular team in the set and access a more detailed page showing additional information on the selected team.

Race technical—referring back to FIG. 9, by selecting this option the spectator accesses a sub-menu providing information about the race.

Bidirectional Wireless Communication

Figure 10:
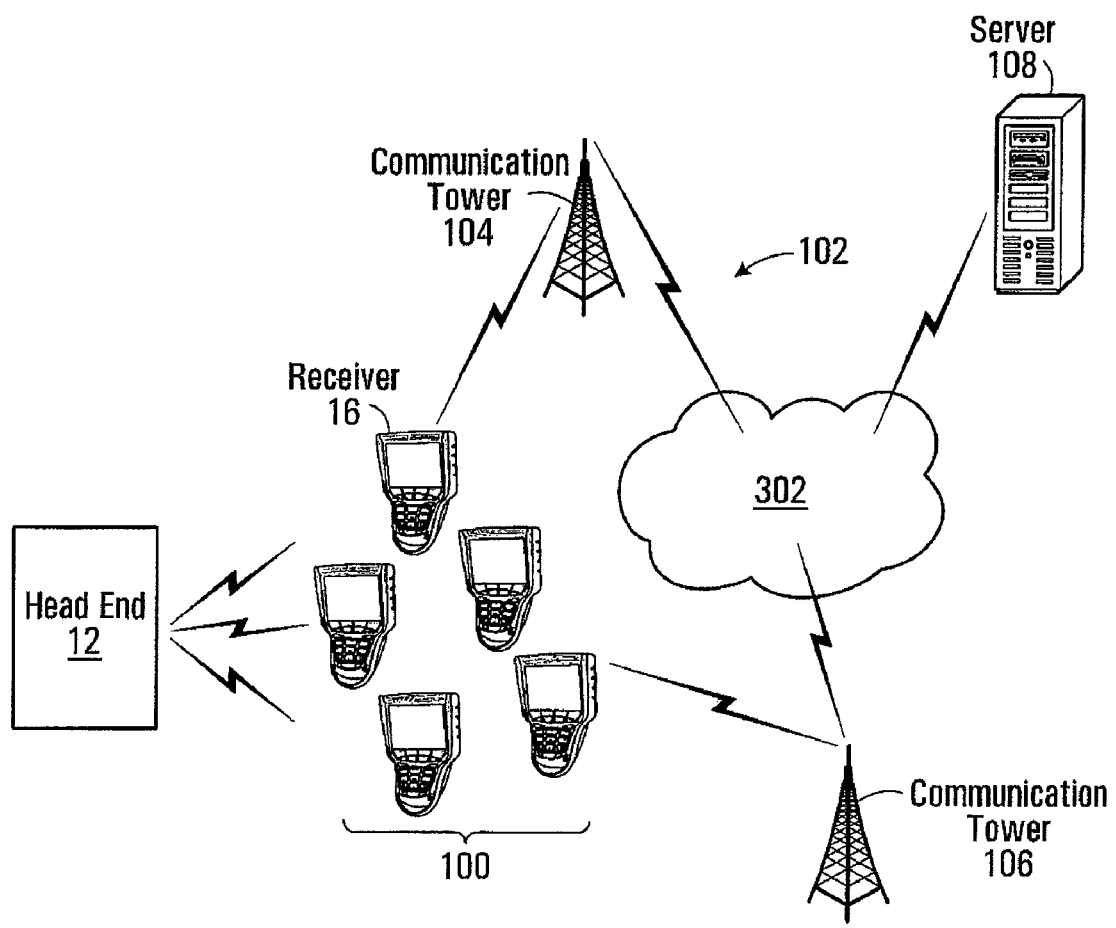
FIG. 10 is diagram of one embodiment of a system where the individual handheld electronic devices are provided with a bidirectional communication capability.

In one embodiment, the handheld device 16 has bidirectional wireless communication capabilities. Therefore, the handheld device 16 can receive information wirelessly and also send information wirelessly. FIG. 10 illustrates a bidirectional communication system according to a non-limiting example of implementation.

Assume for the sake of this example that a set 100 of handheld devices 16 are located at a live sporting event (e.g., a car race). The handheld devices 16 all receive the wireless RF transmission from the head end 12 or via a cellular network 102. The handheld electronic devices 16 can also communicate individually with a remote entity via the cellular network 102. In this example, the cellular network 102 has two cellular towers 104 and 106 located away from one another such as to provide adequate reception coverage from anyone of the electronic devices 16 at the live sporting event. Each handheld device 16 is provided with the functionality allowing it to establish communication with the cellular network 102. This functionality includes a transmitter and a receiver sections that can communicate in the same manner as a cellular telephone. In one embodiment, handheld 16 can be implemented using software on a cellular telephone. Another possibility that can be used instead of a cellular network is a WiFi network or any other cellular type infrastructure allowing individual wireless communication to take place between each handheld device 16 and a remote entity. In another embodiment, the head end 12 can send the audio and video over the RF transmission discussed above, and the hand held 16 and head end can also communicate using WiFi or a cellular connection.

It is not necessary, nor even preferred to provide the communication channels from the electronic devices 16 toward the cellular network 102 with the same bandwidth as the bandwidth of the link between the head end 12 and the handheld electronic devices 16. In practice, the amount of information that needs to be sent from the individual handheld electronic devices 16 is small and does not require the amount of data carrying capacity the wireless RF transmission from the head end 12 needs.

Buffering Content

Figure 18A:
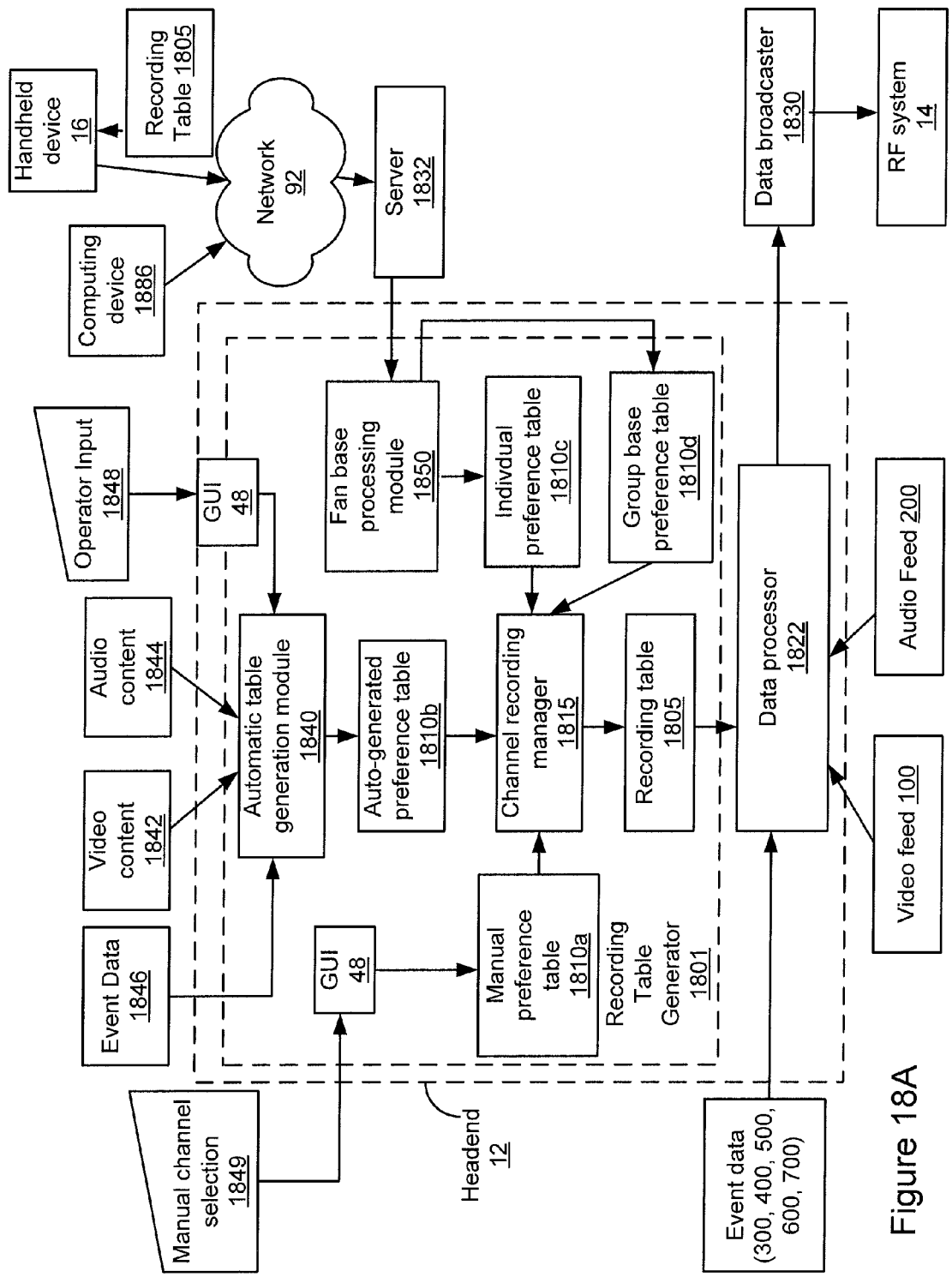
FIG. 18A is a block diagram of one embodiment of a head end.

FIG. 18A is a block diagram of one embodiment of a head end 12. The head end 12 has a channel recording manager 1815 that generates a recording table 1805 that is sent to the hand held devices 16 to control which video streams are buffered at the hand held devices 16. The channel recording manager 1815 may be implemented as software that executes on a processor at the head end 12.

In one aspect, recording table generator 1801 generates a recording table 1805 that identifies which portion of the RF transmission should be buffered at the handheld devices. The recording table 1805 may be a data structure that is stored on a computer readable medium at the head end 12. The head end 12 has a data processor 1822 that forms an RF transport stream that includes the recording table 1805, video feeds 100, audio feeds 200, and event data 300, 400, 500, 600, 700. In some embodiments, the data processor 1822 includes video processor 40, audio processor 42, control entity 44, and MUX 46, as depicted in FIG. 2. Thus, the various inputs 100-700 and recording table 1805 can be combined into one signal by the MUX 46 prior to sending the RF stream to the data broadcaster 1830. However, note that it is not required that the various inputs 100-700 and recording table 1805 be combined into the same RF transmission. For example, the recording table 1805 might be sent in a different wireless transmission than the video channels. Also, the video channels could be sent in a different wireless transmission than the independent audio.

In one embodiment, the RF transport stream is an MPEG-4 transport stream. The data processor 1822 provides the RF transport stream to the data broadcaster 1830, which transmits a wireless RF transmission using the RF system 14. In one embodiment, data broadcaster includes a computer or circuit for interfacing between head end 12 the RF transmission system 14.

The RF system 14 can use any modulation technique to send the wireless RF transmission. One non-limiting example is Coded Orthogonal Frequency Division Multiplexing (COFDM). The wireless RF transmission may be compliant with an Advanced Television Systems Committee (ATSC) standard; however, that is not required. In one embodiment, the wireless RF transmission is compliant with a Digital Video Broadcasting (DVB) standard. An example bandwidth for the wireless RF transmission is 6 MHz. However, the bandwidth could be greater or less than 6 MHz. Transmission of the wireless RF signal is not limited to any particular carrier frequency.

The recording table 1805 can identify which video channels to buffer, which video streams to buffer, which audio streams to buffer, which real-time data to buffer, etc. For ease of discussion, several examples are provided herein in which video channels are buffered. However, buffering techniques described herein are not limited to video. The RF transmission may include separate audio channels, and other data that may be buffered instead of or in addition to the video. For example, the other data might be a play-by-play of a football game in written and/or graphical format such as a series of HTML documents.

The recording table 1805 may be provided to the handheld devices in the same RF transmission as the content that is to be buffered, but that is not a requirement. The recording table 1805 may cause each handheld device 16 to buffer the same video channels. However, in some embodiments the recording table 1805 has information that allows different handheld devices to buffer different video channels. Thus, the video channels that are buffered at one handheld may be different than the video channels that are buffered at another handheld device 16.

The following is one example of a recording table 1805 that includes a number of packet identifiers (PIDs), which identify a portion of the RF transmission that should be recorded (buffered) at the handheld device 16. Other formats and structures of a recording table can also be used.

| Packet ID (PID) | Descriptor | Index | Service Level |
|---|---|---|---|
| Video channel 1 | Ross in-car camera | 1 | Device IDs (group A) |
| Video channel 4 | Hamilton in-car camera | 2 | Device IDs (group B) |
| Video channel 5 | Smith in-car camera | 3 | Device IDs (group C) |
| Video channel 9 | Race leader | 4 | Device IDs (group D) |
| Video channel 12 | Corner 3 | 5 | Device IDs (group E) |

In the example of the recording table above, each entry in the PID column includes one or more PIDs that identify a video channel that is to be buffered at the handheld device 16. A video channel can be formed from more than one elementary stream, such as a video stream and one or more audio streams. For example, programs in an MPEG-4 transport stream can be formed from several elementary streams. The packets that correspond to the elementary video stream may all have the same PID, the packets that correspond to one of the audio streams may all have the same PID, and the packets that correspond to a second audio stream may all have the same PID. A video channel may also have other packets (e.g., metadata packets) with a different PID. An entry in the recording table such as "video channel 1" may thus have a PID for the elementary video stream, a PID for an elementary audio stream, etc. However, it is not an absolute requirement that a video channel use different PIDs for different elements of the video channel. In other words, the transport stream does not have to be organized in the way the example transport stream described herein is organized. In some embodiments, the PID is a number. In other embodiments, the PID is a set of alphanumeric characters.

Each video channel may have other information associated with it in the recording table 1805 such as a descriptor, an index, and a service level. The descriptor is a label that describes the video stream (or audio stream, or other data). The descriptor is displayed by the handheld when the user chooses a buffer to replay or when the video is being replayed. The index may be used by the handheld device 16 to determine the order in which the video streams are identified on a selection menu. The index could also be used to indicate which memory buffer to store the video channel in. For example, the device 16 may store video channel 1 in video memory buffer 1, video channel 4 into video memory buffer 2, etc.

The service level includes a set of handheld device IDs and may be used to cause different handheld devices to buffer different video channel. In one aspect, if a handheld device 16 determines that its device ID is in a row in the recording table 1805, then the handheld device 16 determines that it should buffer the video channel in that row. Rather than identify devices IDs, the service level field can indicate all devices or indicate a group ID. Each handheld will know which group it is in so it can determine whether to follow the particular row of the table. Some embodiments do not use the service level column. The above recording table is only an example. Other formats and other data can also be used.

The recording table 1805 may be created based on one or more preference tables 1810a-1810d. A preference table 1810 is a data structure that indicates some preference. For example, a preference table 1810 can indicate a preference for buffering video streams associated with a particular race car driver, football player or team. The format of a preference table 1810 can be the same as the example recording table 1805, but that is not required. Thus, note that a preference table 1810 does not necessarily contain PIDs.

The preference tables 1810a-1810d can be created based on manual input, automatically, or a combination of manual input and automatic generation. In some aspects, the preference tables 1810 are based on user profiles, user demographics, etc. The head end 12 is able to receive manual channel selection 1849 to create the manual preference table 1810a. As an example, the head end 12 provides a GUI 48 that allows an operator to directly select which video channels to buffer.

In one embodiment, automatic table generation module 1840 automatically generates the auto-generated preference table 1810b, based on a variety of inputs. For example, an operator may provide input 1848 that identifies a race car driver. The automatic table generation module 1840 is able to determine which video channels are associated with the race car driver based on inputs such as event data, video content 1842, and audio content 1844.

The fan based processing module 1850 receives user preferences from server 1832 and generates an individual preference table 1810c and group based preference table 1810d. The individual preference table 1810c has information that indicates individual preferences. For example, the individual preference table 1810c may indicate that a particular user has a preference for a certain race car driver. The group preference table 1810d has information that indicates group preferences. For example, the group preference table 1810d may indicate that the majority of users to attend an event are fans of a certain race car driver. Further details of generating preference tables 1810 are discussed below.

In some embodiments, the user is able to access the server 1832 over network 92 (e.g., the Internet) in order to register to receive the wireless RF transmission for the event, or for other purposes. The user might access the server 1832 using the same handheld device 16 that will be used when at the event or with some other computing device 1886 (e.g., desktop computer, laptop computer). While connected to the server 1832, the user may provide user preferences. In some aspect, the server 1832 sends a recording table 1805 back to the user.

In one embodiment, the recording table generator 1801 is a computer, and each of its modules described herein are software components. In other embodiments, the recording table generator 1801 is a software application running on a computer and each of its modules described herein are components of the software application.

Figure 18B:
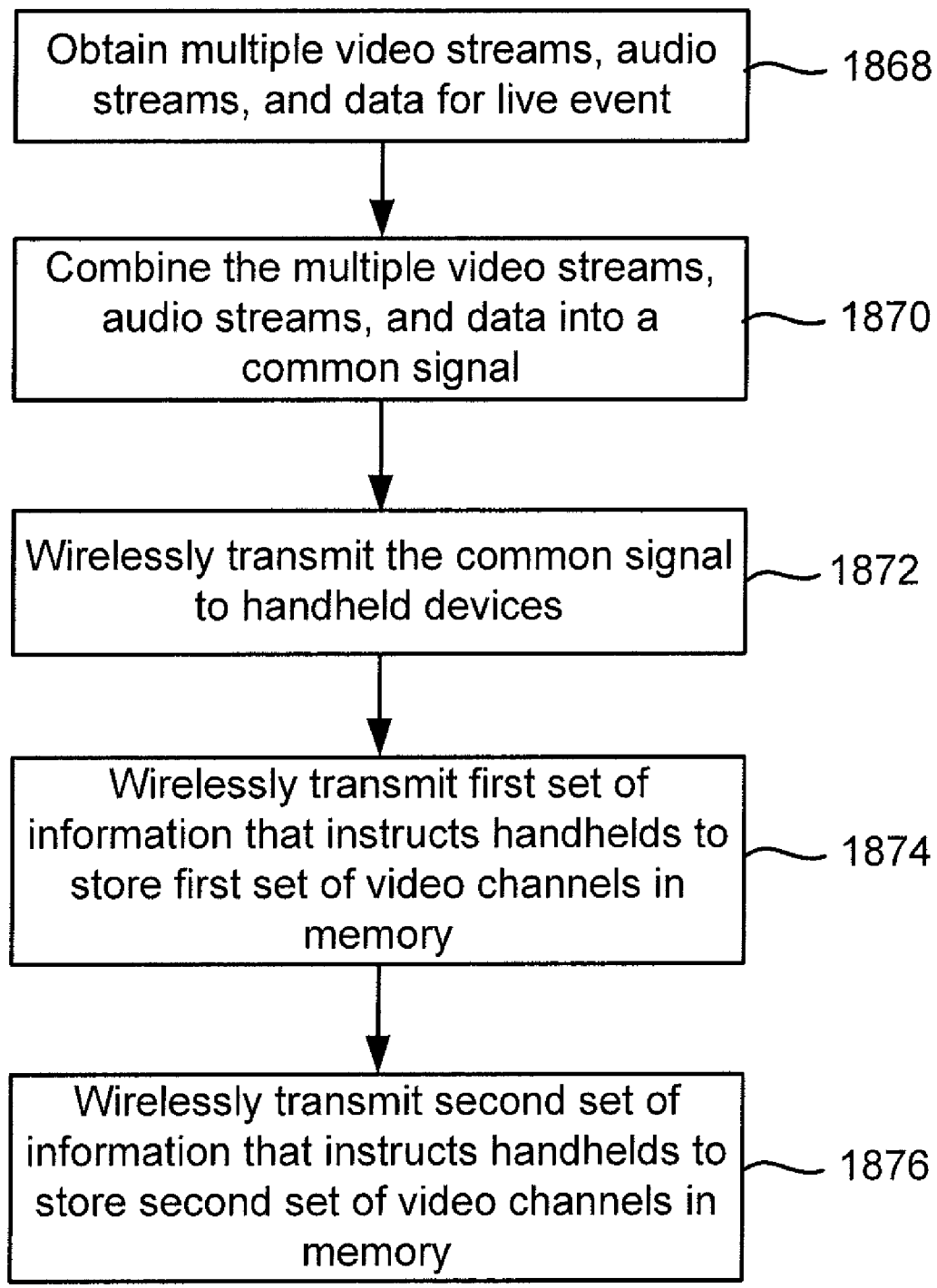
FIG. 18B is one embodiment of a process of a transmitted a wireless signal.

FIG. 18B is a flowchart of one embodiment of a process of head end 12 transmitting video channels to handheld devices 16. In step 1868, multiple video streams, audio streams, and data for a live event are obtained. For example, video feeds 100, audio feeds 200, and event data 300, 400, 500, 600, and 700 are obtained. Note that it not required that each type of event data is obtained. In step 1870, the multiple video streams, audio streams, and data for a live event are combined into a common signal. For example, the data processor 1822 combines them into an MPEG transport stream. However, the use of MPEG is not a requirement. In step 1872, the common signal is wirelessly transmitted to handheld devices 1872. For example, the data processor 1822 passes the transport stream to broadcaster 1830. Broadcaster then transmits the transport stream in the wireless RF transmission. Note that the common signal includes a number of video channels that are formed from the video streams.

In step 1874, a first set of information (e.g., recording table) that instructs the handhelds to store in memory a first set of the video channels is transmitted. For example, the data processor 1822 inserts a first recording table 1805 into the RF stream with the video channels and forwards the RF stream to the broadcaster 1830, which transmits the transport stream in the wireless RF transmission.

In step 1876, a second set of information (e.g., recording table) that instructs the handhelds to store in memory a second set of the video channels is transmitted. For example, the data processor 1822 inserts a second recording table 1805 into the RF stream with the video channels and forwards the RF stream to the broadcaster 1830, which transmits the transport stream in the wireless RF transmission. However, the second set of information is not required to be transmitted in the same RF transmission as the video channels.

Note that steps 1868, 1870 and 1872 are continuously performed so that live video and audio are continuously sent to the handhelds 16 during the event. Steps 1874 and 1876 are performed at the same time as, and as part of, steps 1870 and 1872. Additional recording tables can also be transmitted to the handhelds. Each time a new recording table is transmitted, the handhelds change the set of channels being recorded. In some embodiments, a recording table is only sent once, until a change is needed. In other embodiments, a recording table can be sent repeatedly so that newly connected handhelds will have the latest recording table.

Figure 19A:
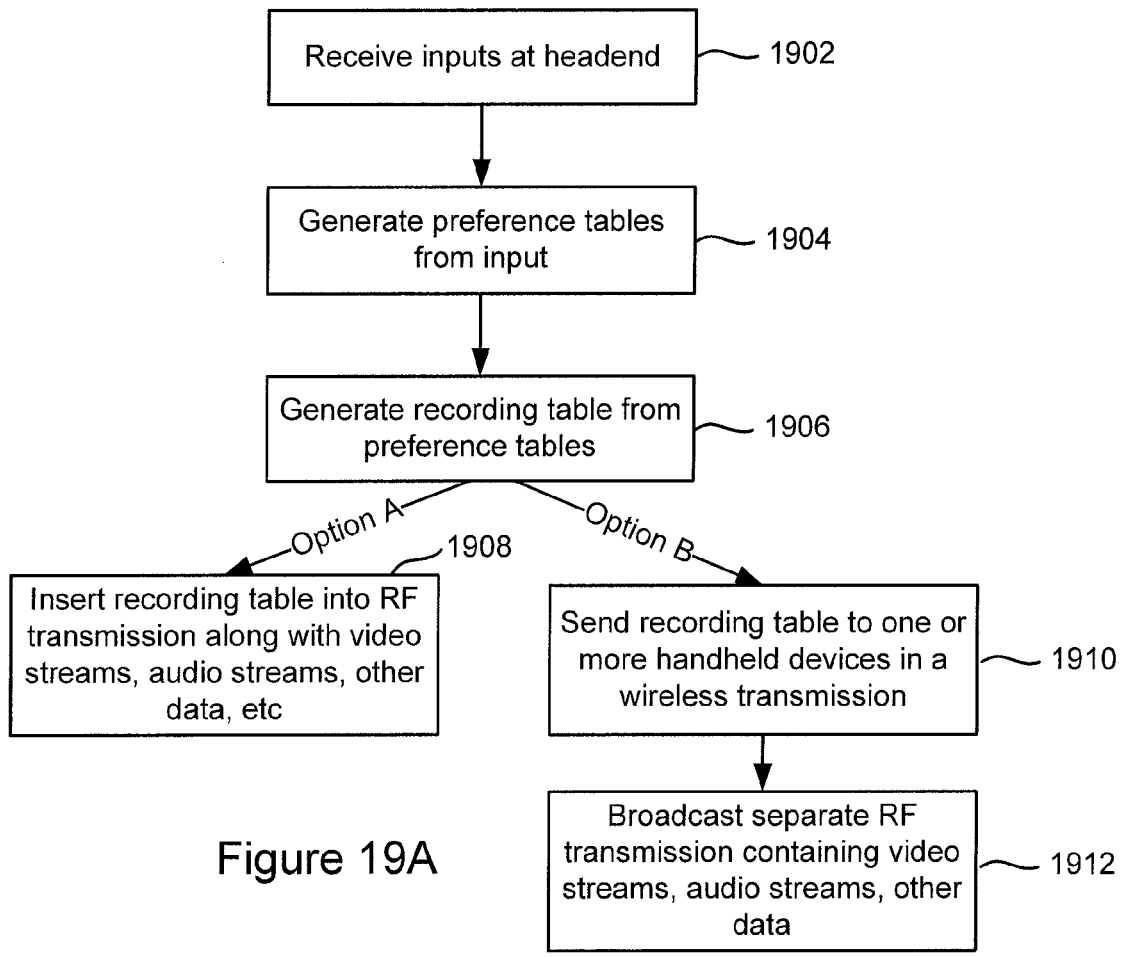
FIG. 19A is one embodiment of a process of a head end creating a recording table and providing it in a wireless RF transmission to handheld devices.

FIG. 19A is one embodiment of a process 1900 of the head end 12 creating a recording table 1805 and providing it in a wireless RF transmission to handheld devices. Process 1900 is one example implementation of either step 1874 or 1876 of the process of FIG. 18B. Process 1900 may occur multiple times such that many different recording tables 1805 are provided to the handheld devices during the event. In some embodiments, when the head end 12 sends a new recording table 1805 it replaces the old one at the handheld device 16. In step 1902, head end 12 receives inputs that are used to generate preference tables 1810. Example inputs include, but are not limited to, human input, video streams, and user profiles. Further details of receiving inputs are discussed in connection with generating preference tables below. Note that the inputs could be received prior to the event or at any time during the event. Moreover, if the inputs change over time, the head end 12 may perform process 1900 again during the live event to generate a new or updated recording table 1805. In step 1904, the head end 12 generates one or more preference tables 1810 based on the input received in step 1902. The input may include, but is not limited to, operator input, data such as video streams, metadata regarding the video streams, and user preferences.

In step 1906, the head end 12 generates a recording table 1805 from one or more of the preference tables 1810. The preference tables 1810 can be used in a variety of ways to generate the recording table 1805, as will now be described. In one aspect, the channel recording manager 1815 (a software process in recording table generator 1801) selects one or more of the preference tables 1810*a*, 1810*b*, 1810*c*, 1810*d* to be used as the recording table 1805. Note that any combination of the preference tables 1810 can be used. For example, in some embodiments, only automatically generated preference tables 1840 are used. In some embodiments, the channel recording manager 1815 enforces a priority scheme to select between two or more preference tables 1810. For example, manually generated preference tables 1810*a* may have the highest priority, followed by automatically generated preference tables 1810*b*, followed group preference tables 1810*d*, then individual preference tables 1810*c*. The channel recording manager 1815 selects the available table having the highest priority in this embodiment.

Figure 19B:
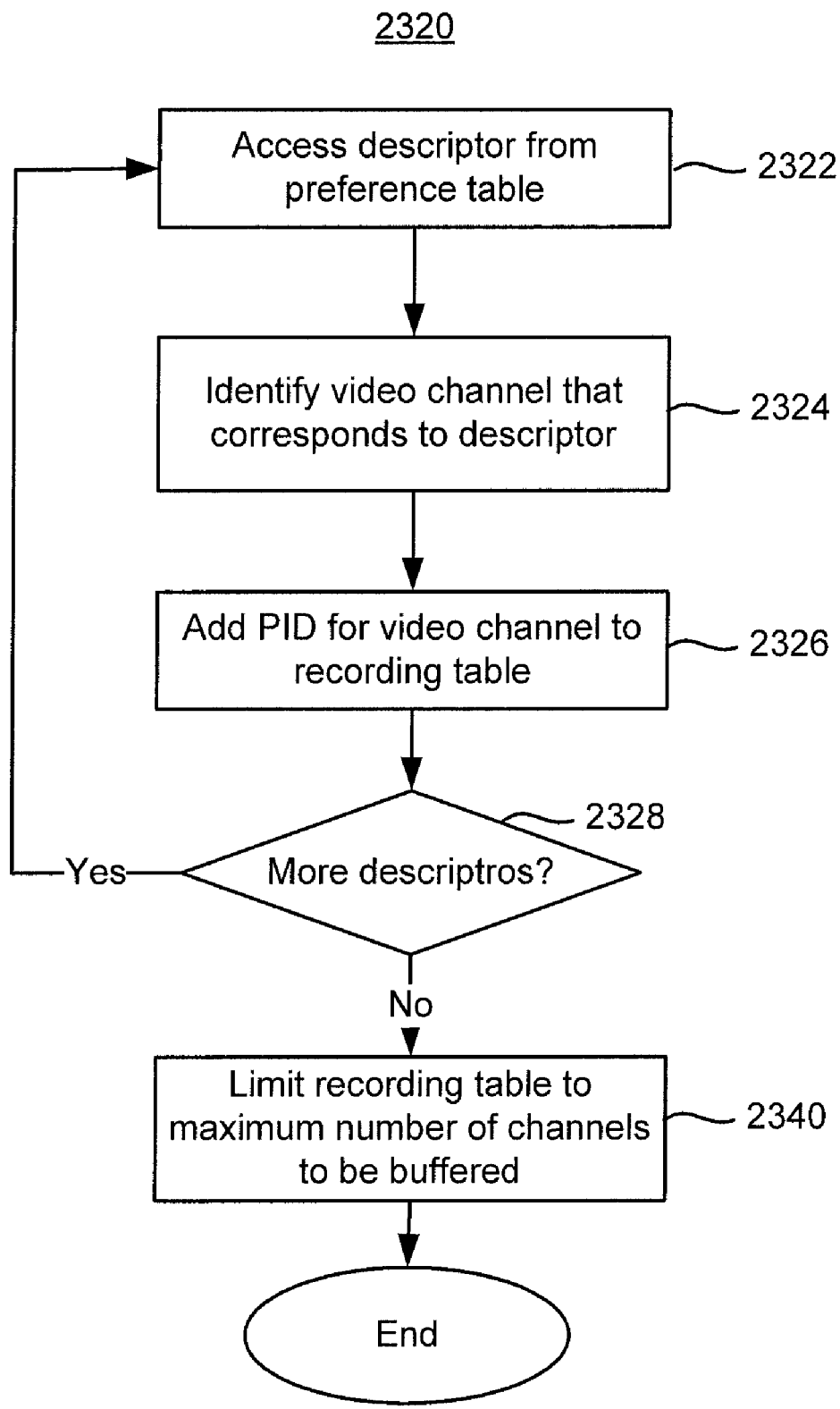
FIG. 19B is one embodiment of a process generating a recording table.

Note that the preference tables 1810 may or may not identify the video channel to be buffered. For example, the preference tables 1810 may or may not include a PID. As an example, a preference table might only identify a given event participant. In this case, the channel recording manager 1815 may determine which video channels should be buffered for that event participant. FIG. 19B provides further details of determining PIDs.

In one embodiment, the channel recording manager 1815 merges the content of two or more preference tables 1810 to form recording table 1805. For example, the manual preference table 1810*a* might only specify three video channels to be buffered. The channel recording manager 1815 might select two more video channels to be buffered based on the group based preference table 1810*d*. For example, the group preference table 1810*d* might indicate that the majority of the users of handheld devices at an event are fans of the home football team. The channel recording manager 1815 can look for video channels that shows a strong association with the home team and include them in the recording table 1805. An example of a strong association could be an interview of a player or coach of the home team. The recording manager might determine the association be metadata that is associated with a video feed 100. Note that when video feeds 100 are sent to the head end 12, the feeds 100 might have metadata that describes them. The recording manager 1815 might also have pattern or image recognition software that identifies a player's jerseys number, color, face, etc. The recording manager 1815 could also look for names in a close captioned broadcast. The recording manager may also recognize sounds in one or more audio streams, such as a particular person talking, the sounds of a car accident, the crowd cheering, a ball hitting a bat, a puck hitting a goal post, etc.

In some aspects, there is a timeout associated with a preference table 1810. For example, the automatically generated preference table 1810*b* might be valid for a certain period of time. So long as table 1810*b* is valid, it may be used as the recording table 1805. Otherwise, a different preference table may be used as the recording table 1805. The foregoing are a few of the many techniques that can be used to generate the recording table 1805 from the preference tables 1810.

The recording table 1805 may be provided to the handheld devices in the same RF transmission as the video content, but that is not a requirement. In Option A (step 1908), the head end 12 inserts the recording table 1805 into a wireless RF transmission along with other data such as video channels, separate audio streams, real-time and ancillary data, etc. In one embodiment, the head end 12 has a data processor 1822 that inputs the recording table 1805, video feeds 100, audio feeds 200, and event data 300, 400, 500, 600, 700 and constructs a payload that is sent to data broadcaster 1830. Data broadcaster 1830 uses RF system 14 to transmit a wireless RF transmission. In another example, the recording table 1805 could be provided to the handheld device 16 in a different wireless transmission from the RF transmission in which the video streams are transmitted. For example, the handheld device 16 may have one (or more) tuners for receiving the wireless RF transmission including the video streams and another receiver for obtaining a wireless signal with the recording table. This is depicted in Option B of process 1900 in which the recording table 2805 is sent in one wireless RF transmission in step 1910 and the video streams, audio streams, and other event data are sent in another RF transmission in step 1912.

Figure 20:
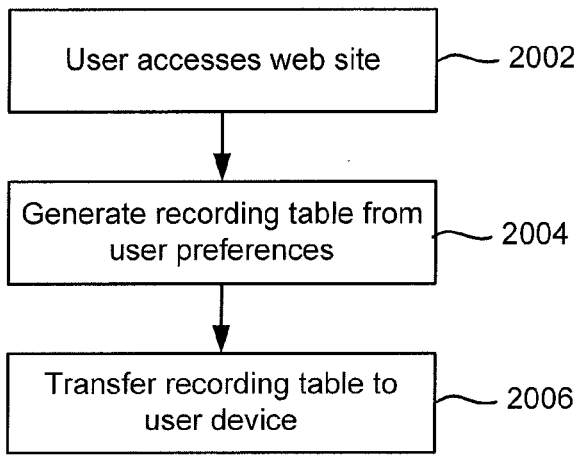
FIG. 20 depicts one embodiment of a process for providing a recording table to a handheld device.

In one embodiment, the recording table 1805 is loaded onto the handheld device 16 when the user registers to receive service for the event. FIG. 20 depicts one embodiment of a process 2000 for providing a recording table 2805 to a handheld device 16. In step 2002, the user accesses a website. The user might be visiting the web site to register for service for the event. However, the user might be visiting for other purposes. Note that the user may access the website with the handheld device 16 that is to be used at the event or another device.

In step 2004, server 1832 generates a recording table 1805 based on user preferences. For example, the user might request to have content related to their favorite race car driver provided to them at a racing event. The server 1832 could create a recording table 1805 that has a descriptor of the race car driver. For example, the descriptor could be the driver's name. The handheld device 16 then looks for video channels having those descriptors to determine the PIDs. Further details are discussed below.

In step 2006, the recording table 1805 is provided to the handheld device 16. One way to provide the recording table 1805 to the handheld device is for the server 1832 to provide the recording table 1805 to the device 16 used to connect to the server 1832 to register. For example, the server 1832 may transfer the recording table 1832 directly to the handheld device 16 over network 92, but that is not a requirement. The server 1832 could also transfer the recording table 1805 over network 92 to a device other than the handheld device 16. Then, the user transfers the recording table 1805 to the handheld device 16 from the other device. For example, the user could transfer the recording table 1805 from a desktop computer system to a USB flash drive. Next, the user transfers the recording table 1805 from the USB flash drive to the handheld device 16. Note that it is not required that the recording table 1805 be provided to the user at the time that the user visits the web site. In one aspect, a user preference table is stored on the server 1832 or head end 12. Then, when the user is at the event, the head end 12 provides a recording table 1805 to the handheld device 16 based on the user preference table.

Figure 21:
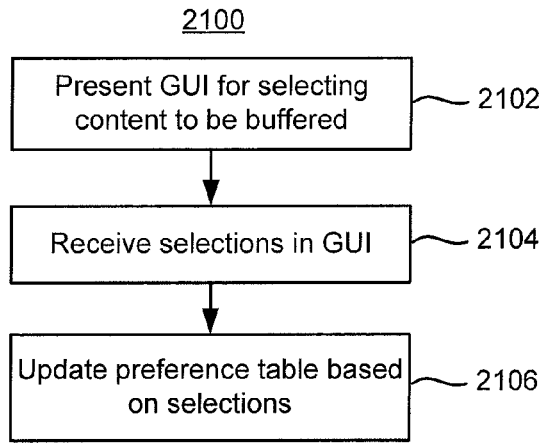
FIG. 21 depicts one embodiment of a process of generating a recording preference table based on input from a human operator.

Generation of the preference tables 1810 from which the recording table 1805 may be derived will now be discussed. One technique for generating a preference table 1810 is based on input from a human operator. FIG. 21 depicts one embodiment of a process 2100 of generating a recording preference table 1810*a* based on input from a human operator. For example, an operator may enter information that identifies the video channels to be buffered. Process 2100 is one implementation of step 1904 of process 1900. In step 2102, the head end 12 presents a GUI 48 for selecting content to be buffered. The GUI 48 might indicate which video channels (if any) are currently being buffered and may allow the operator to select one or more video channels to be buffered. The GUI 48 may also allow selection of audio channels and other content for buffering.

In step 2104, the head end 12 receives selections in the GUI 48. Upon selection of a new video channel, the GUI 48 may prompt the operator to remove a channel from the set of those currently being buffered if the maximum number of channels were already being buffered.

In step 2106, the preference table 1810*a* is created or updated based upon the selections in the GUI. The preference table 1810*a* may include a set of PIDs that correspond to the selections. Each PID in the table 1810*a* may have a descriptor such as a camera angle, name or ranking of participant, etc. Optionally, the preference table 1810*a* may have indexes and device IDs associated with each PID.

Figure 22A:
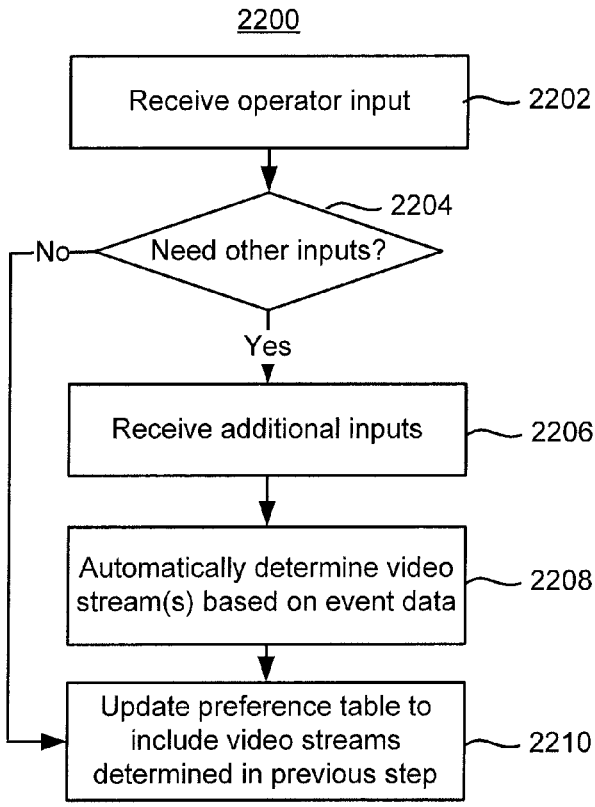
FIG. 22A depicts one embodiment of a process for generating preference tables automatically based on different inputs received at the head end.

FIG. 22A depicts one embodiment of a process 2200 for generating preference tables 1810*b* automatically based on different inputs received at the head end 12. This is one example of the process for automatically (without direct human intervention) determining which subset of video channels to buffer on the handheld. Those inputs received at the head end that are used to automatically determine the subset of video channels to buffer on the handheld include, but are not limited to, video content 1842, audio content 1844, event data 1846, and operator input 1848. It is not required that all of the inputs be used to generate the preference table 1810*b*. Process 2200 is one implementation of step 1904 of process 1900. Referring to FIG. 1 video content 1842 could be video feeds 22 or any video streams (e.g., video stream 100) produced therefrom. An example of audio content 1844 could be audio feeds 32 or 33 or any audio streams (e.g., audio streams 200, 300) produced therefrom. An example of event data 1846 could be real time data content 35. Real time data content may include, for example, the current ranking of participants, current race lap, laps remaining, participants still in the race, participants no longer in the race, etc. The event data 1846 may include descriptors of video streams or audio streams. For example, the event data 1846 may indicate that video feed 4 is an in-car camera of race driver A.

In step 2202 the automatic table generation module 1840 receives operator input. The operator input 1848 might identify a particular participant in the event, an occurrence in the event (e.g., touchdown, interception, goal, crash, hit, etc.), a condition that may or may not be satisfied, content, etc. The operator input 1848 may be entered in GUI 48. For example, the operator input identifies a specific race car driver.

In step 2204, the automatic table generation module 1840 determines if additional inputs are needed to generate the preference table 1810*b* (or entry therein). If this is the case, control passes to step 2210 to update the preference table 1810*b*. However, the operator might only have specified criteria (e.g. that video channels associated with a particular race car driver should be buffered, a particular occurrence in the event, a condition, etc.) in which case additional inputs might be needed to determine which video channels are associated with the driver. If this is the case, additional inputs are accessed in step 2206. The additional inputs may include, but are not limited to, event data 1846, video content 1842, and audio content 1844.

In step 2208, the automatic table generation module 1840 automatically generates a preference table 1810*b* from the inputs. The automatic table generation module 1840 may use a variety of techniques to generate the preference table 1810*b* from the inputs. For example, the event data 1846 might identify a certain video feed as being the in-car camera view of a particular race car driver, so if the criteria entered by the operator was for video of a particular driver, then the event data is used to select the in-car camera view of the particular race car driver. The event data might also indicate which video feed shows the race leader, as well as which position the driver of car 84 is in. If the driver of car 84 is leading or close to the lead, the video camera showing the race leader may be automatically selected for buffering.

As another example of using inputs to automatically generate preference table 1810*b*, the automatic table generation module 1840 might use image or pattern recognition software that analyzes the video feeds to determine which video feed(s) have video frames with a particular care by looking for color, shape and/or the car number. The image or pattern recognitions software could also look for a face, uniform with a number of symbol, or other object. Software can also be used to identify sounds in the audio feeds. The automatic table generation module 1840 might use software that analyzes the audio component of video feeds to determine which video feed(s) have frames in which the participant's name, car number, etc. are mentioned. Using these techniques, a subset of video channels is selected and documented in a preference table. The preferences table is used to create a recording table, which is sent to the handhelds.

Figure 22B:
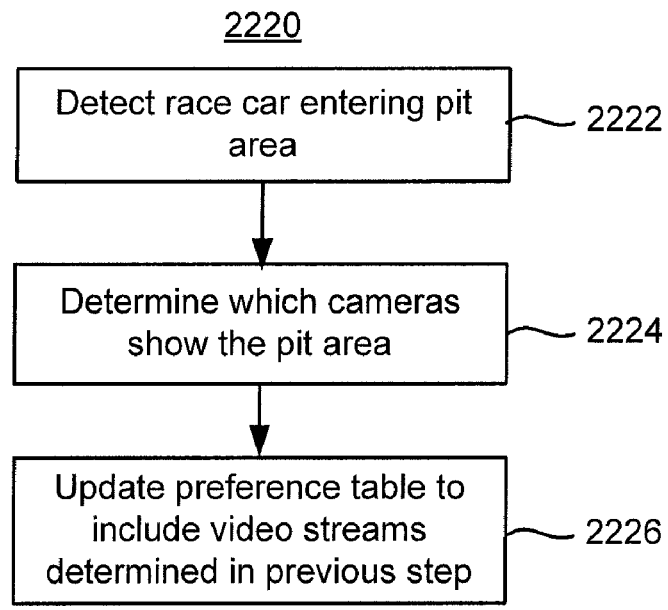
FIG. 22B depicts one embodiment of a process for generating preference tables automatically based on events received during a car race.
Figure 22C:
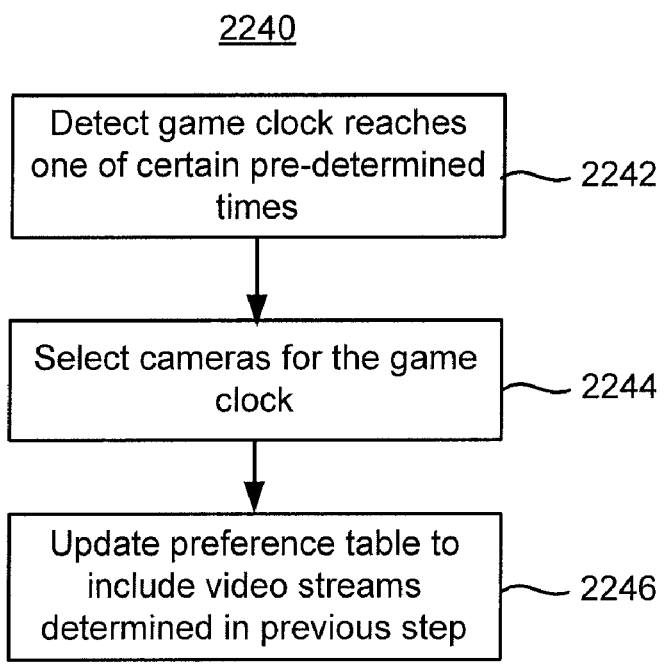
FIG. 22C depicts one embodiment of a process for generating preference tables automatically based on events received during a football game.
Figure 22D:
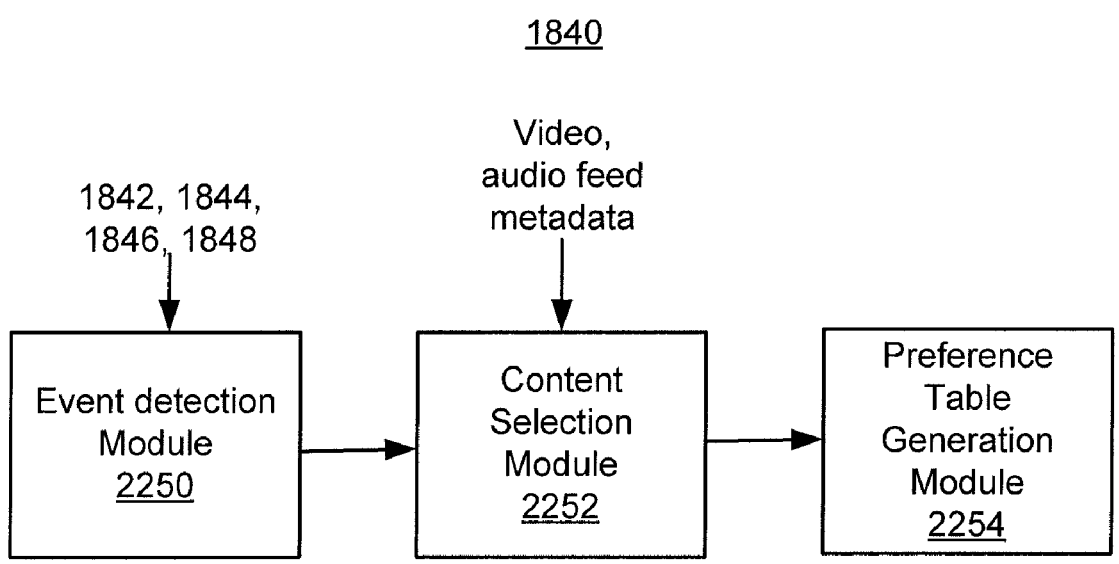
FIG. 22D depicts one embodiment of details of a table generation module of FIG. 18A.

FIG. 22D depicts details of one embodiment of automatic table generation module 1840. In this embodiment, automatic table generation module 1840 has an event detection module 2250 that inputs video data 1842, audio data 1844, event data 1846, and operator input 1848 and determines when certain events occur. Examples of events are a car entering a pit stop area or the game clock in a football game reaching a certain milestone. The automatic table generation module 1840 (e.g., a software component) has a content selection module 2252 (e.g., a software component) that inputs video and audio feed metadata and determines which video and audio channels to buffer when the event is detected. The automatic table generation module 1840 has a preference table generation module 2254 that generates the preference table 1810*b* using audio and image recognition techniques.

FIG. 22B depicts one embodiment of a process 2220 for generating preference tables 1810*b* automatically based on detection of certain stimulus. Process 2220 is one example implementation of step 1904 of process 1900. In this example, the stimulus is an event in a car race. In step 2222, event detection module 2250 detects that the race car has entered the pit stop area. For example, the event detection module 2250 automatically analyzes the close captioned dialog of an audio channel of the race to determine that a driver has entered the pit area. The determination can also be made by pointing a camera at the entrance of a the pit areas and detecting the presence of a car in the field of view of the camera. Alternatively, a weigh sensor can be used at the entrance to the pit area to detect a car entering the pit area and the output of that weight sensor can be transmitted to the event detection module 2250. Cars can carry RFID's to differentiate which cars have entered the pit areas. Note the many other events might be detected such as a car crossing the start line, finishing line, certain corner, etc.

In some embodiments, the event detection module 2250 applies the outside stimulus to a logical expression to determine whether the event has occurred. For example, the event might be satisfied if car number 84 enters the pit area and if car number 84 is in one of the top five positions in the race. As another example, the event might be satisfied if car number 84 enters the pit area and if the lap number is within the last 50 laps of the race. The logical expression could include any type of logical operators including, but not limited to AND, OR, NOT, XOR, etc.

In step 2224, the content selection module 2252 determines which cameras or other content should be buffered. In one embodiment, the content selection module 2252 inputs video feed metadata that describes each video feed. For example, the metadata indicates that certain video feeds are in-car cameras, indicates the field of view of certain cameras, indicates that a camera is showing the race leader, etc. The camera selection module 2252 may have a table that is used to determine which cameras (and audio feeds) should be buffered when each driver is in the pits. For example, the table might indicate that the in-car camera for the driver should be buffered, the radio conversation between the driver and the pit crew should be buffered, and any cameras that shows pit crew action should be buffered.

In step 2226, the preference table generation module 2254 generates or updates the preference table 1810b such that it has one or more entries for buffering the video and/or audio channels determined by the content selection module 2252.

FIG. 22C depicts one embodiment of a process 2240 for generating preference tables 1810b automatically based on detection of certain stimulus. Process 2240 is one example implementation of step 1904 of process 1900. In this example, the stimulus is a certain event occurring in a football game. In step 2242, event detection module 2250 detects that the game clock has reached one of certain pre-determined times. For example, the event detection module 2250 determines that the two minute warning has been reached. The event detection module 2250 may make this determination by analyzing a variety of inputs. For example, a play-by-play of the football game in text or other format could be analyzed. As another example, an audio feed of the game could be analyzed for the announcer stating the two minute warning has been reached. The video feed could also be analyzed using feature recognition software to look for the game clock in the video frames. The event detection module 2250 might also receive a cue from an operator through GUI 48. In some embodiments, the event detection module 2250 may receive the game clock time and other information as a data feed directly (or indirectly) from the game clock. In one embodiment, the event is not based on a certain time. For example, the event is that a replay challenge has been initiated in a football game. A replay challenge can be detected by using image analysis to identify a colored flag thrown by the coach or the word "challenge: depicted in the video.

In some embodiments, the event detection module 2250 applies the outside stimulus to a logical expression to determine whether the event has occurred. For example, the event might be satisfied if it is an on-sides kick attempt and the kicking team trails by 10 or fewer points. The logical expression could include any type of logical operators including, but not limited to AND, OR, NOT, XOR, etc.

In step 2244, the content selection module 2252 determines which cameras or other content should be buffered. In one embodiment, the content selection module 2252 inputs video feed metadata that describes each video feed. For example, the metadata indicates which video feed is for the 50 yard line, the end zone, overhead, sideline, etc. The camera selection module 2252 may have a table that is used to determine which cameras (and audio feeds) should be buffered for each type of event. For example, the table might indicate which camera angles should be buffered for a two-minute warning, which for on-side kick attempt, which for a two-point try after a touchdown, etc. Note that for certain events the table might not specify all of the camera angles by itself. For example, for a replay challenge the table might have default camera angles that can be overridden by other input. As a specific example, the operator might enter input to the GUI 48 to indicate what the best camera angles are for a replay challenge. As another alternative, the information might come from the replay booth itself. For example, the camera angles that the replay official is examining can be sent to the headend 12, such that the video cameras for those camera angles are buffered.

In step 2246, the preference table generation module 2254 generates or updates the preference table 1810b such that it has one or more entries for buffering the video and/or audio channels determined by the content selection module 2252.

Figure 23:
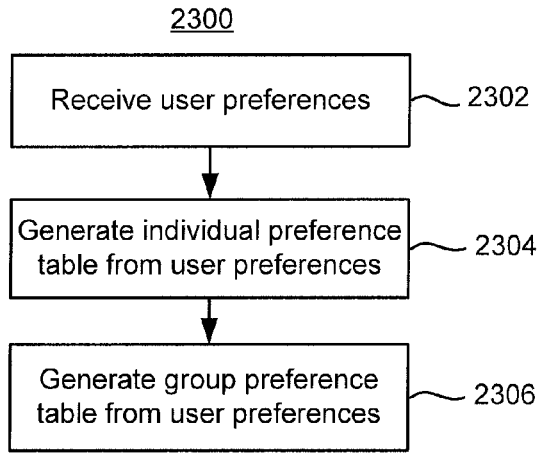
FIG. 23 depicts one embodiment of a process of generating preference tables based on user or group preferences.

FIG. 23 depicts one embodiment of a process 2300 of generating preference tables based on user or group preferences. Process 2300 is one implementation of step 1904 of process 1900. In step 2302, preferences are received. The preferences can be for individual users, but that is not required. The user profile information may be provided to the server 1832 from a handheld device 16 or from another source such as a computer on a network 92 (e.g., the Internet). For example, the users may send user profile information to the server 1832 using the bi-directional capabilities of the handheld devices. Alternatively, users could provide their profile information prior to the event by accessing a web site on the Internet. Note that the user profile information is not required to personally identify any specific individual. For example, a user profile might identify the city a person lives in, but not their home address. Therefore, privacy concerns regarding the handheld devices sharing personal information can be alleviated. Other possibilities exist for the users to provide their profile information.

In one aspect, users provide preferences when at a web site to register for receiving an RF transmission at the venue. For example, the user can indicate their favorite event participant in order to receive as much content as possible related to that participant. The user might be prompted with a series of questions to facilitate the process. User preferences might also be inferred based on information such as billing information or shipping addresses. The user preferences may also be received from the handheld device during the event. For example, the user might send their preferences or a user profile to the server 1832 (or other entity) during or before the event. The server 1832 collects information from numerous users and passes it to the fan based processing module 1850.

Note that at least a part of the user profile information can be provided by a source other than the user. For example, if the user paid for access to the RF transmission at the venue by credit card, the user's billing address (possibly limited to city to alleviate privacy concerns if the billing address is not needed by the head end) might be provided to the head end 12 (or server 1832) as user profile information.

In step 2304, the fan based processing module 1850 (which may be on a different or the same computing device as server 1832) generates individual based preference tables 1810c. As an example, the fan based processing module 1850 may determine that a certain user is a fan of a certain player and create an entry in the individual preference table 1810c that links that user to that player. The entry might include the device ID of the user and the player's name.

In step 2306, the fan based processing module 1850 generates a group based preference table 1810d. At least a portion of the received profile information can be used to form a group profile of two or more users. For example, the group profile can be based on demographics such as the percentage of spectators that are fans of certain players or racers in the event at the venue. As an example, the fan based processing module 1850 might determine that one large segment of users for a given event might be fans of team A and another of team B. Thus, the fan based processing module 1850 might generate a separate group based preference table 1810d for each football team. As another example, if it is determined that a certain event participant is a fan favorite, then the group based preference table 1810*d* might identify that event participant. The group based preference table 1810*d* might include a set of PIDs and device IDs associated with each PID. However, note that it is not required that PIDs be included. For example, if table 1810*d* includes the name of an event participant, then the channel recording manager 1815 may determine PIDs for the event participant dynamically.

FIG. 19B depicts one embodiment of a process 2320 of generating a recording table 1805 from a preference table 1810. Process 1810 can be used to generate a recording table 1805 from any of the preference tables 1810. Process 2320 is one implementation of step 1906 of process 1900. In step 2202, a descriptor is accessed from a preference table 1810. As an example, the descriptor specifies a certain race car driver.

In step 2324, one or more video channels that correspond to the descriptor are identified. For example, information that is provided with the video feeds 100 can be used to identify which video feeds are associated with a particular race car driver. As a specific example, the head end 12 receives information that indicates that a certain video feed 100 is the in-car camera of a race car driver. Thus, the channel recording manager 1815 can determine which video feeds to select.

In step 2326, a PID is added to the recording table 1805 for the video channel. Note that channel recording manager can obtain the PIDs for each video channel from the data processor 1822. If there are more descriptors in the preference table, then process 1220 returns to step 2322. Otherwise, the process 2320 goes to step 2340 to limit the recording table 1805 to the maximum number of channels that are to be buffered. For example, the recording table 1805 might be limited to five channels; however, more or fewer channels could be buffered. Limiting the number of channels to buffer can be accomplished by enforcing a priority scheme. For example, the preference tables 1810 might indicate a strength value for each preference such that video channels having a weaker preference are not including in the recording table 1805.

FIG. 24A is a block diagram of one embodiment of a handheld device 16 showing an overview of one embodiment of buffering content from an RF transmission. The single tuner 110 receives an RF transmission that may include many video streams, audio streams, and other data content such as ancillary content described herein. IN one example implementation, tuner 110 is permanently set to tune one frequency or one band of frequencies so that only one RF signal is received and processed. In some embodiments, the device has more than one tuner 110. Therefore, different video streams (or audio streams, or other data) can be received in different RF transmissions.

The handheld device has a recording table generator 2401 that accesses or generates one or more recording tables 1805. The device may extract a recording table 1805*a* from the single RF signal received by the tuner 110, but that is not a requirement. In one embodiment, the device obtains recording table 1805*a* from a separate RF transmission than the one with the content to be buffered. For example, the head end 12 broadcasts an RF transmission with video streams to be buffered and sends the recording table 1805*a* in a different RF transmission. As one example, the device may be capable of communicating over a cellular telephone network upon which the recording table 1805*a* is received. As another example, the recording table 1805 may be sent without the video streams to the device in a WiFi connection.

In some aspects a recording table 1805*b* is automatically generated at the handheld device by an automatic table generation module 2415. For example, automatic generation module 2415 can be software that can detect patterns or images in the received video streams so that the handheld can look for the face or a participant, the uniform (color, number) of a participant, the car of a participant, etc. in order to automatically choose a video channel to buffer. The software can be told what to look for based on user preferences supplied by the user of the handheld via the handheld's GUI and/or data received from the head end 12. For example, the recording table from the head end 12 can provide criteria (indirect identification of what to buffer) rather than PID (direct identification of what to buffer). The received criteria can be sent to the automatic table generation module 2415 which will use the criteria to automatically choose a PID set based on video content, audio content for data in the received RF signal.

The device may have a recording table 1805*c* that is created directly from input received through a user interface (UI) 800. The device may also have a stored recording table 1805*d*, which may have been provided by server 1832 when the user registered for the event. Further details of generating recording tables 1805*b* and 1805*c* at the handheld device will be discussed below.

One or more of the recording tables 1805 are used to generate a PID set 2410, which may be a set of PIDs that should be buffered at the device. In one embodiment, PID set 2410 is a list of PIDs from a recording table. For example, the PID set 2410 includes a set of five video channels that are to be buffered. Note that there may be multiple PIDs for a single video channel. For example, there may be a PID for packets used to transport the video stream and another PID for the packets that are used to transport the audio stream of the video channel. The PID set 2410 may also identify separate audio streams and other real-time data to be buffered. An example, of a separate audio stream is a radio broadcast. An example of real-time data is a play-by-play of a football game in a format that format other than a video stream or audio stream. The PID set 2410 is input to the PID filter 2404, which selects certain content (e.g., selected content that has the matching PID) in the RF transmission and forwards that content to User Datagram Protocol (UDP) source 2406.

The UDP source 2406 reformats the raw data from the tuner 110 and sends a transport stream to the Transport Stream (TS) Demultiplexor, which breaks the transport stream into different video channels and sends one video channel to each video memory buffer 27(1)-27(*n*). For ease of illustration, a single buffer is depicted for each video channel. However, note that the TS Demultiplexor 2408 might separate the packets that include the audio stream for a video channel from the packets that include the video stream and store them in different buffers, but that is not a requirement. In one embodiment, the TS Demultiplexor 2408 stores the video streams of a video channel in buffers 27, but does not store the audio streams of the video channels.

One of the video buffers 27 (e.g., buffer 27(1)) includes content that is being presented on the display 118. The TS Demultiplexor 2408 also sends a video stream that is selected for display to the video stream parser 2420, which parses the video stream. The TS Demultiplexor 2408 also sends the audio stream of the video channel that is selected for display to the audio stream parser 2422, which parses the audio stream.

The video decoder 114 may be, for example, an SVA decoder. After decoding the video stream, the video is presented on display screen 118. The audio decoder 120 may be an MPEG audio decoder (MAD). After decoding the audio stream, the digital-to-analog convertor (DAC) 2416 converts the audio to an analog signal for presentation on the audio speakers 124.

The video memory buffers 27 store the last "n" minutes of video content for each channel. In one embodiment, n is 5, 10, 15, 30, etc. minutes. Other values for n can also be used. It is not required that each buffer 27 store equal minutes of video content, but in some embodiments this is the case. Note that each buffer 27 might be used to store different camera angles of the same event. For example, the video buffers might store different camera angles of the same play (or series of plays) in a live football game.

Note that the device may also have a set of audio buffers 29(1)-29(n) connected to TS Demultiplexor 2408. The device may also have one or more data buffers 2429(1)-2429(1), connected to TS Demultiplexor 2408, for storing data other than video and audio. For example, some memory buffers 2429 may be used to buffer real-time (or non-real-time) data. An example of real-time data is text that includes a play-by-play description in a football or basketball game. An example format for real-time data is HTML, although the real-time data could be in many other formats including plain text, rich text, XML, streamed data tables, etc. Also, the real-time data might include a mix of data formats. Real-time data might include code for a JAVA script program, JPEG images, etc.

In one embodiment, the buffers 27, 29, 2429 are circular buffers. That is, the buffers 27, 29, 2429 are of limited size, after which older content is overwritten by new content. Each of the video buffers 27(1)-27(n) may be a part of the same physical memory device; however, that is not required. In some embodiments, one or more of the video buffers 27(1)-27(n) are in different physical memory devices. Note that when the video buffers 27(1)-27(n) are in the same physical memory device (e.g., different partitions of the same device), it is not required that the video buffers be contiguous, although that is one possibility. Likewise, the audio buffers 29(1)-29(n) may be in the same or different physical memory devices, and could be contiguous or non-contiguous when in the same memory device. Likewise, the data buffers 2429(1)-2429(n) may be in the same or different physical memory devices, and could be contiguous or non-contiguous when in the same memory device. Moreover, the video buffer 27, the audio buffer 29 and the data buffer 2429 may be in the same or different physical memory devices. Each of the video, audio and data buffers can also send their content back to TS Demultiplexor 2408 so that the content can be output via the display screen and/or audio speaker during replay mode playback.

Figure 24B:
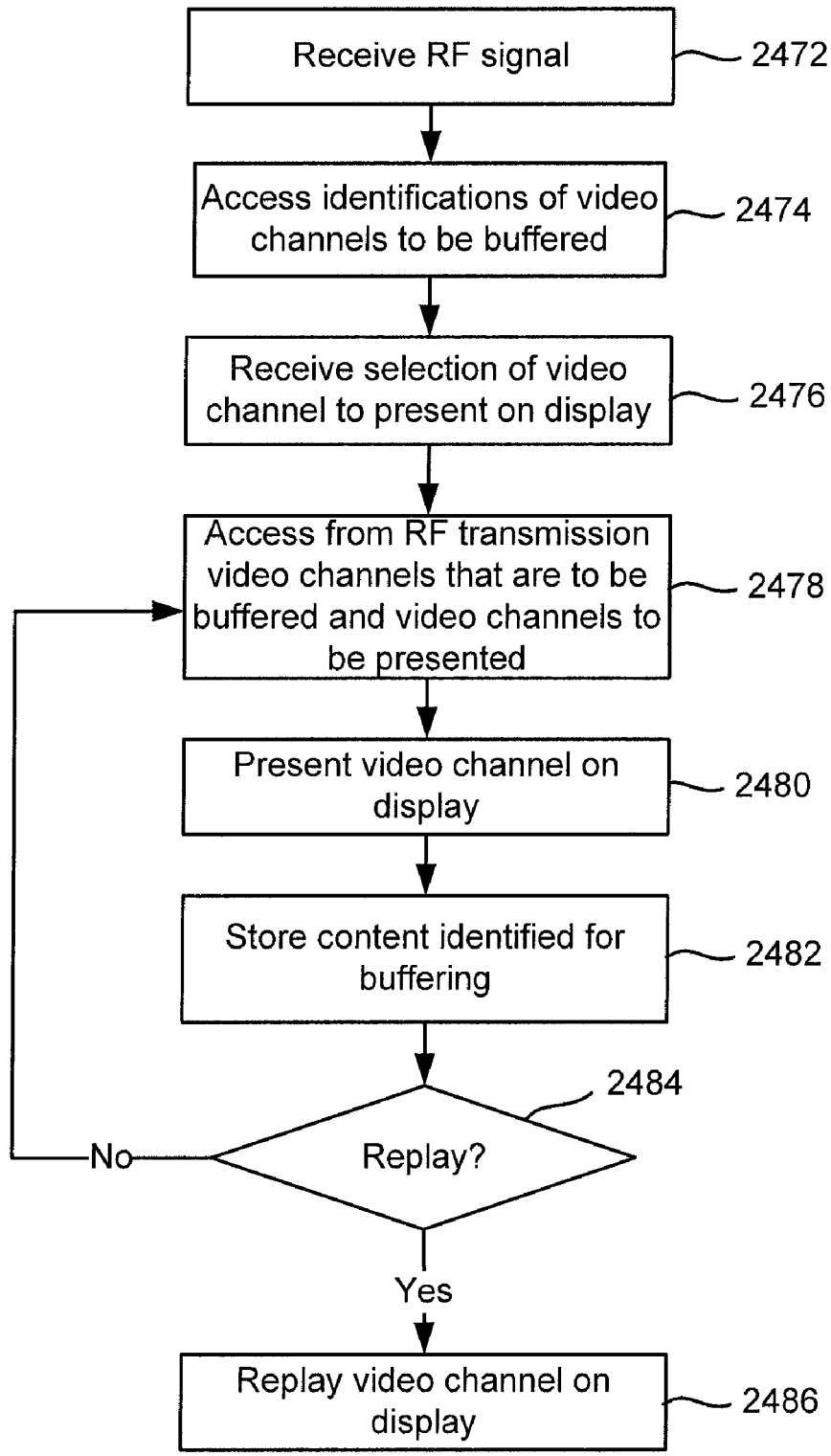
FIG. 24B is one embodiment of a process of presenting video streams.

FIG. 24B is a flowchart of one embodiment of a process 2470 of processing an RF transmission at a handheld device 16. In step 2472 an RF signal having video streams is received at the tuner 110. In step 2474, video channels to be buffered are identified. The handheld device 16 can identify a set of video channels from any of the recording tables 1805a-1805d. Note that in some embodiments, the recording table 1805a is accessed from the RF signal that has the video channels. For example, tuner 110, UDP source 2406 or another component in communication with tuner 110 can extract the recording table received in the RF transmission and store the received recording table 1805a in the recording table generator 2401. In one embodiment, the recording table generator 2401 receives the entire signal from tuner 110 and extracts recording table 1805a. In one embodiment, recording table generator 2401 is software executing on the handheld. In other embodiments, recording table generator 2401 is a dedicated circuit or a separate processor programmed to carry out the functions described herein.

In step 2476, the user selects one of the video channels in the RF transmission to present on the display 118. In step 2478, the handheld device extracts from the RF transmission the video channel that is to be presented and the video channels that are to be buffered from the RF transmission based on the recording table.

In step 2480, the video channel that is selected is presented on the display screen 118. The audio/video processor 40, 42 presents the video channel on the display screen 118 and audio speaker 124. In step 2482, the video channels to be buffered are stored in video buffers 27. The video channel that is being presented is buffered in the live video buffer 27(1). The other video channels are buffered in video buffers 27(2)-27(n). Note that in addition to buffering the video channels in the video buffers 27, audio may be buffered in the audio buffers 29 and data may be buffered in the data buffers 2429. Also note that in some embodiments, the stored video and audio data may have time indexes such that later it may be played back concurrently. The data stored in the data buffer 2429 may also contain time indexes. For example, while storing video channels of different camera angles of a car race in video buffers, contemporaneous audio data from various pit crew conversations are stored in the audio buffers 29. Thus, later the user is able to replay any of the camera angles along with a pit crew conversation that was occurring at the time of the scene.

The device continues to present the selected video channel and to buffer the presented video channel and the video channels identified for buffering. At some point, the user may request to replay any of the video channels that are being buffered (step 2484). In response to request to replay the content of one of the video channels, the device presents user selected content of the video buffer on the display 118 in step 2486 (replay mode playback) and, possibly, on the audio speakers 124.

In some embodiments, the device 16 concurrently replays the contents of more than one set of the video buffers 72, audio buffers 29, and data buffer 2429. For example, the device 16 concurrently replays the contents of one of the video buffers 27 and one of the audio buffers 29. As a specific example, the handheld 16 presents one in-car camera of a race car that is stored in video buffer 27(2) on the display 118 while concurrently presenting a conversation between the car driver and the pit crew that is stored in audio buffer 29(2) on the speaker 124. When concurrently playing the contents of the video buffer 27 and audio buffer 29, the presentation may be synchronized such that the video and audio presentations correspond to the same points in real time. Note that the video and audio streams may have time indexes in order to facilitate the synchronization. Note that any of the audio buffers 29(1)-29(n) might be concurrently presented with any of the video buffers 27(1)-27(n).

As another example, data from one of the data buffers 2429(1)-2429(n) is presented on display 118 concurrently with the content of one of the video buffers 27(1)-27(n). In one embodiment, content from all three of the buffers 27, 29, 2429 is presented on the device concurrently. Any combination of the buffers 27, 29, 2429 may be played concurrently.

Figure 25:
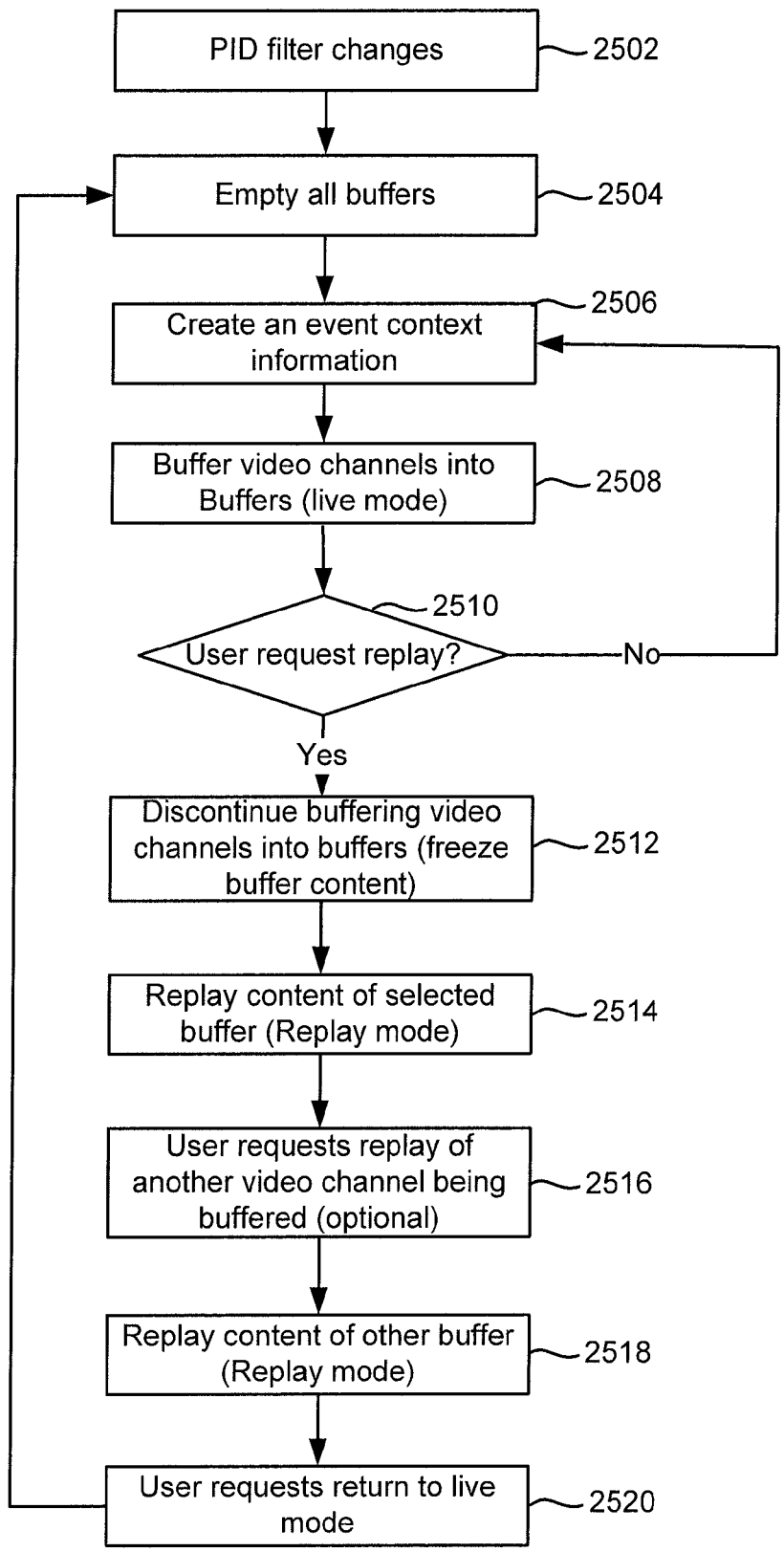
FIG. 25 is a flowchart of one embodiment of a process of buffering video channels at a handheld device.

FIG. 25 is a flowchart of one embodiment of a process of buffering and replaying video channels at a handheld device. Reference will be made to the example handheld device in FIG. 24, although the process is not limited to that device. FIG. 25 is one example of further details of steps 2482, 2484, and 2486 of process 2470. As previously mentioned, the handheld device 16 may have a PID set 2410 that identifies the video channels to be buffered. The PID set 2410 could change from time to time. For example, if a new recording table 1805a is received in the RF transmission, a new PID set 2410 may be created. As another example, if the user specifically requests that different video channels be buffered, the PID set 2410 may change. Note that the PID set 2410 is input to the PID filter 2404, which accesses the video channels (or other content) identified in the PID set 2410 from the RF transmission. Therefore, the PID filter 2404 in the tuner 110 accesses a different set of video channels when the PID set 2410 changes (or is established for the first time). In step 2502, the PID filter 2404 is established or changed.

In step 2504, the video memory buffers 27 are emptied. Note that when the PID filter 2404 changes this implies that different content may be stored in one or more of the buffers 27. For example, the video buffers 27 might have been storing different camera angles of a touchdown drive during a football game. However, with the change to the PID filter 2404, now the buffers 27 are going to store different camera angles of a following on-side kick. In order to keep the context of all of the buffers 27 the same, it may be beneficial to empty the video buffers 27 when such a switch is made. However, emptying the video buffers 27 when the PID filter 2404 changes is not a requirement.

In step 2506, an event context is created so that the user will have a context when replaying the video that is currently being stored. As an example, the current video may be different camera angles of a certain lap of a racing event. As another example, the current video may be different camera angles of a certain portion of a football game. Therefore, the event context might include the current score, the quarter and time left in the quarter, etc. The event context may be any information that will provide the user with context for the video content. The event context may be obtained from the ancillary data in the RF transmission or another source.

In step 2508, video channels are buffered, while at the same time decoding and displaying live video to the user via display 118 of the handheld device. If more than one video stream is being presented on the display 118, typically only one audio stream would be presented. In one embodiment, the TS Demultiplexor 2408 sends a video stream that is to be presented to the video stream parser 2420 and an audio stream to the audio stream parser 2422. The TS Demultiplexor 2408 also sends the video stream that is being presented on the display 118 to a "live" buffer 27(1) so that the currently presented video stream can be replayed. The TS Demultiplexor 2408 also sends several other video channels corresponding to the PID set 2410 to the other video memory buffers 27(2)-27(n). Note that the video channels that are sent to the video buffers 27 do not need to be decoded prior to buffering. Also note that it is not required that both the video stream and audio stream of a video channel be buffered.

As long as the user does not request to enter replay mode, the device continues to buffer newly received video into the video buffers 27. From time to time, the device creates new event context information. For example, for each new lap in the race or for each score or new quarter in a football game new event context is created and associated with the video that is currently being buffered. This is represented in the flow diagram by the process returning to step 2506.

When the user requests to replay one of the video channels being buffered (step 2510), the device enters replay mode. The user may request replay mode by selecting a button on a user interface 800 (thereby allowing the user to access the content of the buffers). In response, the device may display a set of the channels that are currently being buffered (including the channel that is being displayed). The example handheld device 16 depicted in FIG. 3B shows an example menu of buffered channels 813. The user then selects the desired channel for replay. The user may make the selection with user input keys 800b, 800c or by touching the display 118 if touch screen capability is provided.

In step 2512, the system stops buffering new content. For example, the TS Demultiplexor 2408 no longer sends video channels to the video memory buffers 27. Thus, the content of the video buffers 27 is temporarily frozen.

In step 2514, the device replays portions of the memory buffer 27 for the selected video channel. That is, user selected portions of the video streams are replayed on the display 118. The associated audio stream may also be presented on the speakers 124. The event context that was stored in step 2506 may also be displayed to provide the user with context for the video. For example, if the video content is a football game, then the quarter and time left in the quarter may be displayed on display 118. For the sake of illustration, it will be assumed that the user selected to replay the video channel being buffered in video buffer 27(3). The user may replay portions of the video channel by rewinding, playing, fast forwarding, etc. Referring to the example device 16 of FIG. 3B the user may select user input keys 800c to control the video when in replay mode. The device routes content of the selected video memory buffer 27(3) to the TS Demultiplexor 2408. The TS Demultiplexor 2408 forwards that content to the video stream parser 2420 and audio stream parser 2422. After parsing, the video component and audio component are decoded by the SVA decoder 114 and MPEG audio decoder 120. Note that another option is to parse and decode the video stream prior to buffering. Also note that if the TS Demultiplexor 2408 had stored the audio stream and video stream in different buffers 27, the content of those buffers 27 might be sent straight to the parsers 2420, 2422.

While in replay mode, the user may request to replay another one of the video channels. For example, the user might want to view a touchdown catch from numerous different angles. In optional step 2516, the user requests to replay a different video channel. For the sake of illustration it will be assumed that the user has selected the video channel that was buffered in video buffer 27(2). In step 2518, the device presents content of the selected memory buffer 27(2) in the display 118 in response to user commands of fast forward, rewind, pause, play, etc. To do so, the device routes the contents from video buffer 27(2) to the TS Demultiplexor 2408. The TS Demultiplexor then sends the video stream to the video parser 2420. The audio stream from buffer 27(2) may also be presented on speakers 124.

Eventually, the user may request to go back to live mode in step 2520. The user may make this request by entering a command on a GUI. When going back to live mode the device may empty all of the video buffers 27 (step 2504). However, it is not an absolute requirement that the video buffers 27 be emptied. After being emptied, the buffers are no longer frozen and will start buffering new content.

As previously discussed, the PID set 2410 may be input to a PID filter 2404 to select which video channels (or other data) are buffered. The PID set 2410 may be derived from recording table 1805a provided by head end 12, UI recording table 1805b, auto-generated recording table 1805c (generated on the handheld), or stored recording table 1810d. Note that it is not required that the device have all of the recording tables 1805a-2805d. The device could have any subset of recording tables 1805a-2805d.

In one embodiment, the user is allowed to select which of the recording tables 1805a-2805d is used. In another embodiment, one of the tables 1805 could be used by default if the user has not provided a selection. For example, the recording table 1805a from an RF transmission 1805a could be used unless the user selects to user another table 1805*b*, 1805*c*, 1805*d*. In another embodiment, a priority scheme may be used to determine which recording table 1805 is used for the PID set 2410. For example, if the device was using a recording table from the head end and the user specifically requests certain camera angles, then the table from the head end would cease to be used.

In another embodiment, the handheld device always uses recording table 1805*a* received from the head end 12. That recording table 1805*a* is received in and extracted from the RF signal and stored in recording table generator 2401. In one example, recording table generator 2401 will read recording table 1805*a*, extract the PIDs from recording table 1805*a* and send those PIDs to PID filter 2404 of tuner 110.

In embodiments where there are multiple recording tables, recording table generator 2401 will read the appropriate recording tables (as discussed above—e.g., by priority or user preference), extract the PIDs from recording table and send those PIDs to PID filter 2404 of tuner 110.

Note that over time at least some of the recording tables 1805 may change. For example, the head end 12 may update the head end recording table 1805*a* by sending an updated table in the RF transmission. The head end 12 might place a flag in the RF transmission to indicate that the table 1805*a* has changed.

The user can create a new UI recording table 1805*c* at any time by entering information into the UI 800. In one aspect, a PID set 2408 is created based on input entered into the UI 800. Thus, the user can directly select which video channels to record by, for example, selecting which camera angles to record. In one aspect, the user is presented a GUI that allows user selection of video channels, from which the recording table 1805*c* is constructed.

The generated recording table 1805*c* can be generated automatically based on various inputs such as user profile information and information in the RF transmission. An example of automatically generating a recording table at the handheld device is to generate a table that causes video channels associated with the user's favorite participant to be buffered. For example, the user creates a user profile that indicates that the user is a fan of a given participant. Each PID in the recording table 1805*a* in the RF transmission may have a descriptor such as a name of an event participant. The PIDs are examined for PIDs with descriptors that match the participant to create a set of PIDs. Those PIDs are used to create the recording table 1805*c*. Over time, the descriptors associated with the PIDs may change. Therefore, the recording table 1805*c* may be dynamically updated. In some embodiments, the handheld could include software that can detect patterns or images in the received video streams so that the handheld can look for the face or a participant, the uniform (color, number) of a participant, the car of a participant, etc. in order to automatically choose a video channel to buffer.

Figure 26:
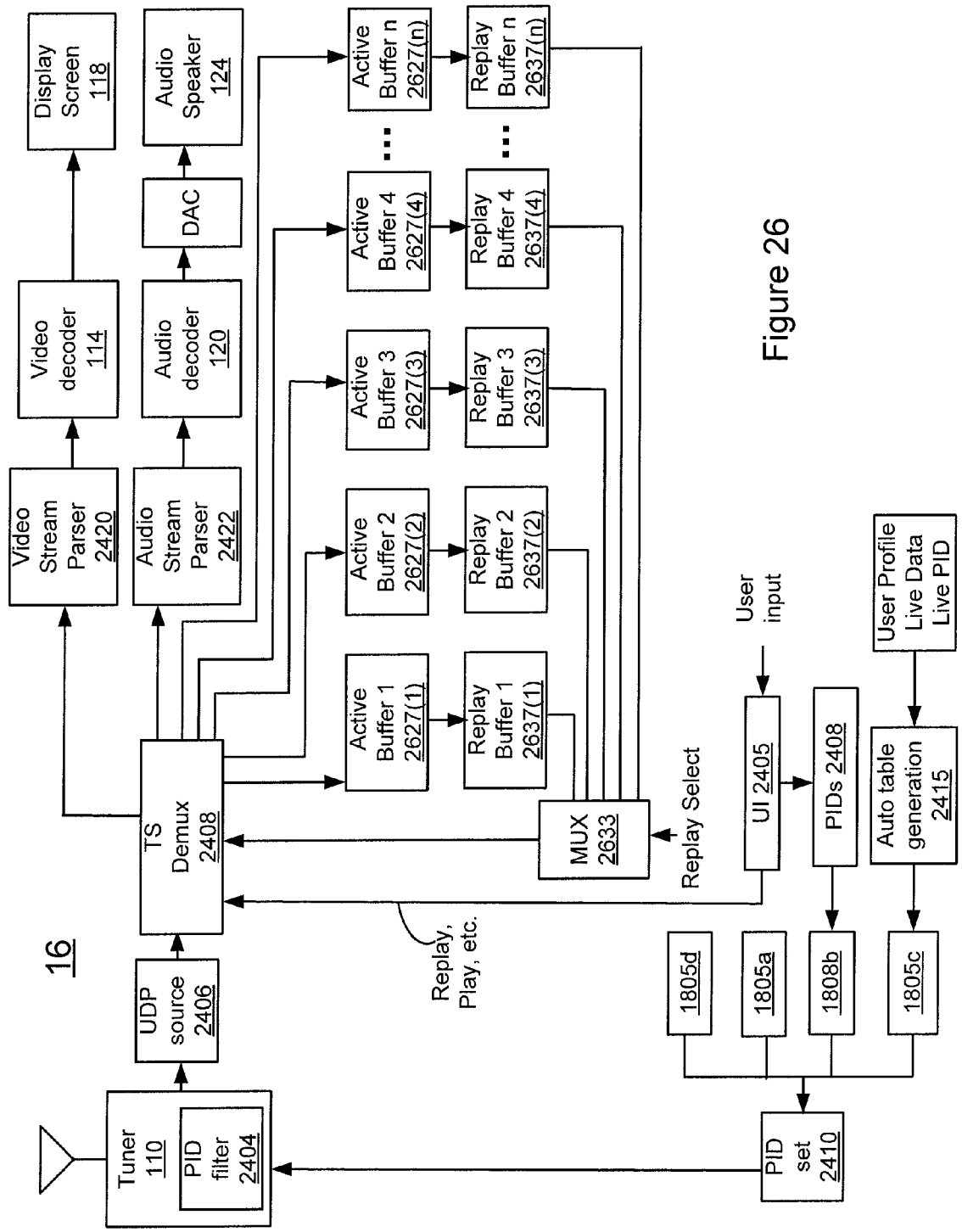
FIG. 26 is a block diagram of an embodiment of a handheld device having a set of active video buffers and a set of replay video buffers.

FIG. 26 is a block diagram of an embodiment of a handheld device 16 having two sets of buffers (e.g., video buffers 2627(1)-2627(*n*) and video buffers 2637(1)-2637(*n*)). In one embodiment, video buffers 2627 are used to continuously buffer selected video channels that are currently being received and buffers 2637 are used when the user desires to replay video. In one aspect, when the user requests a video replay, the content of the active buffers 2627 are copied to the replay buffers 2637. The content of the replay buffers 2637 is frozen while the user is in replay mode. The MUX 2633 is connected to each of the replay buffers 2637(1)-2637(*n*) such that the contents of one of the replay buffers 2637(1)-2637(*n*) may be transferred to the TS Demultiplexor 2408 when in replay mode. In one embodiment, the signal "Replay Select" is input to the MUX 2633 to select the replay buffer 2637(1)-2637(*n*) that corresponds to the video channel that the user wishes to replay. Each active buffer 2627 and each replay buffer 2637 may store both the video stream and the audio stream of a given video channel. However, it is not required that both the video stream and the audio stream be stored. In one embodiment, only the video stream of a video channel is stored. Note that active buffers 2627(1)-2627(*n*) may be part of the same physical memory or different physical memory devices. Likewise replay buffers 2637(1)-2637(*n*) may be part of the same physical memory or different physical memory devices. Moreover, active buffers 2627 and replay buffers 2637 may be part of the same physical memory or different physical memory devices.

The device of FIG. 26 may also have a set of active audio buffers and a set of replay audio buffers which store audio content that is not associated with a video channel (e.g., a conversion between a pit crew and a driver). The device may also have a set of active real-time data buffers and a set of replay real-time data buffers.

Figure 27A:
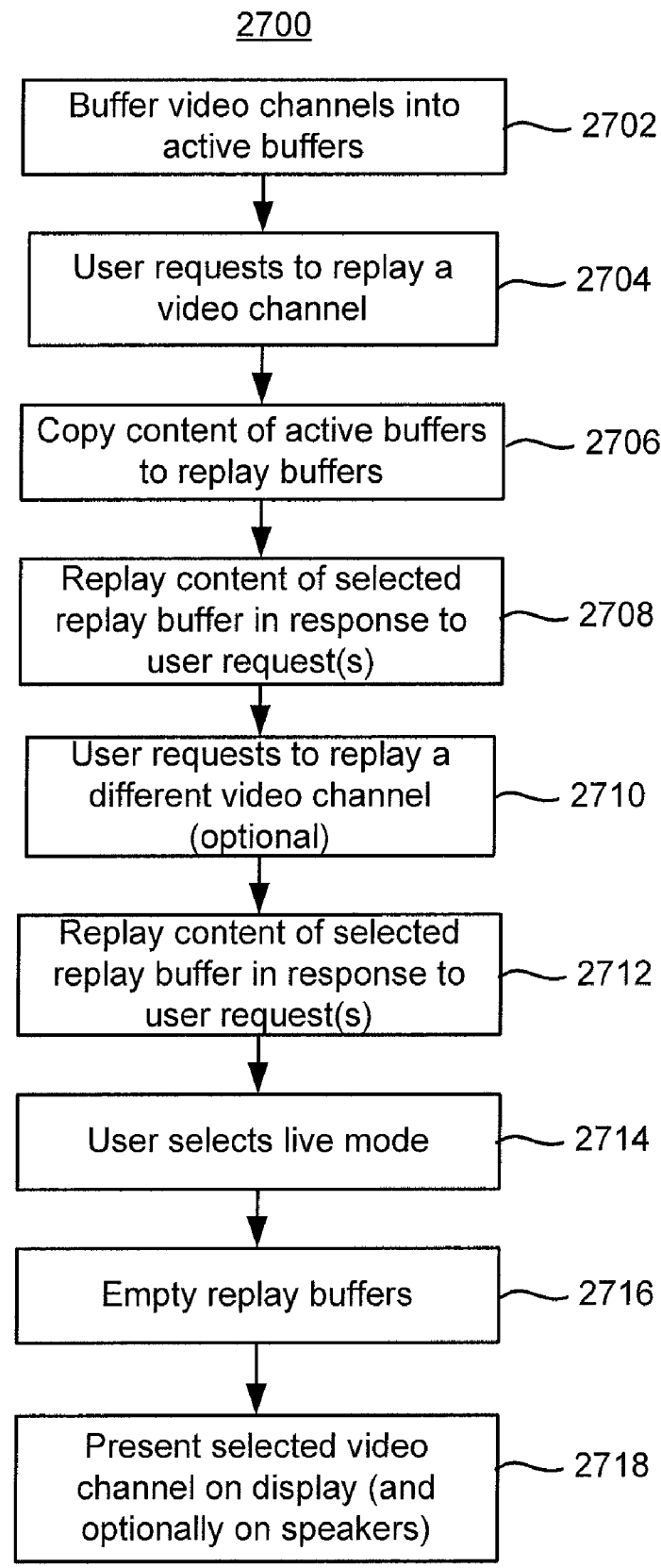
FIG. 27A is a flowchart of one embodiment of a process of buffering content using two sets of buffers.

FIG. 27A is a flowchart of one embodiment of a process 2700 of buffering content using two sets of buffers. The handheld device of FIG. 26 will be referred to when discussing process 2700, but process 2700 is not limited to that device. FIG. 27A is one example of further details of steps 2482, 2484, and 2486 of process 2470 of FIG. 24B. In step 2702, the device buffers video channels into the active buffers 2627. At this time the device is in a "live mode" in which one (or more) of the video channels may be presented on the display 118. At this point, the PID filter 2404 has selected certain video channels for buffering based on the PID set 2410. Those video channels are input to the TS Demultiplexor 2408, which sends one of the selected video channels to each of the active buffers 2627(1)-2627(*n*). One of the active buffers (e.g., 2627(1)) corresponds to the video channel that is currently being presented on the display 118. The TS Demultiplexor 2408 sends that video channel to the video and audio parsers 2420, 2422, which pass the parsed streams to the video and audio decoders 114, 120. Note that the video channels that are buffered do not need to be decoded prior to buffering, although they could be if desired.

In step 2704, a user requests to replay one of the video channels. The user may request replay mode by selecting a button on a user interface 800. In response, the device may display a set of the video channels that are currently being buffered (including the video channel that is being displayed). The user then selects the desired video channel for replay.

In step 2706, the device copies the content from each of the active buffers 2627 to respective ones of the replay buffers 2637. This step 2706 may include copying over all content (if any) that may exist in replay buffers 2637. The TS Demultiplexor 2408 continues to buffer newly received video into the active buffers 2627. However, the content of the replay buffers 2637 is frozen. Note that while in replay mode, if there is a change to the PID filter 2404, then different video channels may be sent to the active buffers 2627.

In step 2708, video stream of the selected replay buffer 2637 is presented on the display screen 118 in response to user inputs that may include rewind, fast forward, pause, play, slow play, etc. The audio stream of the selected video channel may be presented on speaker 124. For the sake of illustration, it will be assumed that the user selected to replay the video channel being buffered in replay buffer 2637(3). The user may replay portions of the video channel by rewinding, playing, fast forwarding, etc. The device routes content of the selected replay buffer 2637(3) to the TS Demultiplexor 2408.

The TS Demultiplexor 2408 forwards that content to the video stream parser 2420 and audio stream parser 2422. After parsing, the video stream and audio stream are decoded by the video decoder 114 and audio decoder 120. Note that another option is to parse and decode the video channel prior to buffering.

In step 2710, the user optionally selects a different video channel for replay. As an example, the use calls up a menu 813 of the different video channels (e.g., camera angles) and selects a new one for replay. In step 2712, the device presents the content of the newly selected video channel. For example, the device transfers content from the newly selected replay buffer 2637(1) to the TS Demultiplexor 2408.

In step 2714 the user leaves the replay mode. For example, the user selects to view one of the video channels live. This may be achieved by selection of a button on a user interface, but there could be other techniques. In step 2716, the replay buffers 2637 are emptied. Emptying the replay buffers is optional, but may be performed to assure that the next time replay mode is entered that only new content is in the replay buffers 2637.

In step 2718, the content of one of the video channels is presented on the display 118. The TS Demultiplexor routes the selected video channel to the parsers 2420, 2422. Note that throughout process 2700 buffering of the newly received video channels is maintained. Therefore, if the user desires to go back to replay mode shortly after leaving replay mode the active buffers 2627 will include the latest video content regardless of the length of time the user had spent in replay mode.

As discussed herein, the handheld device may have a memory buffer that holds the last "n" minutes of one or more video channels. The user may replay portions of the video channel by rewinding, playing, fast forwarding, etc. In one embodiment, the handheld device discontinues buffering when the user is replaying video from the memory buffer. However, under certain conditions the device automatically starts to buffer again. For example, if the user does not press any of the trick play keys (rewind, fast forward) within a timeout period, then the device automatically starts to buffer the video signal again. Therefore, newly received video channels will be buffered.

Figure 27B:
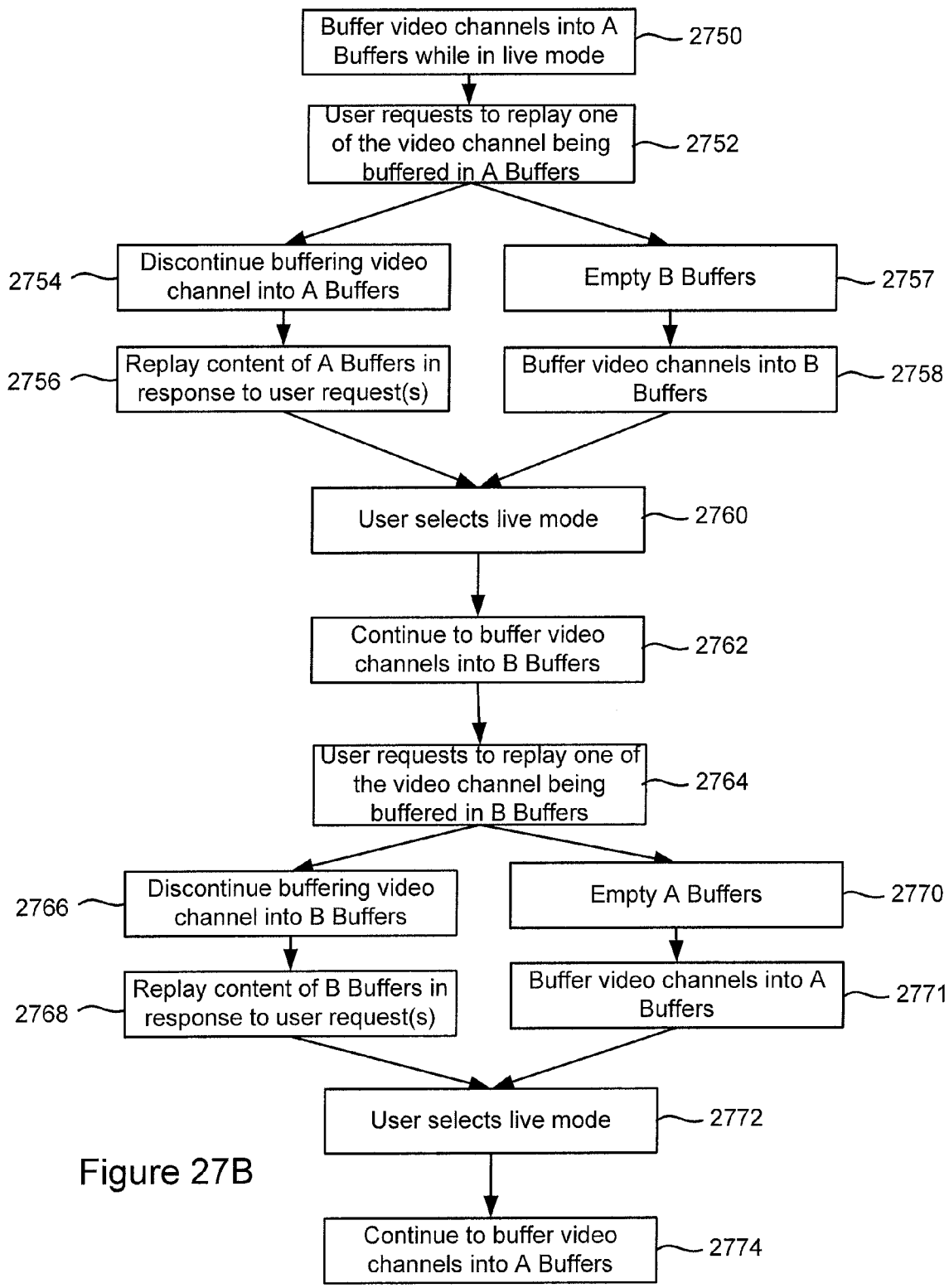
FIG. 27B is a flowchart of one embodiment of a process of buffering content using two sets of buffers.

FIG. 27B depicts another embodiment of a process of buffering content using two sets of buffers. In this embodiment, the device has two sets of buffers that will be referred to as the A buffers and the B buffers. At different times, both sets of buffers can be used as the live buffers and replay buffers. FIG. 27B is one example of further details of steps 2482, 2484, and 2486 of process 2470 of FIG. 24B. In step 2750, the device buffers video channels into the A buffers. At this time the device is in a "live mode" in which one (or more) of the video channels may be presented on the display 118. At this point, the PID filter 2404 has selected certain video channels for buffering based on the PID set 2410.

In step 2752, a user requests to replay one of the video channels. The user may request replay mode by selecting a button on a user interface 800. In response, the device may display a set of the video channels that are currently being buffered (including the video channel that is being displayed). The user then selects the desired video channel for replay.

In step 2754, the device discontinues to buffer newly received video into the A buffers. Thus, the content of A buffers is frozen. In step 2756, the video channel of the selected buffer from the A buffers is presented on the display screen 118 in response to user inputs that may include rewind, fast forward, pause, play, slow play, etc. The audio stream of the selected video channel may be presented on speaker 124. After the user request a replay the device may empty the B buffers (2757); however, this is not an absolute requirement. While the user is replaying the content of the selected buffer from the A buffers, the device buffers newly received video into the B buffers (step 2758). Note that while in replay mode, if there is a change to the PID filter 2404, then different video channels may be sent to the B buffers. If the user selects a different video channel for replay, then device presents the content of the newly selected video channel from the A buffers.

In step 2760 the user leaves the replay mode. For example, the user selects to view one of the video channels live. This may be achieved by selection of a button on a user interface, but there could be other techniques. In step 2762, device continues to buffer newly received video into the B buffers.

In step 2764, a user requests to replay one of the video channels that are currently being buffered in the B buffers. The user may request replay mode by selecting a button on a user interface 800. In response, the device may display a set of the video channels that are currently being buffered (including the video channel that is being displayed). The user then selects the desired video channel for replay.

In step 2766, the device discontinues to buffer newly received video into the B buffers. Thus, the content of B buffers is frozen. In step 2768, video stream of the selected buffer from the B buffers is presented on the display screen 118 in response to user inputs that may include rewind, fast forward, pause, play, slow play, etc. The audio stream of the selected video channel may be presented on speaker 124. After the user request a replay the device may empty the A buffers (step 2770); however, this is not an absolute requirement. While the user is replaying the content of the selected buffer from the B buffers, the device buffers newly received video into the A buffers (step 2771), since the A buffers are no longer frozen. Note that while in replay mode, if there is a change to the PID filter 2404, then different video channels may be sent to the A buffers. If the user selects a different video channel for replay, then device presents the content of the newly selected video channel from the B buffers.

In step 2772 the user leaves the replay mode. For example, the user selects to view one of the video channels live. This may be achieved by selection of a button on a user interface, but there could be other techniques. In step 2774, device continues to buffer newly received video into the B buffers. The process of FIG. 27B can subsequently be repeated one or many times.

As discussed herein, the handheld device may have a memory buffer that holds the last "n" minutes of one or more video channels. The user may replay portions of the video channel by rewinding, playing, fast forwarding, etc. In one embodiment, the handheld device discontinues buffering when the user is replaying video from the memory buffer. However, under certain conditions the device automatically starts to buffer again. For example, if the user does not press any of the keys for replay mode (rewind, fast forward, "Go to Live Mode"etc,) within a timeout period, then the device automatically goes to live mode and starts to buffer the video signal again. Therefore, newly received video channels will be buffered.

Figure 28:
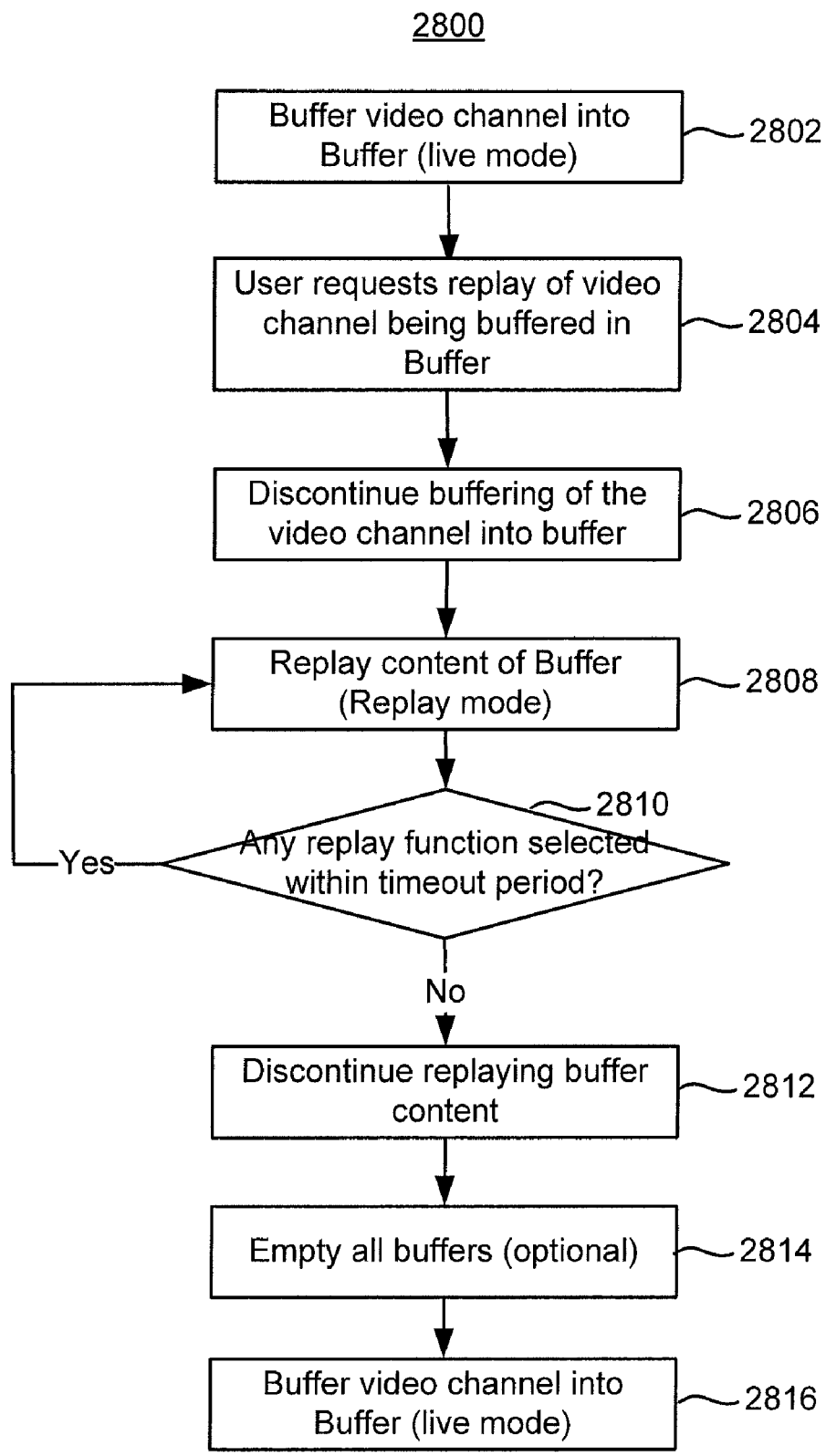
FIG. 28 depicts one embodiment of a process of automatically buffering a video channel for which buffering has been discontinued.

FIG. 28 depicts one embodiment of a process 2800 of automatically buffering a video channel for which buffering has been discontinued. Process 2800 will be discussed with reference to the example device of FIG. 24 with one set of video buffers, although process 2800 is not so limited. FIG. 28 is one example of further details of steps 2482, 2484, and 2486 of process 2470 of FIG. 24B. In step 2750, the device buffers video channels into the A buffers. In step 2802 video channels are buffered into video buffers 21(1)-27(n). The selection of the video channels to buffer may be made based on the PID set 2410.

In step 2804, the user requests to replay one of the video channels that is being buffered. For example, the user calls up menu 813 and selects one of the video channels. In step 2806, buffering into the video buffers 27(1)-27(n) is discontinued. In other words, the content of the video buffers 27(1)-27(n) is frozen. In step 2808, content of the selected video buffer 27 is presented on the display 118 in response to user input.

Provided that the user selects a replay function within a timeout period, the content of the video buffer 27 continues to be displayed. The replay function may be a function that allows the user to manipulate the viewing of the video. Examples of replay functions include, but are not limited to, rewind, play, pause, fast forward, and slow step.

If the user fails to select a replay function within the timeout period (e.g. 30 seconds or other time period) (step 2810), then the device discontinues replaying the content of the selected video buffer 27 (step 2812). Next, the video buffers 27 are emptied in step 2814. Emptying the video buffers 27 is optional. In step 2816, the system is back in live mode such that a chosen or default video channel is displayed by the handheld and the handheld is buffering the newly received live video as per the current recording table.

Note that the recording actions taken at the handheld device are not limited to the foregoing actions. For example, the record command might be a suggestion to record either video only or audio and video based on the user profile. For example, most users might be satisfied with only video being recorded, but a few users might want the audio recorded also. The record command could indicate that the segment to be recorded is associated with a certain race car driver. Therefore, if the user profile indicates that the user is a fan of that race car driver, both the video and audio can be recorded. This is just one example of applying different recording settings to the same segment based on user profiles.

The foregoing methods of buffering video streams can be applied to buffering audio streams and real time data. Also, disclosed herein are handheld devices that are capable of receiving and buffering video streams, audio streams, and real time data in accordance with the foregoing methods. Also, devices for transmitting video streams with commands that instruct receiving devices to buffer selected video streams have are disclosed herein. The transmitting device can determine which video streams to buffer based on human input and automatic analysis of data. In some aspects, the transmitting device determines which streams to buffer based individual or group profiles The technology for displaying video from an event and buffering that video can be used with other handheld devices that the examples herein. One alternative embodiment includes transmitting multiple video and/or audio streams to a cellular telephone (or other wireless mobile computing device) and displaying selected audio/video on that cellular telephone (or other wireless mobile computing device). The cellular telephone (or other wireless mobile computing device) can implement the buffering described herein. In one implementation, the cellular telephone (or other wireless mobile computing device) will include at least some of the hardware described herein or other hardware used to perform the functions described herein. In other embodiments, the cellular telephone (or other wireless mobile computing device) will implement all or a subset of the buffering features using software (stored in processor readable storage) to program a processor.

User Profile Based Content Management

The handheld device 16 may be designed to implement profile based content management. In one aspect, the user profile affects which of the video streams are buffered. If the user profile is stored on the handheld device, the handheld device can select video channels based at least in part on the user profile. Note that the handheld device may also use certain information that was added to the video channel to select the video channels. For example, if a user attending a football game is a fan of the visiting team, that user may be most interested in video channels that feature the visiting team. As a specific example, the user might be interested in a video channel that includes a touchdown pass by the visiting team. The user's profile information could imply this by, for example, the user's home address or billing address. The user profile might also explicitly state the fan's preferences. The RF transmission can include information that indicates that for a given range of time one or more of the video channels are of special interest to fans of the visiting team. The handheld device may buffer one or more of the video channels based on the commands in the RF transmission and the user profile. Further details are discussed below.

The memory 102 of the handheld device 16 may include data that defines a profile. On the basis of this data the handheld device 16 can filter the video, audio or data being displayed to the spectator. In some embodiments, the handheld device determines what content to buffer based on the user profile. In one form of implementation, the wireless RF transmission issued by the transmitter 14 conveys generic spectator content that is the same for a group of electronic devices 16 or for all the electronic devices 16 that receive the wireless RF transmission. The spectator profile in one or more of the electronic devices 16 filters the generic content to buffer spectator specific content.

In a specific example, the profile defines a spectator category among several possible spectator categories. For instance the profile may allow for gender-based classification, such as male and female. In another possibility the profile is designed such as to create age-based classification. Yet another possibility is to create revenue-based classification where spectators are classified according to the amount of personal income. Another possible option is to define a profile based on personal preferences, such as:

Favorite racing team;
Favorite race car driver;
Preferred type of food;
Favorite types of automobiles;
Favorite football team
Favorite football player.

The profile data loaded in the memory 102 via the graphical and navigational layer. The spectator is presented with an information screen inviting the spectator to answer questions that will define the profile. The number of questions necessary to define the profile can be minimal, such as requiring the spectator to specify "male" or "female" or larger in the case of more complex profile structures.

The profile can be designed to be defined only once or it can be updated over time. Simple profile structures such as gender-based ones will need to be defined only once and as long as the same spectator keeps the handheld device 16 no change will be required. More complex profile structures may need adaptation more often. Profiles based on spectator choices will likely change to reflect the spectator's changing preferences over time. In the case of sophisticated spectator profiles, for instance those that factor events or conditions occurring at specific auto racing events, the profile will need to be updated by the spectator at each particular event.

The profile in the handheld device 16 may be based on racing teams the spectator is most interested in. For example, the profile allows the spectator to specify three teams of interest in the order of preference, such as team A, team B and team C. The video feeds that are broadcasted to the handheld device 16 may include views from cameras in all the racing vehicles. The profile data based on team preference could allow the spectator to define a preference for which channels get stored in a memory buffer.

In one aspect, there may be a service level profile that allows the spectator to access only the services that the spectator paid for. For example, the spectator may have opted to access the financial news service during the live sporting event and paid a premium for this service. The spectator profile data in the memory 102 of the handheld device 16 reflects this choice and enables the handheld device 16 to deliver the financial news service for viewing on the screen. When a service level profile is used it is preferred to design the spectator profile structure that is stored in the memory 102 of the handheld device 16 in a manner such that the spectator cannot freely change the service level portion of the profile. The service level portion of the profile can be altered remotely, such as for example by sending along with the authentication information used to unlock the electronic devices 16, data indicating which service level is associated with a particular handheld device 16. Specifically, this can be done by broadcasting the block of identifiers and sending with each identifier a code identifying the service level for the handheld device 16 associated with the identifier. When the handheld device 16 unlocks itself by matching an identifier being broadcast to its own identifier, it reads the service level identification code and stores it as spectator profile data in the memory 102. At this point, the spectator profile data will dictate which service the spectator can access and which service is blocked. Note that the service level profile may be used to cause the device to buffer selected content. For example, as opposed to the device unlocking itself be matching an identifier in the broadcast with its own unique identifier the device buffers content having an identifier that matches its own unique identifier.

Handheld Electronic Device Authentication and Service Levels

Figure 5:
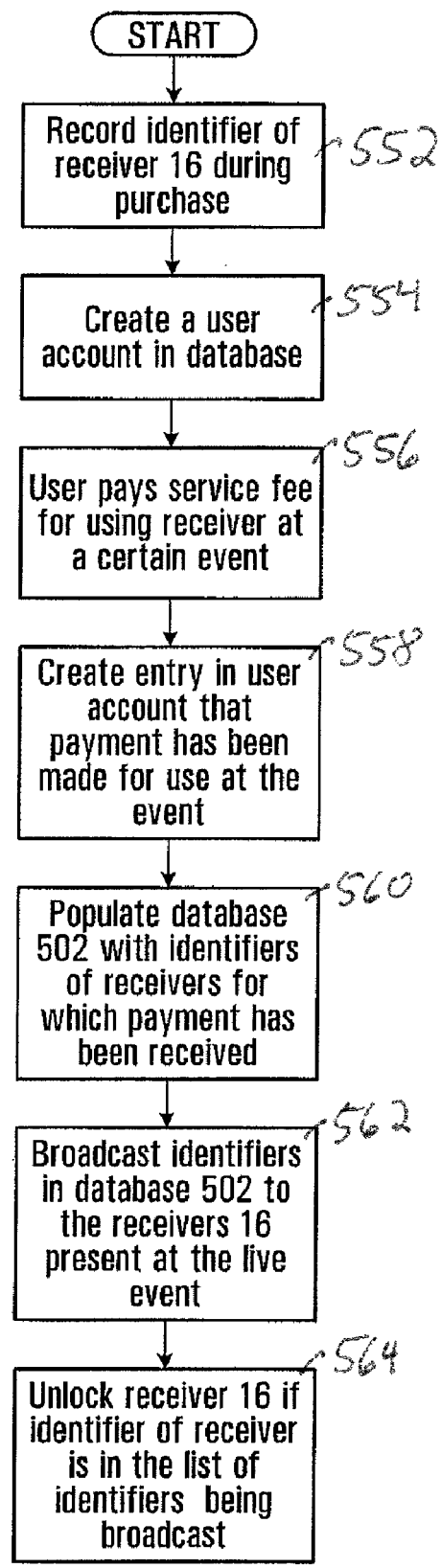
FIG. 5 is a flow chart illustrating one embodiment of a handheld electronic device authentication process.

The flowchart in FIG. 5 illustrates the general handheld device 16 registration process that also covers the authentication feature. When the spectator purchases the handheld device 16 the vendor will record the unique identifier of the handheld device 16 (step 552). The identifier can be any code, such as a string of numbers or characters that is assigned to the handheld device 16 such that it can be distinguished from other handheld electronic devices 16. Typically, the identifier is a binary code that is permanently stored in the handheld device 16 and thus unalterable. The processor 101 can readily access this binary code when the handheld device 16 is in use. For convenience this unique identifier can be placed on a removable sticker on the handheld device 16 or on the box in which it is shipped from the manufacturer. The identifier can be printed as a bar code that can be read by a machine, such as a bar code reader, can appear as alphanumerical characters or both. In this fashion the clerk performing the transaction can record easily the identifier without having to extract it from the handheld device 16.

At step 554, once the identifier has been recorded, the vendor will typically create a user account in a database. Another option is to allow the user to create online his/her account. This option is discussed later. The user account will allow the user to purchase the delivery of content to the handheld device 16. In the example described in FIG. 5, the user purchases content access on an event basis. In other words, for each event the user wishes to attend, the user will make a payment and the delivery of service will only be available for that event; however, other options exist. For example, the user may purchase access to content on a subscription basis, such as to have access to content over a predetermined period of time for all events within that period. In addition, the account may be designed to allow for different levels of service, such as basic or high grade. A higher grade service, for example, offers features to the user not available under the basic level.

Continuing with the above example, assume that the user now wishes to have access to content on the handheld device 16 for a certain live sporting event that the user plans to attend. The user then makes the payment to his account in step 556. The payment can be made in person, to a kiosk or at any other location authorized to receive payments. Advantageously, electronic payment methods, such as over the Internet, can be used. With such a method the user logs on to an Internet site of the service provider and makes the payment via credit card or other. The payment process will typically include selecting the event or group of events for which access to content is desired, the level of service, if applicable, and then making the payment. When the payment is made and validated an entry is automatically made in the user account indicating that access to content for the handheld device 16 specified in the account is enabled (step 558). A detailed example of an online service delivery purchase is provided later in the specification.

At the event itself, before starting to broadcast the content to the individual handheld electronic devices 16, the database 502 connects to the network of the service provider over the Internet such that the database 502 can be populated with the identifiers of all the handheld electronic devices 16 for which payment for content delivery for the event has been made (step 560). Once step 560 is completed all the handheld device 16 identifiers in the database 502 are transmitted to the head end 12 such and they are all included in the broadcast that is made by the transmitter 14. Specifically, the block of identifiers are broadcasted periodically in step 562, say every minute such as to allow the individual handheld electronic devices 16 to perform the authentication process at any time.

In one embodiment, each handheld device 16 is designed such that it cannot operate unless it has been electronically unlocked. When the handheld device 16 is powered up, it automatically enters the locked mode. During the locked mode the handheld device 16 will acquire the wireless RF transmission and decode the information such as to extract the block of identifiers that are being sent. In this example, the block of identifiers constitute the authentication data that determines if a particular handheld device 16 will be allowed to receive the service or not. Once the block of identifiers are extracted from the transmission the handheld device 16 will compare each code from the block to the identifier of the handheld device 16. If a match is found, then the handheld device 16 enters the unlocked mode in step 564 and the content that is being broadcast can be adequately received. However, if no match is found after a certain period, say 2 minutes the handheld device 16 shuts down automatically.

The approach described earlier is a simple way to ensure that content is delivered only to spectators that have made payment, since no encryption of the video/audio content is required. In addition, the delivery of the authentication information to the individual handheld electronic devices 16, such as the block of identifiers, in a wireless manner, is simple from a logistics standpoint.

For enhanced security, the block of identifiers that are being transmitted can be encrypted using any suitable encryption techniques. The handheld device 16 should, therefore be provided with capability to decrypt the block of identifiers by using a suitable key.

Another option is to encrypt the entire transmission and require the handheld device 16 to decrypt it. In this form of implementation, the encryption constitutes the authentication data carried by the wireless RF transmission that is processed by the individual handheld electronic devices 16. A decryption key or password may need to be input by the spectator to allow an handheld device 16 to be unlocked. In such case, a decryption key may be provided to the spectator following the payment for the service. When the spectator powers up the handheld device 16, the spectator enters the key and that key is used to perform the decryption.

If encryption or decryption is required, the function can be implemented at the handheld device 16 by suitable software or hardware, both of which are known in the art.

The authentication described earlier can be modified such as to provide service level access control. As it will be discussed later, the handheld device 16 can be designed in such a way as to deliver to the spectator service available in different levels or categories. The levels can be distinguished from each other on the basis of content, for example. The basic level of service may include basic content, such as for example a limited number of video channels. A higher level of service may include a larger number of video channels and contextual information or other content. The reader will appreciate that the distinguishing characteristic of the different service levels will vary in accordance with the intended application. Generally, the higher the service level, the richer the content it provides to the spectator.

The service levels are likely to be available at different cost to the spectator. More specifically, the basic level of service is likely to be the least expensive and as content options are added to upgrade to a higher level of service then the cost to the spectator will increase.

It is desirable to provide the handheld device 16 with an authentication feature that will allow the handheld device 16 to provide to the spectator access to the level of service the spectator has paid for and thus protect the wireless RF transmission from unauthorized access to content or service levels that have not been purchased.

One possible option is to create when the spectator purchases the service distinct sets of identifiers for each service level that is available. Assume that three service levels are available, namely service level A, service level B and service level C. Service level A is the basic and the least expensive. Service level B is the intermediate level and includes features not available under service level A, for example more video channels and a limited amount of contextual information. Service level C is the highest and it provides the richest content, namely the largest number of channels and the most contextual information. As the service is being purchased by spectators, three different sets of electronic identifiers are created, one for those that have purchased service level A, one for those that have purchased service level B and for those that have purchased the service level C.

Under this example, the wireless RF transmission is structured in a way to maintain a distinction between the different levels of service. For example, a core block of frames carries the content for the service level A, which is the basic level. A first additional block of frames carries the additional content that is added to the service level A to upgrade to service level B. Finally there is a second additional block of frames that carries the additional content added to service level B to upgrade to service level C. In such case, the service level C encompasses the content of service levels B and A, while the service level B encompasses the content under service level A.

The authentication information sent to the handheld electronic devices 16 is organized into groups as well. There is a first group that includes the set of the identifiers of the handheld electronic devices 16 for which service at level A has been purchased, a group with a set of the identifiers of the handheld device 16 for which service at level B has been purchased and a set of the identifiers of the handheld electronic devices 16 for which service at level C has been purchased.

In one embodiment, as a handheld device 16 picks up the wireless RF transmission, it will, as discussed earlier try to find in anyone of the sets its own electronic identifier. If the identifier is not found in anyone of the sets, then the handheld device 16 will not unlock itself and the spectator will not be able to access the content. However, the handheld device 16 will unlock itself if its identifier is found in anyone of the sets. If the identifier is found in the set for service A, then the spectator will be able to view only the content carried in the core block of frames, the one that is associated with the service level A. Access to frames associated with any other service level will not be allowed. The control is implemented by the handheld device 16 that determines which part of the wireless transmission it can make available to the spectator. Since the different block of frames are clearly distinguished from one another and associated with the respective groups of identifiers, the determination of the groups where the identifier of the handheld device 16 resides, allows controlling the access to the relevant block of frames that hold the content. If the identifier is in the group associated with the core block of frames, only those will be processed and in effect the spectator will have only access to the service at level A. If the identifier of the handheld device 16 is located in the group associated with the first additional block of frames then only the core block and the additional bloc will be processed, in effect limiting access to the content at level B. Finally, if the identifier of the handheld device 16 resides in the group associated with the second additional block of frames, then full access to the entire content is granted.

The examples of the authentication feature described above are relatively simple to implement. However, there is a need to carry in the wireless RF transmission the entire set of the electronic identifiers of the handheld electronic devices 16 that are allowed to receive content. If a large number of handheld electronic devices are being serviced by the wireless RF transmission, the number of electronic identifiers that need to be transmitted may grow too large to be practical.

Figure 15:
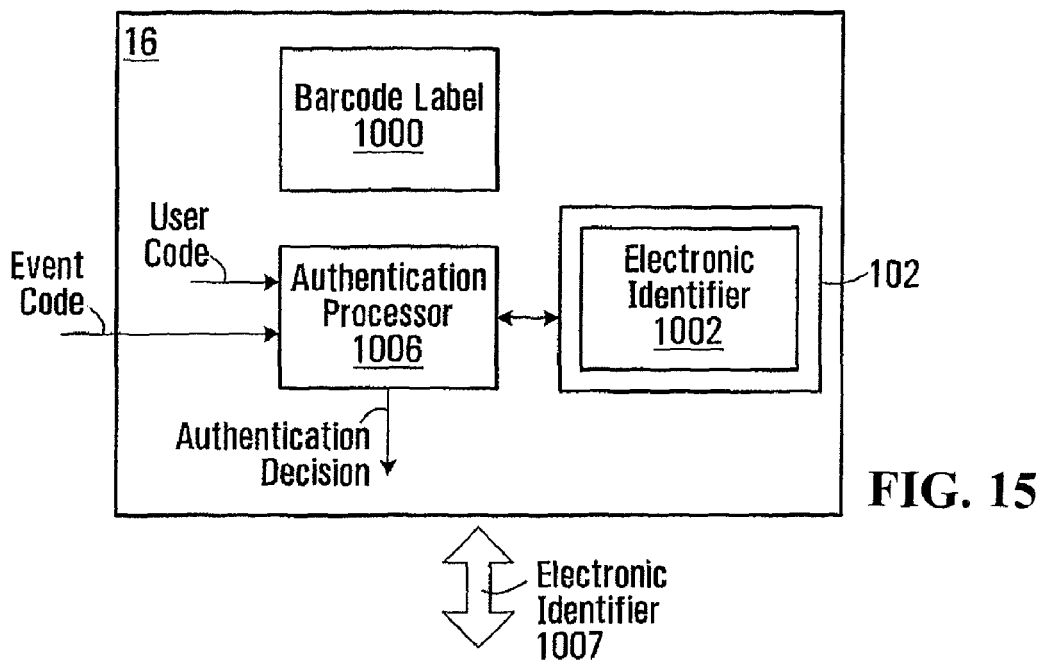
FIG. 15 is a high level block diagram of one embodiment of a handheld electronic device showing components to perform authentication function.
Figure 16:
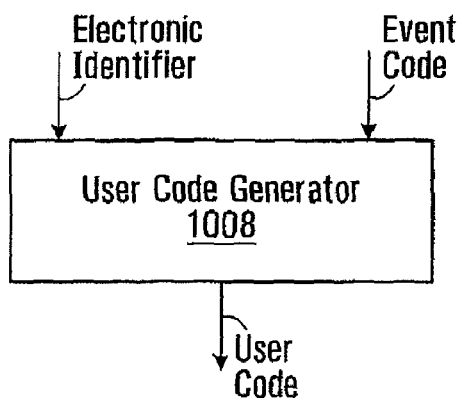
FIG. 16 is a block diagram of a processor that is external of the handheld electronic device to generate a user code.
Figure 17:
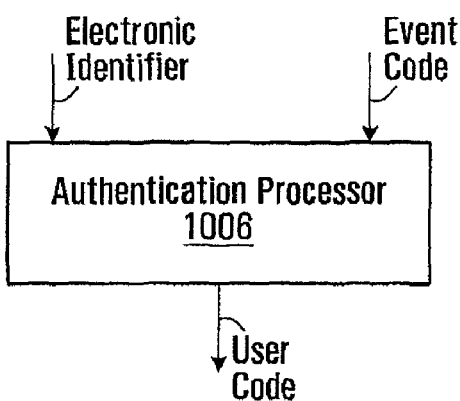
FIG. 17 is a block diagram of one embodiment of an authentication processor shown in FIG. 15.

FIGS. 15 to 17 illustrate a variant in which it is not necessary to include in the authentication information in the wireless RF transmission a complete set of the handheld electronic receivers 16 allowed accessing the content in the wireless RF transmission. FIG. 15 shows a high level block diagram of the handheld device 16 illustrating the storage area (which includes the memory 102 in addition to any other storage, either volatile or not volatile). The non-volatile portion of this storage area holds the electronic identifier described earlier. In this drawing the electronic identifier is designated by the reference numeral 1002.

The handheld device 16 is also provided with a bar code 1000 on its casing that is machine readable, such as by using a bar code reader (not shown). The bar code is a representation of the electronic identifier 1002. Note that the label holding the bar code may also include another form of representation of the electronic identifier 1002, such as for example by using alphanumeric characters suitable to be read by a human.

It is also possible to apply on the casing of the handheld device 16 a bar code 1000 that is not identical to the electronic identifier 1002. In other words, the electronic identifier 1002 and the bar code 1000 are different codes. Some embodiments of the authentication process described later require access to the electronic identifier 1002 via the bar code 1000. In the embodiment where the electronic identifier 1002 and the bar code 1000 are the same codes then a reading of the bar code 1000 will yield the electronic identifier. However, when they are different codes, a mapping mechanism can be used to relate one to the other. The mapping mechanism can be a database storing all the population of electronic identifiers 1002 and the respective bar codes 1000. When it is necessary to obtain an electronic identifier 1002 of a certain handheld device 16, the bar code 1000 is read, the database searched and the corresponding electronic identifier 1002 retrieved.

The handheld device 16 also includes an authentication processor 1006. The authentication processor 1006 is designed to handle authentication related tasks, such as for example output the electronic identifier 1002 to an external device (as it will be described later), process a user code entered by the spectator and the authentication information included in the wireless RF transmission to electronically unlock the handheld device 16 to allow the spectator to gain access to the content in the wireless RF transmission. The authentication processor 1006 is likely implemented in software but it can also be implemented in hardware by a specialized circuit. A combination of software and hardware is another option.

When a spectator desires to purchase the delivery of service to the handheld device 16, the spectator performs the transaction by interacting with an external entity which generates a user code. At the live event, the spectator enters via the user interface the user code provided earlier. The authentication processor 1006 performs a validation of the user code information provided by the spectator and issues an authentication decision. The authentication decision is conveyed by any suitable internal signal which will have the effect to allow the spectator to gain access to the content in the wireless RF signal, If the user code is a correct code, or to deny this access when the user code is a wrong code. For instance, the signal that conveys the authentication decision can be designed to enable the processing of the content in the wireless RF transmission such that it can be viewed and/or heard by the spectator, when the authentication decision validates the user code. On the other hand, when the authentication decision does not validate the user code, then the internal signal is designed to prevent content from being made available to the spectator. The authentication decision issued by the authentication processor 1006 can also be designed to handle levels of service. In such case, the authentication decision indicates which level of service the handheld device 16 is entitled to receive, if any.

A block diagram of the external entity is shown in FIG. 16. More specifically, the external entity has a user code generator 1008 which receives as inputs the electronic identifier 1002 and the event code. The user code generator 1008 processes these entries by any suitable function which produces the user code. The function uses as parameters the electronic identifier and the event code and processes them mathematically. The user code is the result of the mathematical processing. Many different mathematical functions can be used. One desirable property of the mathematical processing is that it should be non-reversible. By non-reversible is meant that knowledge of the user code does not allow reconstructing the electronic identifier 1002, nor the event code, nor the mathematical function used to generate the user code based on the two inputs.

The user code generator 1008 can, for example, be implemented at a booth at the live sporting event the spectator plans attending. The attendant at the booth receives payment from the spectator, the amount of which may be dependent on the level of service desired. The attendant then places adjacent the handheld device 16 a reader such as an infrared reader to interact with an infrared port (not shown in FIGS. 15 to 17) on the handheld device 16. The infrared reader and the handheld device 16 establish communication and the authentication processor 1006 releases over the infrared link the electronic identifier 1002. The infrared link is depicted in FIG. 15 by the large arrow 1007. Alternatively, communication between the handheld device 16 and the reader can be established by using a wireline connection such as via a USB port, or any other suitable arrangement.

The electronic identifier is supplied to the user code generator 1008 in addition to the event code which is available to the user code generator 1008. Normally, the same event code is used for every handheld device 16 for which service is being purchased. The event code is a code that designates the event for which service is being purchased, while the electronic identifier is a code that distinguishes one handheld device 16 from another. In a specific example of implementation the event code will typically be different from one event to another. For instance, in the case of motorsports applications, different event codes will be attributed to different races during the season in a given year.

The user code generator 1008 will process the two entries according to the desired mathematical non-reversible function and outputs the user code. In this particular case, the mathematical processing is a succession of mathematical operations on the two entries that produce a user code that is smaller (less digits) than both the event code and the electronic identifier 1002. The user code is given to the spectator in any convenient way. It may be printed, for instance on a ticket and remitted to the spectator. Normally, this code will be unique to each handheld device 16.

Note that it is also possible to implement the user code generator 1008 to produce user codes for different handheld electronic devices 16 without establishing an electronic communication with the handheld electronic devices 16. This can be done by using a bar code reader for reading the bar code 1000 on the casing of each handheld device 16. If the bar code 1000 is the same as the electronic identifier 1002 then the processing by the user code generator 1008 can be effected as described earlier. Otherwise, if the bar code 1000 is different from the electronic identifier 1002, a database (not shown) mapping the bar codes 1000 to the electronic identifiers 1002 of the population of the handheld electronic devices 16 is searched to extract the electronic identifier 1002 corresponding to the bar code 1000 that was read.

As the spectator enters the stadium, the spectator turns the handheld device 16 on and he is requested by the authentication processor 1006 to supply a user code. The request may be, for example, a prompt appearing on the display 118 of the handheld device 16 to enter a user code (assuming that the system requires manual input of the user code). The spectator enters the user code printed on the ticket via the user interface of the handheld device 16. The authentication processor 1006 to which are readily available the electronic identifier 1002 and the event code that is conveyed in the wireless RF transmission, processes the electronic identifier 1002, and the event code according to the same mathematical function implemented by the user code generator 1008. If the output of the process issues a code that matches with the user code entered by the spectator, then the authentication processor 1008 issues an authentication decision allowing access to the content in the wireless RF transmission. Otherwise, access to the content is denied.

A possible option is to communicate the user code to the handheld device 16 electronically, immediately after the electronic identifier 1002 is communicated to the user code generator 1008. As soon as the user code generator 1008 computes a user code, that code is conveyed via the communication link 1007 to the authentication processor 1006. This option obviates the need for the spectator to manually input the user code for validation purposes. The electronic transaction 1007 automatically unlocks the handheld electronic device for use at the live sporting event, without the necessity for the spectator to input any user code.

In a possible variant, the user code is provided to the spectator via an online purchase set-up that can be made any time before the live event begins. The principles of this arrangement are described later. Briefly, the spectator accesses the Internet via a personal computer or any other communication device and connects with a web site where an on-line purchase of delivery of service can be made. The server hosting the web site implements the user code generator and computes a user code. The user code that is produced is communicated to the user, such as by displaying it on the screen of the personal computer, sent to the user by e-mail to a specified e-mail address or via any other suitable fashion. The user will retain the user code and enter it in the handheld device 16 during the live event.

Another possible option that can be considered is to convey in the wireless RF transmission, the event code (as in the previous embodiment) and also all the user codes for the handheld electronic devices 16 for which service has been purchased. This option would require computing for every handheld device 16 for which service is purchased (for example at the point of purchase of the service) a user code and storing all the user codes so computed into a database. During the live sporting event, the content of the database is periodically broadcasted along with the event code. Each handheld device 16 that is at the live sporting event receives the wireless RF transmission and extracts the event code. The event code is then used to compute a user code by the authentication processor 1006. That user code is then checked against the set of user codes included in the wireless RF transmission. If a match is found the authentication processor 1006 issues an authentication decision allowing the handheld device 16 to access the video/audio content in the wireless RF transmission. If no match is found then the handheld device 16 remains locked.

The various embodiments described above that employ a user code for authentication purposes can also be adapted to a multi-service level arrangement. In the case of a multi service level system, the spectator will be provided with a different user code depending on the particular service level that was purchased. The wireless RF transmission has content that is structured to distinguish one service level from another and each service level is associated with different authentication information. The authentication information is a compound event code including a plurality of service level codes that are different from one service level to another. Accordingly, in this example, the authentication information will include as many service level codes as there are different service levels. In use, the authentication processor 1008 will try to match the user code supplied by the spectator to the compound event code. Specifically, the authentication processor 1008 will issue an authentication decision to unlock the handheld device 16 when a match is established between the user code and any one of the service level codes, but the authentication decision will control the access to the content, as discussed earlier, such that the spectator will only be able to gain access to the service level that was purchased.

Note that the event codes (either a unique code or a compound code in the case of a multi-level approach) are generated by the authority or organization controlling the delivery of service to the spectators during the live event. Those codes can be randomly generated for every new event.

In some aspects, the concept of the different service levels may be modified to cause the devices to buffer different video channels. For example, rather than the device determining that it can have access to particular content, the device buffers that content.

Online Service Purchase

Figure 11:
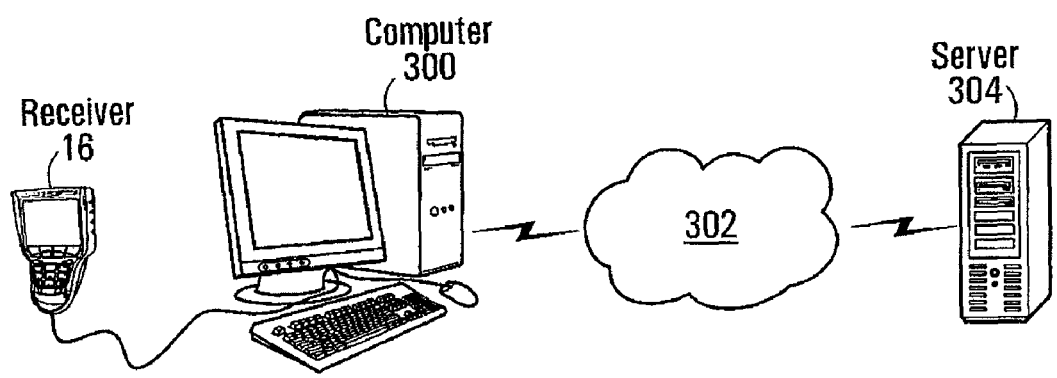
FIG. 11 is a block diagram of one embodiment of a system for performing online service purchase and handheld electronic device management.

In FIG. 11 the handheld device 16 is connected to Personal Computer (PC) 300 of the user via the USB port 104 that connects to the electronic device interface of the PC 300. The electronic device interface of the PC 300 can be a USB port on the PC 300. The diagram at FIG. 11 assumes the PC 300 can communicate over the Internet 302 with a server 304. The PC 300 has a data network interface allowing data communication to take place over the data network 302, which in this example is the Internet. In a specific and non-limiting example of implementation the data network interface is an Ethernet connection. The PC 300 has a user interface allowing the user to receive information from the PC 300 and to input information in the PC 300. The user interface includes a keyboard, a display screen and a pointing device. Other forms of user interface can be utilized. The PC is also provided with a processor and a memory in which is stored program data for execution by the processor. As indicated earlier, the PC is connected over the Internet 302 or any other network with the server 304. The server 304 has a computing platform (not shown) having a processor and memory, the processor executing software that implements the functionality of the server 304. To enable data communication between the computing platform and the data network 302, the server 304 is provided with a data communication interface (not shown) that is under the control of the computing platform. The computing platform directs the exchange of information with the PC 300 via the data communication interface.

After the connections have all been established, the server 304 sends to the PC 300 data that in conjunction with the program data executed by the processor presents to the user information via the user interface allowing the user to electronically purchase and specify services to be delivered to the handheld device 16. From the user's perspective, the user is directed to a web site (hosted by the server 304) and presented with a screen of the type shown in FIG. 12. The web site allows the user to set up an account, manage a personal profile and purchase the delivery of services to the handheld device 16 for one or more live sporting events. Assume for the sake of this example that the user must create a new account with the server 304. At this end the user is prompted by the PC 300 in response to data sent by the server 304 to select account identification information allowing him/her to securely access the account. The account identification information can be a user name 308 and a password 310. Once the user name 308 and the password 310 have been selected or accepted by the user in the case they are automatically generated by the server 304, they will be required by the server 304 to allow the user to access again his/her account.

Next, the user is requested to provide personal information such as:

Name 312;

Address 314;

Payment instrument 316 such as a credit card number and expiration date and possibly a security code. The payment instrument 316 is used to pay for the service delivered to the handheld device 16 during the live sporting event and also to pay for merchandise purchased during the live sporting event, as previously described.

Shipping address information 317 for on-line shopping. The shipping address is the address at which merchandise purchased by the user, as described previously, will be shipped;

Language in which the on-line account is to be set.

In addition to the information provided by the user an electronic exchange of information takes place between the handheld device 16 and the server 304. The electronic exchange of information includes the transfer to the server 304 of the unique electronic identifier of the handheld device 16. Such electronic identifier was discussed previously and it is in the form of a hard coded identifier. In this example the identifier is submitted to the PC 300 when the handheld device 16 is connected to it via the USB interface 104 and it is automatically sent to the server 304. Note that the PC 300 may require the use of software that will be able to communicate with the handheld device 16 such as to extract the hard coded identifier from it and transfer it to the server 304 when the user is creating or accessing his record.

The record that is created at the server 304 has three elements of information that allow distinguish it from other records. Those elements of information are (1) the user name; (2) the password and (3) the identifier of the handheld device 16 associated with that user name and password. Note that a possibility exists to assign more than one handheld device 16 with a given record or account.

The next step in the creation of the account is for the user to specify certain preferences that will allow tailoring the service according to personal choices. The page at FIG. 12 has an "Options" button 315 that when "clicked" directs the user to the "Options" page shown at FIG. 13. At that page, the user can specify advertisement options 318 such whether advertisement is desired or not, the type of advertisement to be delivered, namely the nature of the products and services of interest to the user. In a simple case, the user can enter a gender such that the advertisement will be tailored accordingly. In a more detailed example, the user can specify a level or revenue, level of education, subjects of interests, geographical location and language, among others. That information can then be used to build a filter allowing tailoring the advertisement information to be delivered to the user. In one embodiment, the information is used to determine which video channels to buffer. In a non-limiting example of implementation, the filter is built by the server 304 and uploaded to the handheld device 16 via the PC 300. The filter is in the form of a file that resides on the handheld device 16 and when the advertisement information is received in the wireless RF transmission during the live sporting event the filter will condition what information is to be delivered to the user. The filter can block certain advertisements, select a language in which the advertisement will be delivered, etc.

Figure 13:
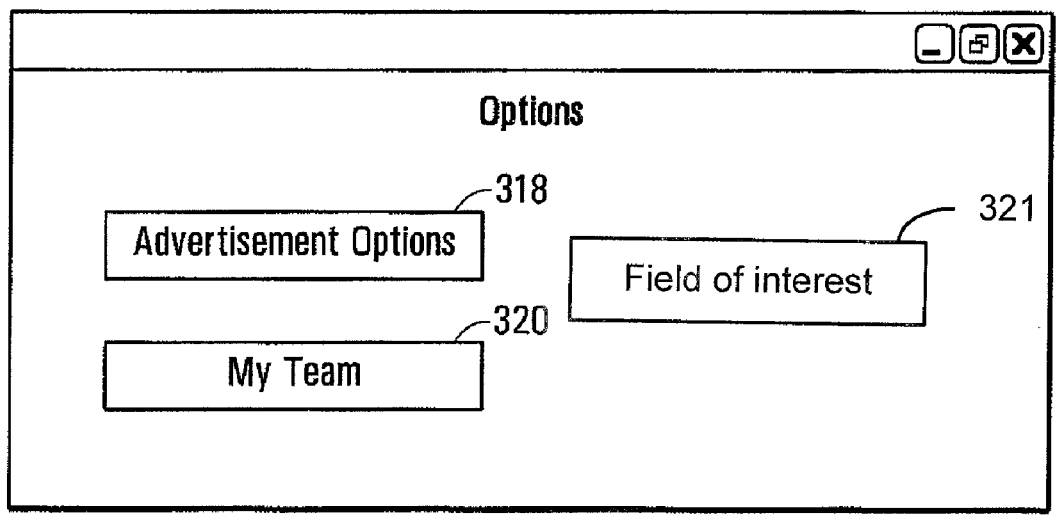

In a possible variant, the user can specify other preferences that relate to information received during the event that is other than advertisement. For instance, the user can specify preferred teams or players to allow delivering information to the user during the live sporting event in a way that is consistent with those preferences. FIG. 13 shows a button 320 "My team" that allows access to a different page (not shown) where those preferences can be specified. That information is then used by the server 304 to build another filter to be stored on the handheld device 16 that will condition the information received or buffered during the live sporting event. One specific example of such conditioning is the order in which information on the teams or players is presented to the user. Another specific example of such conditioning is which video channels are buffered during a live event. The menu of choices that provides more detailed info on the teams or players is altered on the basis of the filter such that the teams or players that have been specified as being preferred will be given a higher order of priority than teams or players that are less preferred. In this fashion the preferred teams or players will appear first, followed by those that are not indicated as preferred. In another example, video channels that contain scenes for preferred teams or players are buffered. Another option for the user to select in FIG. 13 is a "field of interest" 321.

Figure 12:
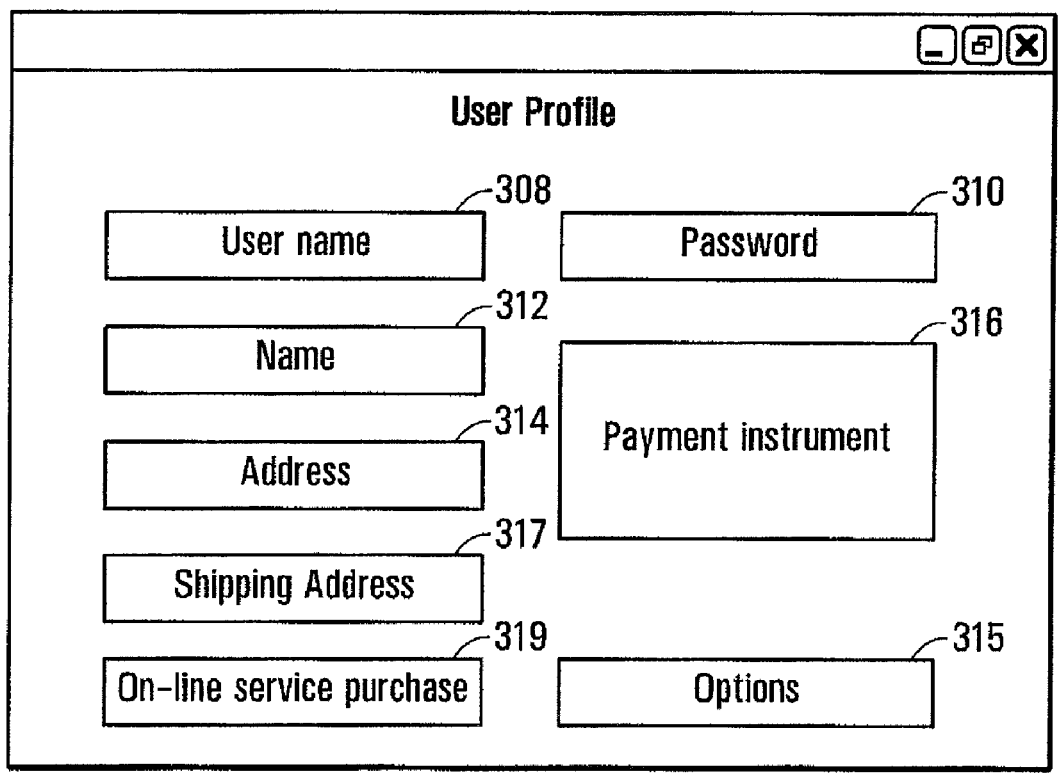
FIGS. 12, 13, and 14 illustrate dialog boxes of one embodiment of a user interface allowing the spectator to enter information for performing on-line service purchases and handheld electronic device management.
Figure 14:
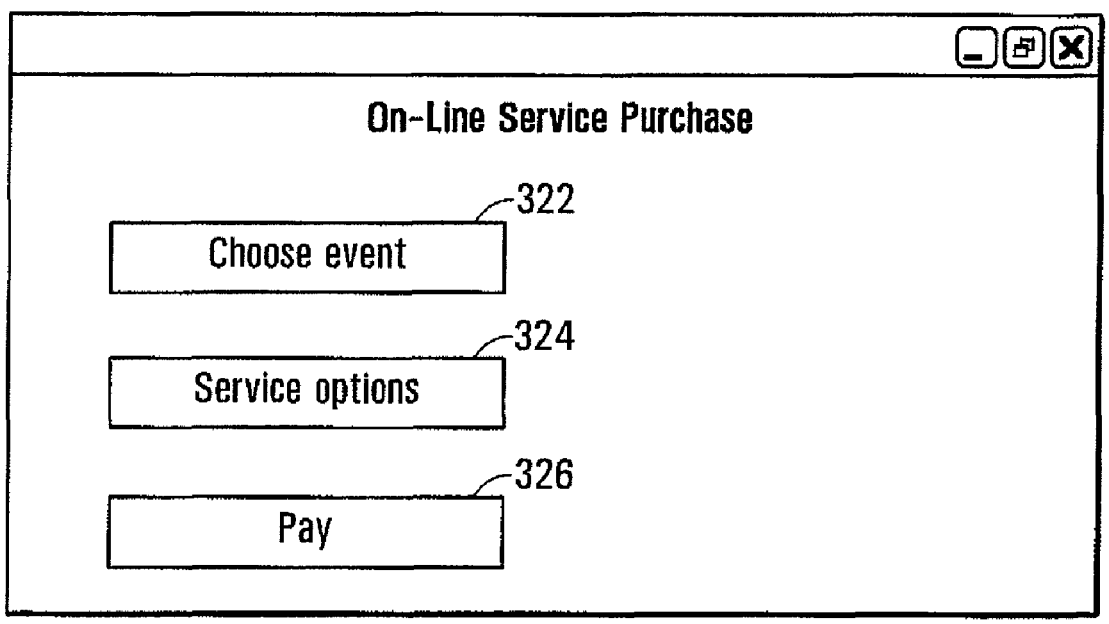

Once the entries on the options page at FIG. 13 have been completed, the user reverts back to FIG. 12 and presses the "on-line service purchase" button 319 that brings the user to the on-line service purchase page at FIG. 14. Here, the user will be requested to authenticate itself to enable the online purchase of delivery of service. The authentication prompt appears on the PC 300 in response to an authentication request data issued by the server 304. The user then enters the authentication information, such as the user name and password, which are transmitted to the server 304 for validation.

If the authentication data is genuine and accepted by the server 304, the user is then directed to a web page allowing the user to select the live sporting event for which content delivery is desired and also to tailor the content to be dispensed depending on the user's tastes and budget. For example, the server 304 sends data to the PC 300 for causing the PC 300 to show a control 322 allowing the user to select the event for which the service is to be purchased. The control 322 can be any suitable control such as for instance a drop down menu box that provides the set of all the events for which service can be purchased.

Once a particular event has been selected, then the server 304 sends data to the PC 300 causing the PC 300 to display to the user a control 324 "service options" which requests the user to supply information identifying a level of service desired. Specifically, the service options control 324 allows the user to select service level among a set of levels. The various levels of service can vary based on content. For example the highest level allows access to all the content, such as live video streams, enabled GPS and on-line shopping functionality, weather information, breaking news, etc. The level that is immediately below the highest level provides all of that with the exception of the breaking news service. The lowest level of service can be limited to live video only. It will be plain to a person skilled in the art that the number of service levels offered to a user and the way those service levels are differentiated from one another is a matter of design and can vary widely.

Once the various service selections have been completed, the user activates the "pay" control 326. At that point, the server 304 will determine the amount of money the user is to be charged on the basis of the service level selection 324. Next, the server 304 will perform the payment step of the process. Two possible options exist. One is to charge the credit card provided by the user and that is currently on file or any other payment instrument that was provided. The other option is to send data to the PC 300 that will prompt the user to supply payment instrument information, such as a credit card to be charged. This payment instrument information will be processed by the server 304 to complete the payment step.

After the payment step has been completed, the server 304 will set up the handheld device 16 for the live sporting event for which service has been purchased. The set up may include the following:

The server 304 will download to the PC 300 the necessary service data, such as the data to set-up/alter the GUI of the handheld device 16 and/or cartographic data for the venue, assuming GPS functionality of the handheld device 16;

Ancillary data such as:
Advertisement content;
Venue or event related contextual content;
Shopping information such as an on-line catalog;
Trivia or surveys;
Video games;
Environmental/meteorological information;
News Authentication information In the case of the ancillary data, only the data that will be relevant or up to date when the event takes place should be downloaded. In order to make the ancillary data appear as if it is "spontaneously" available to the spectator during the event it may be designed to be available for viewing only when the user is at the event. For instance the data can be "hidden" from the user or designed in such as way that it cannot be accessed by the user unless a "trigger" is input by the handheld device 16. Such trigger can be specific data included in the wireless RF transmission that "unlocks" the hidden ancillary content. With this approach the ancillary data that is being downloaded to the PC 300, can be customized according to the profile of the user. More specifically, the information can be requested when creating the user account to submit preference information. This type of information was discussed previously. The server 304 determines on the basis of the preference information what kind of ancillary data to download.

The downloading of authentication information allows to securely set up the handheld device 16 for reception of services. For instance, the wireless RF transmission can be designed to be protected. The authentication information downloaded in the PC 300 and that is transferred to the handheld device 16 allows to unlock the handheld device 16 at the live sporting event. The authentication information can be in the form of a user code (as described below) or in the form of a decryption key (that can be unique to the handheld device 16 or common for all electronic devices 16 that subscribe for services for that particular live sporting event). The decryption key can be used to decrypt encrypted content in the wireless RF transmission.

Once all the data for setting up the handheld device 16 has been downloaded to the PC 300, the data is transferred to the handheld device 16 via the USB interface 104. At this point the handheld device 16 is ready for use. When activated by the spectator at the live sporting event, the handheld device 16 will pick up the wireless RF transmission and it will use the decryption key to adequately decode the data. Also, the handheld device 16 will also detect in the wireless RF transmission the "trigger" that will unlock for the spectator to see and access the latent ancillary data. Therefore, the spectator can see advertisement information, conduct on-line shopping etc.

The online transaction described earlier can be used as a mechanism to communicate to the server 304 the identity of the handheld device 16. So as users are performing on-line purchases of service delivery to the respective electronic devices 16, the server 304 is building a set of the electronic devices 16 that are authorized to receive the service. This set is kept a storage medium of the server 304, such as in a database (not shown). Just prior the live sporting event, the server 304 that holds in its database the set of all the electronic devices 16 (electronic identifiers) that have purchased service for the event, transfers the set to the authentication database 502. Those identifiers are then included in the wireless RF transmission as previously described.

The server 304 can also be designed to generate the user code described earlier, which the spectator needs to enter on the user interface of the handheld device 16 in order to gain access to some or all of the content carried in the wireless RF transmission. The server implements the user code generator 1008 shown in FIG. 16. During the interaction between the PC 300 and the server 304, the electronic identifier 1002 is delivered to the server 304. The electronic identifier 1002 is extracted by the authentication processor 1006 of the handheld device 16, communicated to the PC 300 and then transmitted to the server 304. The user code generator 1008 receives this information and processes it along with the event code (single code or compound code for multiple service levels) to produce a user code. In the case of a compound event code, which is made up of several different service level codes, the process is run several times with a different service level code at each cycle. The output of the process, which is a user code, is communicated back to the PC 300. The user code appears on the display of the PC 300 such that the user can take note of it and can print it or otherwise make note of it, or it can be sent in the form on an e-mail to the user to a specified e-mail address or via any other suitable method. The user code can also be loaded directly in the handheld device 16 as described above. This obviates the need for the user to manually enter the user code at the handheld device 16.

Note that in the case the user has created an account on the server 304, the electronic identifier 1002 may be stored in the account and there is no need to extract it from the handheld electronic device and communicate it to the server 304. In this form of implementation, the user logs on as described earlier and he/she automatically obtains the user code, that is computed by using the electronic identifier 1002 stored in the account and the event code.

Note that another possibility to deliver a user code is via a telephone system. Here the user dials a predetermined number and when prompted enters the on the dial pad the electronic identifier 1002. The user code generator at the telephone processing site generates a user code on the basis of the electronic identifier 1002 and the event code and communicates it to the user via voice synthesis. Also if an account for the user is created at the telephone processing site, the electronic identifier 1002 may be stored and there is no need to enter it again for each transaction.

In a possible variant the handheld device 16 can be designed with a wireless communication capability, such as via a Bluetooth technology of Wireless Fidelity (WiFi) technology to allow the handheld device 16 to communicate directly with the server 304 via any local wireless reception station also called "hot spots". In this fashion, the handheld device 16 does not require a connection to PC 300 to be set up by the server 304. Under this variant, all the commands and service selection choices can be made directly from the handheld device 16.

Note that when the handheld device 16 is provided with bidirectional communication capability, on-line purchases can be made by allowing the handheld device 16 to communicate over a cellular network with the server 304 over which the user record resides. Here, the on-line purchasing process is as described earlier, where the spectator attending the live sporting event chooses the product or service to buy and connects with the server 304 over the Internet 302 such as to complete the transaction. The transaction would include authenticating the user by providing a user ID and password. Assuming the payment instrument information and shipping information are already on record on the user account, the transaction completes.

One embodiment includes receiving, at the wireless mobile computing device during a live event, multiple video streams showing different perspectives of the live event; displaying a first video stream of the received multiple video streams using a display of the wireless mobile computing device; buffering a plurality of the received video streams in the wireless mobile computing device, the buffering is performed without the user of the mobile computing device indicating which video streams to buffer, the buffered video streams includes at least one video stream other than the first video stream; after displaying at least a portion of the first video stream and after starting the buffering, receiving a request to access the buffered video streams; and displaying one of the buffered video streams, other than the first video stream, in response to the request.

One embodiment includes a wireless receiver, the wireless receiver multiple video streams during a live event that show different perspectives of the live event; a display, at least one of the received video streams are displayed on the display; one or more buffers; and a processor in communication with the wireless receiver, the display, and the one or more buffers; the processor buffers a plurality of the video streams into the one or more buffers without the user of the mobile computing device indicating which video streams to buffer, receives a request from a user to play a stored video stream from the one or more buffers, and plays at least a portion of the stored video stream from the one or more buffers in response to the request.

One embodiment includes receiving multiple video channels at a wireless mobile computing device; displaying a first video channel of the received video channels using a display of the wireless mobile computing device; automatically determining a subset of the video channels to buffer, the subset of received video channels includes at least one video channel other than the first video channel; buffering the subset of received video channels in one or more buffers in the wireless mobile computing device; receiving a request to access a buffered video channel, other than the first video channel, from the buffered subset of video channels; and displaying the buffered video channel from the buffered subset of video channels.

One embodiment includes receiving multiple video streams depicting a live event; wirelessly transmitting the multiple video streams to a first set of mobile computing devices during the live event; and transmitting to the first set of mobile computing devices first information that identifies a first subset of the video streams for the first set of mobile computing devices to buffer for replay mode playback.

One embodiment includes one or more storage devices that store multiple video streams depicting a live event during the live event; a wireless transmitter that wirelessly transmits the multiple video streams to a first set of mobile computing devices during the live event; and a processor in communication with the one or more storage devices and the wireless transmitter, the processor communicates first information to the first set of mobile computing devices that identifies a first subset of the video streams for the first set of mobile computing devices to buffer for replay mode playback.

One embodiment includes continuously receiving multiple video channels at the wireless mobile computing device; displaying a first video channel of the received video channels as live video using a display of the wireless mobile computing device; continuously buffering at least a subset of two or more of the received multiple video channels in one or more buffers of the wireless mobile computing device while receiving the multiple video channels at the wireless mobile computing device; receiving a request to access one or more of the buffered video channels; freezing the one or more buffers and displaying one or more of the buffered video channels in response to the request, the displaying one or more of the buffered video channels displays an action that occurred previously in time; receiving a request to return to live video; releasing the one or more buffers from being frozen in response to the request to return to live video; displaying at least one of received video channels as live video using the display in response to the request to return to live video; and continuously buffering two or more of the received multiple video channels in the one or more buffers of the wireless mobile computing device while receiving the multiple video channels at the wireless mobile computing device in response to the request to return to live video.

One embodiment includes a wireless receiver, the wireless receive receives a first video stream in a wireless transmission; a display; a first buffer; a second buffer; and a processor in communication with the wireless receiver, the display, the first buffer and the second buffer; the processor buffers the first video stream into the first buffer, receives a first request to replay the first video stream, replays at least a portion of the first video stream from the first buffer in response to the first request and buffers the first video stream into the second buffer at least while replaying the first video stream from the first buffer.

One embodiment includes receiving multiple video channels in a single wireless transmission signal at the wireless mobile computing device; displaying a first video channel of the received multiple video channels using a display of the wireless mobile computing device; buffering at least a subset of two or more of the received multiple video channels in the wireless mobile computing device; receiving a request to access one or more of the buffered video channels; and displaying one or more of the buffered video channels.

One embodiment includes receiving multiple video channels at the wireless mobile computing device using a single tuner; displaying at least one of the received multiple video channels using a display of the wireless mobile computing device; buffering at least a subset of two or more of the received multiple video channels in the wireless mobile computing device; receiving a request to access one or more of the buffered video channels; and displaying one or more of the buffered video channels.

The foregoing detailed description has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

The invention claimed is:

1. A method of presenting content on a wireless mobile computing device, comprising:
    receiving, at the wireless mobile computing device during a live event, multiple video streams showing different perspectives of the live event;

displaying a first video stream of the received multiple video streams using a display of the wireless mobile computing device;

buffering a plurality of the received video streams in the wireless mobile computing device, the buffering is performed without the user of the mobile computing device indicating which video streams to buffer, the buffered video streams includes at least one video stream other than the first video stream;

after displaying at least a portion of the first video stream and after starting the buffering, receiving a request to access the buffered video streams; and displaying one of the buffered video streams, other than the first video stream, in response to the request, the displaying one of the buffered video streams comprises:
freezing the buffering of the received video streams,
displaying one of the buffered video streams,
determining that a period of time for which the buffering has been frozen has expired,
restarting the buffering of received video streams in response to determining that the period of time has expired, and
displaying a live feed from one of the received video streams in response to determining that the period of time has expired.

2. The method of claim 1, wherein:
the displaying one of the buffered video streams from the buffer includes displaying an occurrence during the live event that already occurred;
the buffering a plurality of the received video streams includes simultaneously buffering five video streams in the wireless mobile computing device for replay mode playback; and
the receiving a request to access the buffered video streams includes receiving a request to playback a specific video stream from the buffered video streams.

3. The method of claim 1, further comprising:
receiving first identification information at the wireless mobile computing device, the buffering of the plurality of the received video streams includes buffering a subset of the received video streams; and
using the first identification information at the wireless mobile computing device to determine which of the received video streams are in the subset to be buffered.

4. The method of claim 3, wherein:
the first identification information directly identifies the video streams of the subset of the received video streams.

5. The method of claim 4, further comprising:
receiving, at the wireless mobile computing device during the live event, second identification information;
using the second identification information at the wireless mobile computing device to determine which of the received video streams to buffer; and
changing, during the live event, the subset of the received video streams to buffer based on the second identification information.

6. The method of claim 3, wherein:
the first identification information and the multiple video streams are received at the mobile computing device in a single wireless signal.

7. The method of claim 3, wherein:
the first identification information and the multiple video streams are received at the mobile computing device using a single tuner and communicated to one or more buffers from the single tuner.

8. The method of claim 1, further comprising:
receiving, at the wireless mobile computing device, identification information;
accessing user data at the mobile computing device; and
using the identification information in combination with the user data at the wireless mobile computing device to determine which of the received video streams are in the subset to be buffered.

9. The method of claim 1, wherein
the receiving multiple video streams further includes receiving multiple audio streams of the live event and receiving a data feed for the live event; and
the buffering further includes buffering the audio streams separately from the video streams and buffering the data feed separately from both the video streams and audio streams.

10. A mobile computing device, comprising:
a wireless receiver, the wireless receiver receives multiple video streams during a live event that show different perspectives of the live event;
a display, at least one of the received video streams are displayed on the display;
one or more buffers; and
a processor in communication with the wireless receiver, the display, and the one or more buffers;
the processor buffers a plurality of the received video streams into the one or more buffers without the user of the mobile computing device indicating which video streams to buffer, receives a request from a user to play a stored video stream from the one or more buffers, and plays at least a portion of the stored video stream from the one or more buffers in response to the request;
the processor plays at least the portion of the stored video stream from the one or more buffers in response to the request from the user by freezing the buffering of the received video streams, displaying the stored video stream, determining that a period of time for which the buffering has been frozen has expired, restarting the buffering of received video streams in response to determining that the period of time has expired and displaying a live feed from one of the received video streams in response to determining that the period of time has expired.

11. The mobile computing device of claim 10, wherein:
the wireless receiver receives first identification information; and
the processor uses the first identification information to determine a subset of video streams to buffer.

12. The mobile computing device of claim 11, wherein:
the first identification information directly identifies the video streams to buffer.

13. The mobile computing device of claim 11, further comprising:
the wireless receiver receives second identification information; and
the processor uses the second identification information to determine which video streams to buffer and changes, during the live event, the subset of the received video streams being buffered based on the second identification information.

14. The mobile computing device of claim 11, wherein:
the first identification information and the multiple video streams are received at the mobile computing device in a single wireless signal.

15. The mobile computing device of claim 11, wherein:
the wireless receiver includes a single tuner; and
the first identification information and the multiple video streams are received at the mobile computing device using the tuner and communicated to one or more buffers from the single tuner.

16. The mobile computing device of claim 10, further comprising:
the wireless receiver receives first identification information;
the processor accesses user data at the mobile computing device; and
the processor uses the first identification information and the user data to automatically determine which video streams to buffer.

17. The mobile computing device of claim 10, wherein
the wireless receiver further receives multiple audio streams for the live event and a data feed for the live event; and
the one or more buffers include separate buffers for the video streams, audio streams and data feed.

18. A method of presenting content on a wireless mobile computing device, comprising:
continuously receiving multiple video channels at the wireless mobile computing device;
displaying a first video channel of the received video channels as live video using a display of the wireless mobile computing device;
continuously buffering at least a subset of two or more of the received multiple video channels in one or more buffers of the wireless mobile computing device while receiving the multiple video channels at the wireless mobile computing device;
receiving a request to access the buffered subset of two or more of the received multiple video channels;
freezing the buffering of the subset of two or more of the received multiple video channels in the one or more buffers in response to the received request to access the buffered subset of two or more of the received multiple video channels;
providing for any of the buffered subset of two or more of the received multiple video channels to be chosen while the buffering of the subset of two or more of the received multiple video channels in the one or more buffers is frozen and displaying the chosen video channel from the buffer including playing back an action that occurred previously in time;
receiving a request to return to live video;
releasing the buffering of the subset of two or more of the received multiple video channels in the one or more buffers from being frozen in response to the request to return to live video;
displaying at least one of the received video channels as live video using the display in response to the request to return to live video; and
continuously buffering two or more of the received multiple video channels in the one or more buffers of the wireless mobile computing device while receiving the multiple video channels at the wireless mobile computing device in response to the request to return to live video.

19. The method of claim 5, wherein:
the second identification information and the multiple video streams are received at the mobile computing device in a single wireless signal.

20. The method of claim 1, wherein:
the displaying one of the buffered video streams includes rewinding and playing the one of the buffered video streams.

21. The method of claim 1, wherein:
the displaying one of the buffered video streams includes displaying an occurrence already displayed in the first video stream.

22. The method of claim 1, further comprising:
displaying identifications of the buffered video streams currently being buffered in response to the request to access the buffered video streams; and
receiving a selection of one of the buffered video streams, the displaying one of the buffered video streams includes displaying the selected buffered video stream rewound in response to the received selection.

23. The mobile computing device of claim 10, wherein:
the processor plays at least the portion of the stored video stream from the one or more buffers in response to the request by rewinding and playing the stored video stream from the one or more buffers.

24. The mobile computing device of claim 10, wherein:
the played stored video stream includes a depiction of an occurrence already displayed by the display from another of the received video streams.

25. The method of claim 18, further comprising:
receiving first identification information at the wireless mobile computing device; and
using the first identification information at the wireless mobile computing device to determine which of the received video channels are in the subset to be buffered.

26. The method of claim 25, wherein:
the first identification information directly identifies the video channels of the subset of the received multiple video channels.

27. The method of claim 25, further comprising:
receiving, at the wireless mobile computing device during the live event, second identification information;
using the second identification information at the wireless mobile computing device to determine which of the received video channels to buffer; and
changing, during the live event, the subset of the received video channels to buffer based on the second identification information.

28. The method of claim 25, wherein:
the first identification information and the received multiple video channels are received at the mobile computing device in a single wireless signal.

29. The method of claim 18, further comprising:
receiving, at the wireless mobile computing device, identification information;
accessing user data at the wireless mobile computing device; and
using the identification information in combination with the user data at the wireless mobile computing device to determine which of the received video channels are in the subset to be buffered.

30. A wireless mobile computing device, comprising:
a wireless receiver, the wireless receiver concurrently receives multiple video channels;
a display, a first video channel of the received video channels is displayed as live video;
one or more buffers, at least a subset of two or more of the received multiple video channels are continuously buffered in the one or more buffers while receiving the multiple video channels at the wireless mobile computing device; and a processing unit in communication with the wireless receiver, the display, and the one or more buffers;

the processing unit receives a request to access the buffered subset of the received multiple video channels and freezes the buffering of the subset of the received multiple video channels in the one or more buffers in response to the received request to access the buffered subset of the received multiple video channels, the processing unit provides for any of the buffered subset of the received multiple video channels to be chosen while the buffering of the subset of the received multiple video channels in the one or more buffers is frozen and displays the chosen video channel from the buffer including playing back an action that occurred previously in time, the processing unit receives a request to return to live video, releases the buffering of the subset of the received multiple video channels in the one or more buffers from being frozen in response to the request to return to live video, displays at least one of received video channels as live video using the display in response to the request to return to live video and concurrently buffers two or more of the received multiple video channels in the one or more buffers of the wireless mobile computing device while receiving the multiple video channels at the wireless mobile computing device in response to the request to return to live video.

31. The mobile computing device of claim 30, wherein:
the wireless receiver receives first identification information; and
the processing unit uses the first identification information to determine the subset of the received video channels to buffer.

32. The mobile computing device of claim 31, wherein:
the first identification information directly identifies the video channels to buffer.

33. The mobile computing device of claim 31, further comprising:
the wireless receiver receives second identification information;
the processing unit uses the second identification information to determine which video channels to buffer and changes, during the live event, the subset of the received video channels being buffered based on the second identification information.

34. The mobile computing device of claim 30, further comprising:
the wireless receiver receives first identification information;
the processing unit accesses user data at the mobile computing device; and
the processing unit uses the first identification information and the user data to automatically determine the subset of the received multiple video channels to buffer.

* * * * *